(12) United States Patent
Krassner et al.

(10) Patent No.: US 11,004,090 B2
(45) Date of Patent: *May 11, 2021

(54) SYSTEM AND METHOD FOR CREATION, DISTRIBUTION AND TRACKING OF ADVERTISING VIA ELECTRONIC NETWORKS

(75) Inventors: Brad Krassner, Miami Beach, FL (US); Nikolai Mentchoukov, Miami Beach, FL (US); Alan Edwards, Miami Beach, FL (US); Fred Bernstein, Miami, FL (US); Igor Tchibirev, Miami Beach, FL (US)

(73) Assignee: Rich Media Club, LLC, Salt Lake City, UT (US)

( * ) Notice: Subject to any disclaimer, the term of this patent is extended or adjusted under 35 U.S.C. 154(b) by 1201 days.

This patent is subject to a terminal disclaimer.

(21) Appl. No.: 12/384,403

(22) Filed: Apr. 4, 2009

(65) Prior Publication Data

US 2009/0265243 A1  Oct. 22, 2009

Related U.S. Application Data

(63) Continuation-in-part of application No. 11/803,779, filed on May 16, 2007, now Pat. No. 10,380,602, (Continued)

(51) Int. Cl.
*G06Q 30/02* (2012.01)
(52) U.S. Cl.
CPC ......... *G06Q 30/02* (2013.01); *G06Q 30/0256* (2013.01); *G06Q 30/0275* (2013.01)
(58) Field of Classification Search
CPC .... G06Q 30/00; G06Q 30/02; G06Q 30/0275; G06Q 30/0256
See application file for complete search history.

(56) References Cited

U.S. PATENT DOCUMENTS

| 5,572,643 | A | 11/1996 | Judson |
| 5,675,510 | A | 10/1997 | Coffey et al. |

(Continued)

FOREIGN PATENT DOCUMENTS

| CN | 1378674 A | 11/2002 |
| JP | 200151925 A1 | 2/2001 |

(Continued)

OTHER PUBLICATIONS

Wiley Encyclopedia of Computer Science and Engineering (Year: 2009).*

(Continued)

*Primary Examiner* — Breffni Baggot

(57) ABSTRACT

A system and method for creation, distribution and tracking of advertising via electronic networks, enabling creation of advertisements using licensed third party content and placement of said ads at desired network locations, utilizing an auction of ad spaces based on bids placed by advertisers to have their ads displayed at such locations. When a network user/ad viewer requests an ad by clicking or other action, an auction algorithm executes to select the ad to be displayed from those that bid for display at such ad space location and then the ad is composed and delivered to the ad space location by accessing a relational database storing commands that retrieve, assemble and dispatch the licensed ad content. Usage and display of licensed content on designated ad space is tracked to enable cost-per-use charging for both use of licensed content and ad display at the designated ad space.

36 Claims, 85 Drawing Sheets

Related U.S. Application Data which is a continuation-in-part of application No. 11/643,245, filed on Dec. 21, 2006, now Pat. No. 10,380,597.

(60) Provisional application No. 60/753,536, filed on Dec. 24, 2005.

(56) References Cited

U.S. PATENT DOCUMENTS

| | | |
|---|---|---|
| 5,708,780 A | 1/1998 | Levergood et al. |
| 5,710,883 A | 1/1998 | Hong et al. |
| 5,717,860 A | 2/1998 | Graber et al. |
| 5,732,218 A | 3/1998 | Bland et al. |
| 5,737,619 A | 4/1998 | Judson |
| 5,740,549 A | 4/1998 | Reilly et al. |
| 5,796,952 A | 8/1998 | Davis et al. |
| 5,838,790 A | 11/1998 | McAuliffe et al. |
| 5,848,396 A | 12/1998 | Gerace |
| 5,937,390 A | 8/1999 | Hyodo |
| 5,960,409 A | 9/1999 | Wexler |
| 5,999,912 A | 12/1999 | Woodarz et al. |
| 6,009,411 A | 12/1999 | Kepecs et al. |
| 6,011,537 A | 1/2000 | Slotznick |
| 6,041,309 A | 3/2000 | Laor |
| 6,081,829 A | 6/2000 | Sidania |
| 6,108,637 A | 8/2000 | Blumenau |
| 6,112,246 A | 8/2000 | Horbal et al. |
| 6,115,680 A | 9/2000 | Coffee et al. |
| 6,119,165 A | 9/2000 | Li et al. |
| 6,138,115 A | 10/2000 | Agrawal et al. |
| 6,141,010 A | 10/2000 | Hoyle |
| 6,167,382 A | 12/2000 | Sparks et al. |
| 6,185,586 B1 | 2/2001 | Judson |
| 6,205,432 B1 | 3/2001 | Gabbard et al. |
| 6,243,865 B1 | 6/2001 | Wei et al. |
| 6,268,856 B1 | 7/2001 | Timo et al. |
| 6,269,361 B1 | 7/2001 | Davis et al. |
| 6,275,854 B1 | 8/2001 | Himmel et al. |
| 6,279,036 B1 | 8/2001 | Himmel et al. |
| 6,310,601 B1 | 10/2001 | Moore et al. |
| 6,314,451 B1 | 11/2001 | Landsman |
| 6,317,761 B1 | 11/2001 | Landsman |
| 6,317,782 B1 | 11/2001 | Himmel et al. |
| 6,327,619 B1 | 12/2001 | Blumenau |
| 6,347,398 B1 | 2/2002 | Parthasarathy et al. |
| 6,393,407 B1 | 5/2002 | Middleton, III et al. |
| 6,418,470 B2 | 7/2002 | Blumenau |
| 6,449,634 B1 | 9/2002 | Capiel |
| 6,466,967 B2 | 10/2002 | Landsman |
| 6,516,338 B1 | 2/2003 | Landsman et al. |
| 6,553,417 B1 | 4/2003 | Gampper |
| 6,587,837 B1 | 7/2003 | Spagna et al. |
| 6,643,696 B2 | 11/2003 | Davis et al. |
| 6,654,539 B1 | 11/2003 | Duruoz et al. |
| 6,657,647 B1 | 12/2003 | Bright |
| 6,691,281 B1 | 2/2004 | Sorge et al. |
| 6,693,649 B1 | 2/2004 | Lipscomb et al. |
| 6,710,790 B1 | 3/2004 | Fagioli |
| 6,728,753 B1 | 4/2004 | Parasnis et al. |
| 6,763,386 B2 | 7/2004 | Davis et al. |
| 6,789,108 B1 | 9/2004 | McMillan |
| 6,791,579 B2 | 9/2004 | Markel |
| 6,865,719 B1 * | 3/2005 | Nicholas, III ......... G06Q 30/02 715/854 |
| 6,990,630 B2 | 1/2006 | Landsman et al. |
| 7,047,294 B2 | 5/2006 | Johnson et al. |
| 7,120,590 B1 | 10/2006 | Eisen et al. |
| 7,143,075 B1 | 11/2006 | Chickering et al. |
| 7,146,401 B2 | 12/2006 | Hansell et al. |
| 7,155,508 B2 | 12/2006 | Sank Uratripati et al. |
| 7,155,663 B2 | 12/2006 | Landsman et al. |
| 7,310,609 B2 | 12/2007 | Middleton, III et al. |
| 7,313,590 B2 | 12/2007 | Mentchoukov |
| 7,376,907 B2 | 5/2008 | Santoro et al. |
| 7,962,363 B2 * | 6/2011 | Patel ...................... G06Q 30/02 705/14.4 |
| 7,962,636 B2 | 6/2011 | Stafie et al. |
| 8,447,651 B1 | 5/2013 | Scholl et al. |
| 2001/0029585 A1 | 10/2001 | Simon et al. |
| 2001/0037232 A1 | 11/2001 | Miller |
| 2001/0047384 A1 * | 11/2001 | Croy ..................... G06Q 30/02 709/203 |
| 2002/0002491 A1 | 1/2002 | Whitfield et al. |
| 2002/0010631 A1 | 1/2002 | Sato et al. |
| 2002/0016736 A1 | 2/2002 | Cannon et al. |
| 2002/0063714 A1 | 5/2002 | Haas et al. |
| 2002/0077891 A1 * | 6/2002 | Castle et al. ...................... 705/14 |
| 2002/0112005 A1 | 8/2002 | Namias |
| 2002/0116494 A1 | 8/2002 | Kocol |
| 2002/0120564 A1 | 8/2002 | Strietzel |
| 2002/0124246 A1 | 9/2002 | Kaminsky et al. |
| 2002/0141584 A1 | 10/2002 | Razdan et al. |
| 2002/0147634 A1 | 10/2002 | Jacoby et al. |
| 2003/0004804 A1 | 1/2003 | Landsman et al. |
| 2003/0005000 A1 | 1/2003 | Landsman et al. |
| 2003/0023488 A1 | 1/2003 | Landsman et al. |
| 2003/0023489 A1 | 1/2003 | McGuire et al. |
| 2003/0050833 A1 | 3/2003 | Hamzy |
| 2003/0070182 A1 | 4/2003 | Pierre et al. |
| 2003/0163372 A1 | 8/2003 | Kolsy |
| 2003/0171985 A1 | 9/2003 | Prabhu et al. |
| 2003/0200145 A1 | 10/2003 | Krassner et al. |
| 2004/0030615 A1 | 2/2004 | Ling |
| 2004/0039754 A1 | 2/2004 | Harple, Jr. |
| 2004/0059683 A1 | 3/2004 | Epstein et al. |
| 2004/0103024 A1 | 5/2004 | Patel et al. |
| 2004/0103426 A1 | 5/2004 | Ludvig et al. |
| 2004/0117259 A1 | 6/2004 | Morrisoe et al. |
| 2004/0143667 A1 | 7/2004 | Jerome |
| 2004/0168184 A1 | 8/2004 | Steenkamp et al. |
| 2004/0186778 A1 | 9/2004 | Margiloff et al. |
| 2004/0205651 A1 | 10/2004 | Dutta |
| 2004/0260767 A1 * | 12/2004 | Kedem .................. G06Q 30/02 709/203 |
| 2005/0021642 A1 | 1/2005 | Nonaka |
| 2005/0033641 A1 | 2/2005 | Jha et al. |
| 2005/0038900 A1 | 2/2005 | Krassner et al. |
| 2005/0039130 A1 | 2/2005 | Paul |
| 2005/0055277 A1 | 3/2005 | Green et al. |
| 2005/0091160 A1 | 4/2005 | Kitze et al. |
| 2005/0091216 A1 | 4/2005 | Kranz et al. |
| 2005/0108095 A1 | 5/2005 | Perlmutter |
| 2005/0149396 A1 | 7/2005 | Horowitz et al. |
| 2005/0177401 A1 | 8/2005 | Koeppel |
| 2005/0182677 A1 | 8/2005 | Hill |
| 2005/0192871 A1 | 9/2005 | Galuten et al. |
| 2005/0204309 A1 | 9/2005 | Szeto |
| 2005/0289475 A1 | 12/2005 | Martin et al. |
| 2006/0136839 A1 | 6/2006 | Makela |
| 2006/0174199 A1 | 8/2006 | Soltis et al. |
| 2006/0224697 A1 | 10/2006 | Norris |
| 2006/6224445 | 10/2006 | Axe |
| 2006/0277481 A1 | 12/2006 | Forstall et al. |
| 2007/0033531 A1 * | 2/2007 | Marsh ........................... 715/738 |
| 2007/0118640 A1 | 5/2007 | Subramanian |
| 2007/0130602 A1 | 6/2007 | Gulli et al. |
| 2007/0150353 A1 | 6/2007 | Krassner et al. |
| 2007/0185763 A1 | 8/2007 | Miura et al. |
| 2007/0265923 A1 | 11/2007 | Krassner et al. |
| 2007/0282693 A1 | 12/2007 | Staib |
| 2008/0059571 A1 | 3/2008 | Khoo |
| 2008/0086368 A1 | 4/2008 | Bauman |
| 2010/0106715 A1 | 4/2010 | Byun |
| 2010/0275221 A1 | 10/2010 | Du Vall et al. |
| 2011/0307329 A1 | 12/2011 | Krassner et al. |

FOREIGN PATENT DOCUMENTS

| | | |
|---|---|---|
| JP | 2002-092475 | 3/2002 |
| JP | 2005165651 A1 | 6/2005 |
| JP | 2005182364 A1 | 7/2005 |
| JP | 200606583 A1 | 3/2006 |
| JP | 2006217654 A | 8/2006 |

(56) References Cited

FOREIGN PATENT DOCUMENTS

| JP | 2006252179 A | 9/2006 |
|---|---|---|
| JP | 2007533019 A | 11/2007 |
| JP | 2008198171 A | 8/2008 |
| WO | WO 00/73960 A1 | 12/2000 |
| WO | WO 2005-081155 | 9/2005 |

OTHER PUBLICATIONS

Grace, Jeremy, "Information and communication technologies and broad-based development of a partial review of the evidence," World Bank, Net Library, Inc., Wash., D.C.
Kofman, Vlad, "Implementing Dynamic Scroll with Ajax, JavaScript, and XML," Developer.com, Jun. 6, 2007, pp. 1-6, (Internet publication).
Kofman, Vlad, "Imlementing Dynamic Scroll with Ajax, JavaScript, and XML," Developer.com, Jun. 6, 2007, pp. 1-5 (Internet publication).
Luu, Teri (IPEA/US), PCT International Preliminary Report on Patentability, PCT Applic. No. PCT/US06/48805, pp. 1-7, dated Jan. 20, 2011, Alexandria, Virginia.
Dunn, Tom (IPEA/US), PCT International Preliminary Report on Patentability, PCT Applic. No. PCT/US09/05733, pp. 1-16, dated Jan. 5, 2011, Alexandria, Virginia.
EPO Communication, Reference No. DEP/57401EP1, Application No./Patent No. 06847919.5-2221/1964046 PCT/US2006048805, dated Dec. 6, 2012.
State Intellectual Property Office of the People's Republic of China, "Notification of the Third Office Action", dated Jan. 17, 2013.
State Intellectual Property Office of the People's Republic of China, "Text Portion of the Notification of the Third Office Action", dated Jan. 17, 2013.
Li, Ying, Examiner's First Report on Patent Application No. 2006331610, Australian Goverment-IP Australia, Australia, dated Jan. 7, 2011.
Office Action Summary (non-final) for U.S. Appl. No. 11/643,245, filed Dec. 21, 2006, for Inventor: Brad Krassner, dated Oct. 7, 2013.
Office Action Summary for U.S. Appl. No. 11/643,245, filed Dec. 21, 2006 for Inventor: Brad Krassner, dated Oct. 5, 2012.
Office Action Summary for U.S. Appl. No. 11/643,245, filed Dec. 21, 2006 for Inventor: Brad Krassner, dated Dec. 21, 2011.
Office Action Summary (final) for U.S. Appl. No. 11/643,245, filed Dec. 21, 2006 for Inventor: Brad Krassner, dated Apr. 12, 2010.
Office Action Summary (non-final) for U.S. Appl. No. 11/643,245, filed Dec. 21, 2006 for Inventor: Brad Krassner, dated Mar. 19, 2009.
Office Action Summary (final) for U.S. Appl. No. 11/643,245, filed Dec. 21, 2006 for Inventor: Brad Krassner, dated Sep. 4, 2008.
Office Action Summary (non-final) for U.S. Appl. No. 11/643,245, filed Dec. 21, 2006 for Inventor: Brad Krassner, dated Dec. 5, 2007.
Office Action Summary (non-final) for U.S. Appl. No. 11/803,779, filed May 16, 2007 for Inventor: Brad Krassner, dated Oct. 7, 2013.
Office Action Summary (final) for U.S. Appl. No. 11/803,779, filed May 16, 2007 for Inventor: Brad Krassner, dated Jul. 12, 2012.
Office Action Summary (non-final) for U.S. Appl. No, 11/803,779, filed May 16, 2007 for Inventor: Brad Krassner, dated Oct. 17, 2011.
Office Action Summary (final) for U.S. Appl. No. 11/803,779, filed May 16, 2007 for Inventor: Brad Krassner, dated Apr. 15, 2010.
Office Action Summary (non-final) for U.S. Appl. No. 11/803,779, filed May 16, 2007 for Inventor: Brad Krassner, dated Jul. 17, 2009.
Office Action Summary (non-final) for U.S. Appl. No. 11/803,779, filed May 16, 2007 for Inventor: Brad Krassner, dated Nov. 6, 2008.
Office Action Summary (non-final) for U.S. Appl. No. 11/803,779, filed May 16, 2007 for Inventor: Brad Krassner, dated Jan. 10, 2008.
Request for Continued Examination w/amendments for U.S. Appl. No. 11/643,245; RCE filed Jan. 7, 2013.
Response to Office Action for U.S. Appl. No. 11/643,245, dated Jun. 20, 2012.
Request for Continued Examination w/amendments U.S. Appl. No. 11/643,245; RCE filed Aug. 16, 2010.
Response to Office Action for U.S. Appl. No. 11/643,245, dated Aug. 5, 2009.
Request for Continued Examination w/amendments U.S. Appl. No. 11/643,245; RCE filed Feb. 6, 2009.
Response to Office Action for U.S. Appl. No. 11/643,245; dated May 2, 2008.
Request for Continued Examination w/amendments for U.S. Appl. No. 11/803,779; RCE filed Jan. 11, 2013.
Response to Office Action for U.S. Appl. No. 11/803,779; Response filed Apr. 17, 2012.
Response to Office Action for U.S. Appl. No. 11/803,779; Response filed Aug. 13, 2010.
Response to Office Action for U.S. Appl. No. 11/803,779; Response filed Jan. 14, 2010.
Response to Office Action for U.S. Appl. No. 11/803,779; Response filed Mar. 23, 2009.
Response to non-final Office Action for U.S. Appl. No. 11/803,779; Response filed Jul. 9, 2008.
USPTO Non-final Office Action, U.S. Appl. No. 11/803,779, filed May 16, 2007, Inventor: Brad Krassner et al., dated Jan. 10, 2008.
Response to Non-final Office Action, U.S. Appl. No. 11/803,779, Inventor: Brad Krassner et al., dated Feb. 7, 2014.
USPTO Final Office Action, U.S. Appl. No. 11/643,245, filed Dec. 21, 2006, Inventor: Brad Krassner et al., dated May 22, 2014.
Response to Non-Final Office Action, U.S. Appl. No. 11/643,245, Inventor: Brad Krassner et al., dated Feb. 7, 2014.
Notification of the Seventh Office Action issued by the State Intellectual Property Office of the People's Republic of China for Application No. or Patent No. 200680049027.3, dated Jul. 24, 2014.
Rejection Decision issued by the State Intellectual Property Office of the People's Republic of China for Application No. or Patent No. 200680049027.3, dated Nov. 24, 2014.
Notification of the Sixth Office Action issued by the State Intellectual Property Office of the People's Republic of China for Application No. or Patent No. 200680049027.3 (English), dated Apr. 3, 2014.
Notification of the Sixth Office Action issued by the State Intellectual Property Office of the People's Republic of China for Application No. or Patent No. 200680049027.3 (Chinese), dated Apr. 3, 2014.
Patent Examination Report No. 1 issued by the Australian Government for Patent Application No. 2013200392, dated Apr. 28, 2014.
Office Action of the European Patent Office—Germany, Communication pursuant to Article 94(3) EPC; Application No. 06 847 919.5-1958; Ref. DEP / 57401EP1, dated Oct. 16, 2015.
Office Action of the European Patent Office—Germany re: Summons to attend oral proceedings pursuant to Rule 115(1) EPC; Application No. 06847919.5-1958 / 1964046, Ref. DEP/57401EP1, dated Apr. 12, 2017.
B. Krassner, U.S. Appl. No. 11/643,245, Request for Continued Examination, dated Sep. 22, 2014.
B. Krassner, U.S. Appl. No. 11/643,245, Non-Final Office Action Summary, dated Sep. 24, 2015.
B. Krassner, U.S. Appl. No. 11/643,245, Response to Non-Final Office Action Summary, dated Feb. 24, 2016.
B. Krassner, U.S. Appl. No. 11/643,245, Final Office Action Summary, dated Apr. 5, 2016.
B. Krassner, U.S. Appl. No. 11/643,245, Notice of Appeal, dated Jul. 5, 2016.
B. Krassner, U.S. Appl. No. 11/803,779, Request for Continued Examination, dated Sep. 22, 2014.
B. Krassner, U.S. Appl. No. 11/803,779, Non-Final Office Action Summary, dated Sep. 24, 2015.
B. Krassner, U.S. Appl. No. 11/803,779, Response to Non-Final Office Action Summary, dated Feb. 24, 2016.
B. Krassner, U.S. Appl. No. 11/803,779, Final Office Action Summary, dated Apr. 5, 2016.
B. Krassner, U.S. Appl. No. 11/803,779, Notice of Appeal, dated Jul. 5, 2016.

(56) References Cited

OTHER PUBLICATIONS

China Patent Office Action relating to China Application No. 201410235959.3 (with Translation) dated Jul. 11, 2017 (this application shares inventorship and at least some subject matter with the present application).

EP Communication re Application 09 833 768.6-1870, dated Sep. 29, 2019 (this application shares inventorship and at least some subject matter with the present application).

T.Konagaya, et al., "Transmission Reduction by Partial Display of Web Page", 67'11 National Convention, Lecture Papers, Database and Media Network, Mar. 2, 2005, p. 155-156, Information Processing Society of Japan.

Office Action—JP 2018-163886, (this Japanese application is a child of Krassner U.S. Appl. No. 12/589,321 which is a CIP of Krassner U.S. Appl. No. 12/316,781, filed Dec. 16, 2008.).

JP Patent Office Action re JP Application 2014-172992 (with Translation) dated Aug. 4, 2015 (this application shares inventorship and at least some subject matter with the present application).

* cited by examiner

FIGURE 4

Dispatcher Database

| Record | Link to Rich Media Ad | Link to Go-to Page | Link to Click Go-to page | Link to Click Go-to page | Custom Parameter | Custom Parameter |
|---|---|---|---|---|---|---|
| 2 | | | | | | |
| 3 | | | | | | |
| 4 | | | | | | |
| 5 | | | | | | |

Pay-Per-Use Ad Content Licensing Process Flow

Advertisement Spot Auction Process Flow

FIGURE 7

Sign In
Registered User

User ID:
Password:
Remember me: ☐

Sign In

➤ Forgot Password?

Register
New Free Account

After your registration is complete your unique User ID cannot be changed, so please make sure you enter a User ID that you can live with. Your User ID will also be in the web address of your personal depot (For example, if your user id is john33 your personal depot will be located at www.3cdepot.com/john33.) With a direct link to your own personal depot you can easily send relatives, friends and customers directly to your items in the 3Cdepot or even link your depot to your personal website. Fields with (✱) are required.

Login

User ID:         ✱  ⎿_____⎿  Do not use spaces,
Password:        ✱  ⎿_____⎿  punctuation, or
Confirm Password: ✱ ⎿_____⎿  special characters
                              in either your User
                              ID or Password.

Name

First Name: ✱ ⎿_____⎿ MI: ⎿_⎿
Last Name:  ✱ ⎿_____⎿

Contact Information

Title:     ⎿_____⎿
Company:   ⎿_____⎿
Address:  ✱ ⎿_____⎿
Address 2: ⎿_____⎿
City:     ✱ ⎿_____⎿
State:    ✱ ⎿— Select State —▾⎿

FIGURE 8

Sign In
Registered User

User ID: _____
Password: _____
Remember me: ☐

[ Sign In ]

> Forgot Password?

Register
New Free Account

After your registration is complete your unique User ID cannot be changed, so please make sure you enter a User ID that you can live with. Your User ID will also be in the web address of your personal depot (For example, if your user id is john33 your personal depot will be located at www.3cdepot.com/john33.) With a direct link to your own personal depot you can easily send relatives, friends and customers directly to your items in the 3Cdepot or even link your depot to your personal website. Fields with (✻) are required.

Login

User ID: ✻ _____   Do not use spaces,
Password: ✻ _____   punctuation, or
Confirm Password: ✻ _____   special characters
                                in either your User
                                ID or Password.

Name

First Name: ✻ _____  MI: __
Last Name: ✻ _____

Contact Information

Title: _____
Company: _____
Address: ✻ _____
Address 2: _____
City: ✻ _____
State: ✻ [ — Select State — ▼ ]

FIGURE 9

| Create New Ad | My Rich Media Ads |

Guest Demo ◆ Mon, Dec 18, 2006

Ad Title | Ad Category | Ad Click Destination | Ad Size | Creative Format | RM Library | Build Ad

Ad Title

Enter Title for your Ad and click Continue. The title is for your reference so you can find, track, update, or delete this ad later.

Title: * [My First Ad]

Keywords and Maximum Bid Amount for Your Ad

Enter words or phrases in the fields below that you think others will use to look for your Product or Service. Feel free to use the words we've provided below, or change these words to the ones you prefer.

| Keywords | # of Ads Competing | Highest Bid | Best Click Through Rate | Your Ad Show Up % |
|---|---|---|---|---|
| Shoes | 0 | $0.00 | 0.00% | 100.00% |
| Boots | 0 | $0.00 | 0.00% | 100.00% |
| Sneakers | 0 | $0.00 | 0.00% | 100.00% |
|  | 0 | $0.00 | 0.00% | 0.00% |
|  | 0 | $0.00 | 0.00% | 0.00% |
|  | 0 | $0.00 | 0.00% | 0.00% |

If you place a bid that is more than required to win an ad placement and your ad will be clicked, you will only be charged $.01 higher than the next highest bid which protects you from ever bidding too much.

My Maximum Pay-Per-Click Bid: $ 0.10  [Test My Bid]

Based on your bid this ad will show up in average 100.00% of the time when people use these keywords.

[Save]

Select Target Categories

Select the categories that are relevant to the target market of your Ad. Imagine what people may be looking for that would be interested in your product or service.

- ○ Activity Partners
- ○ Antique
- ○ Art
- ○ Home & Garden
- ○ Baby & Children
- ○ Blogs
- ○ Boats
- ○ Books & Magazines
- ○ Business & Industrial Products
- ○ Business Services
- ○ Cameras & Photos
- ○ Cars & Passenger Vehicles
- ○ Cell Phones
- ○ Clothing, Shoes & Accessories
- ⦿ Coins
- ○ Collectibles
- ○ Community Calendar
- ○ Computers & Networking
- ○ Consumer Electronics
- ○ Crafts
- ○ Dolls & Bears
- ○ DVDs, Video & Movies
- ○ Education & Learning
- ○ Entertainment Memorabilia
- ○ Estate Sale
- ○ Food & Beverage
- ○ Garage Sale
- ○ General Community Info
- ○ General Items & Merchandise
- ○ Gift Certificates
- ⦿ Health & Beauty
- ○ Home & Garden
- ○ Information Products
- ○ Jewelry & Watches
- ○ Jobs, Employment & Resumes
- ⦿ Miscellaneous Vehicles
- ○ Motorcycles
- ○ Music
- ○ Musical Instruments
- ○ Personals
- ○ Pets
- ○ Pottery & Glass
- ⦿ Real Estate & Housing
- ⦿ Specialty Services
- ⦿ Sporting Goods
- ⦿ Sports Memorabelia & Fan Shop
- ○ Stamps
- ○ Ticket Events & Free Events
- ⦿ Toys & Hobbies
- ○ Trading Post
- ○ Travel and Leisure
- ⦿ Vehicle Parts & Accessories
- ○ Video Games
- ⦿ Wanted

FIGURE 21

Provide Credit Information

The 3Cdepot will extend credit to you. Please enter your credit card information below to authorize your credit information and activate your ad(s).

PLEASE NOTE: You will not be charged in advance for your advertising. You are not required to deposit funds into an advertising escrow account. Your credit card will only be charged at the end of each 30 day period based on the actual performance of your Ad(s). There is a one-time, non-refundable, activation fee of $5.00 to begin using 3Cdepot ads.

Name (as it appears on card): ✱ [ 555 5555 5555 ]

Card Type: ✱ [ Visa ⟩ ]

Card Number: ✱ [           ]

Card Expiration: ✱ [ 02 ⟩ ] [ 2010 ⟩ ]

✱ ☑ I agree to the 3Cdepot Terms of Use

Submit

FIGURE 22

| My Websites | My Billboards | Create New Billboard |

Guest Demo ♦ Mon, Dec 18, 2006

View Websites | New Website Registration

Website Registration

To place a Power-Billboard you must have at least one website registered. You may register as many websites or different hosts as you like. You may also register different areas within a website to organize your tracking information more efficiently. Uploading a website logo is not mandatory but is recommended if you are planning to place interstitial billboards (Interstitial billboards run between web pages.) With interstitials, the website logo is displayed in the skip text of the advertisement. Logos must be in GIF, JPG or PNG formats with a maximum size of 80 px by 800 px.

Website Name: ✱ [My Website]

Logo Image: [\\fs01\users\alane\My Pictures\3cdepo] [Browse...]

[Save]

FIGURE 23

| My Websites | My Billboards | Create New Billboard |

Guest Demo • Mon, Dec 18, 2006

Billboard ID

Power-Billboard ID

Enter an ID for your Power-Billboard and click Continue. The Billboard ID is for your reference so you can find, track or update this Power-Billboard later. (For adswap program you have to place Billboard on your site)

Billboard ID: * [Billboard 1]

Website: [My Website]

Billboard 1 Power-Billboard Targets

To optimize your revenue select one or more target categories to associate with your Power-Billboard by checking Set priority category, then selecting categories from the category list. Imagine what people that visit your website might be most interested in. Check Best Value Ads if you would like 3C depot/RMW Network technology to evaluate and deliver the best ads to display on your page. Select both if you would like 3C depot/RMW Network technology to select the best ads for your page in specific categories only. When you are done click Save and Get Code.

☐ Best Value Ads
☑ Set Category Priority

| | | |
|---|---|---|
| ☐ Activity Partners | ☐ Consumer Electronics | ☐ Motorcycles |
| ☐ Antique | ☑ Crafts | ☐ Music |
| ☐ Art | ☐ Dolls & Bears | ☐ Musical Instruments |
| ☑ Home & Garden | ☐ DVDs, Video & Movies | ☐ Personals |
| ☐ Baby & Children | ☐ Education & Learning | ☐ Pets |
| ☐ Blogs | ☐ Entertainment Memorabilia | ☐ Pottery & Glass |
| ☐ Boats | ☐ Estate Sale | ☑ Real Estate & Housing |
| ☐ Books & Magazines | ☐ Food & Beverage | ☐ Specialty Services |
| ☐ Business & Industrial Products | ☐ Garage Sale | ☐ Sporting Goods |
| ☐ Business Services | ☐ General Community Info | ☐ Sports Memorabelia & Fan Shop |
| ☐ Cameras & Photos | ☐ General Items & Merchandise | ☐ Stamps |
| ☐ Cars & Passenger Vehicles | ☐ Gift Certificates | ☐ Ticket Events & Free Events |
| ☑ Cell Phones | ☐ Health & Beauty | ☐ Toys & Hobbies |
| ☐ Clothing, Shoes & Accessories | ☐ Home & Garden | ☐ Trading Post |
| ☐ Coins | ☐ Information Products | ☐ Travel and Leisure |
| ☐ Collectibles | ☐ Jewelry & Watches | ☐ Vehicle Parts & Accessories |

FIGURE 29

Enter Skip/Destination URL

Skip/Destination URL: This is the URL of the page you would like viewers to go to if they skip or watch the entire ad. It must be fully qualified absolute URL like "http://www.yourwebsite.com/destinationpage.html".
Skip Message: This message will be on the top of the interstitial screen.

Skip/Destination URL:  * www.mywebsite.com/news

Skip Message:  Please enjoy this message or Click Here to Skip... [x]

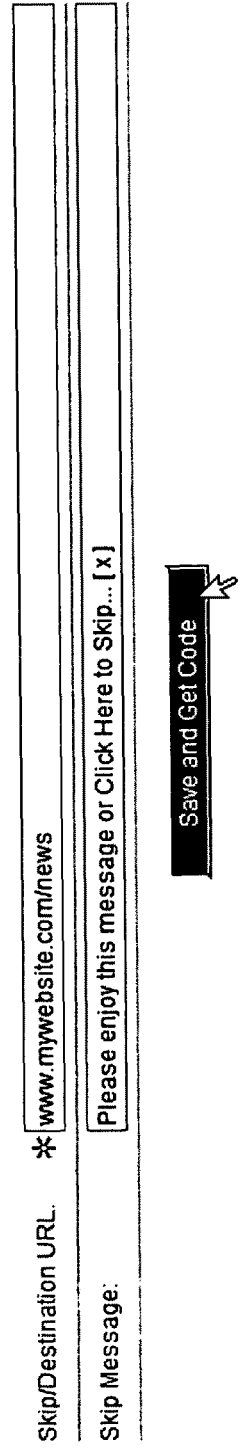

Get Code for Billboard 1

Copy and paste the code below into the web page that you would like this Power-Billboard to be displayed in.

Create New Power-Billboard    View My Billboards

| Unique | Template File | Name | Heading | Line 1 | Line 2 | Picture | Price | CPC Bid | Keywords |
|---|---|---|---|---|---|---|---|---|---|
| 9291 | Path | DIRTECH MONGOOSE MASHER | Charming 24 58mm BCD | WARRANTY | | Path | 234 | 0.05 | Mountain bike, Bicycle |
| 9292 | Path | Gag Fisher Tassajare 8" | Custom Aluminum-Clean! | Totally Like NEW | | Path | 789 | 1 | Mountain bike, Bicycle |
| 9293 | Path | Kleh 21-Speed Mountain Bike | Som 9.0 Mountain Bike Grip | WARRANTY | | Path | 484 | 0.25 | Mountain bike, Bicycle |
| 9294 | Path | SET OF 2 MOUNTAIN BIKE | 19" Silver and Blue | Totally like NEW | | Path | 457 | 0.67 | Mountain bike, Bicycle |
| 9295 | Path | Mountain Bike | Large Selection of Bikes | Click Here | | Path | | $8 | Mountain bike, Bicycle |
| 9296 | Path | NEW MOUNTAIN BIKE | VIPOCKSHOX 24-Speed | WARRANTY | | Path | 367 | 1 | Mountain bike, Bicycle |
| 9297 | Path | SCHWINN SIDEWINDER 2.6 | Mountain Bike not road bike | Click Here | | Path | | 0.45 | Mountain bike, Bicycle |

FIGURE 34

Click Daily Stats under the Ad Title to monitor that Ad's performance. Click an Ad title to edit the ad content, keywords, maximum bid and daily budget for the Ad. Click Advertising Budget Remaining to update your overall advertising budget.
NOTE: Deactivated ads are Red colored.

find: | All | ⮞ | | Go | Advertising Budget Remaining: $800.00

Ads 1 to 10 of 10 | 20 ⮞ | per page ordered by: | Start Date ⮞ | Descending ⮞

[10 postings] 1

| Title | Ad Type | Start Date ∧ | End Date | Bid | Views # | Clicks # | ClickTru % | Spent $ | |
|---|---|---|---|---|---|---|---|---|---|
| test2<br>daily stats | Rich Media | Mon, Dec 18, 2006 | Wed, Dec 13, 2006 | $0.10 | 0 | 0 | 0% | $0.00 | 🛑 |
| Lufthansa<br>daily stats | Rich Media | Mon, Dec 18, 2006 | Wed, Dec 13, 2006 | $0.10 | 0 | 0 | 0% | $0.00 | ☐ |
| 2342<br>daily stats | Rich Media | Fri, Dec 15, 2006 | Wed, Dec 13, 2006 | $0.00 | 0 | 0 | 0% | $0.00 | ☐ |
| 1231<br>daily stats | Rich Media | Mon, Dec 11, 2006 | Wed, Dec 13, 2006 | $0.10 | 0 | 0 | 0% | $0.00 | ⮞ |
| 1231<br>daily stats | Rich Media | Mon, Dec 11, 2006 | Wed, Dec 13, 2006 | $0.00 | 0 | 0 | 0% | $0.00 | ⮞ |
| asdas<br>daily stats | Rich Media | Mon, Dec 11, 2006 | Wed, Dec 13, 2006 | $0.10 | 0 | 0 | 0% | $0.00 | ⮞ |
| 1231<br>daily stats | Rich Media | Sun, Dec 03, 2006 | Wed, Dec 13, 2006 | $0.05 | 0 | 0 | 0% | $0.00 | ⮞ |
| adasd<br>daily stats | Rich Media | Thu, Nov 30, 2006 | Wed, Dec 13, 2006 | $0.00 | 10 | 0 | 0% | $0.00 | ⮞ |
| 2342<br>daily stats | 3Cdepot-Ad | Mon, Oct 09, 2006 | Thu, Nov 02, 2006 | $0.05 | 0 | 0 | 0% | $0.00 | ⮞ |
| ad one<br>daily stats | Rich Media | Mon, Oct 09, 2006 | Wed, Jul 19, 2006 | $0.00 | 107 | 0 | 0% | $0.00 | ⮞ |

FIGURE 35

DORMONT 1BR beautiful ...

Instant-Ad Created:                                          Oct 9 2006 11:42AM
Total Number of Views during selected period:                0
Total Number of Clicks during selected period:               0
Average Clickthrough rate during selected period:            0.00%
Average Bid during selected period:                          $0.00
Total Spent:                                                 $0.00

From Date: 11 / 18 / 2006 »
To Date: 12 / 18 / 2006 » Go

| Date | Views | Clicks | Click Throug % | Average Bid | Total Spent |
|---|---|---|---|---|---|
| Mon, Dec 18, 2006 | | | | | $0.00 |
| Sun, Dec 17, 2006 | 0 | 0 | 0% | $0.00 | $0.00 |
| Sat, Dec 16, 2006 | 0 | 0 | 0% | $0.00 | $0.00 |
| Fri, Dec 15, 2006 | 0 | 0 | 0% | $0.00 | $0.00 |
| Thu, Dec 14, 2006 | 0 | 0 | 0% | $0.00 | $0.00 |
| Wed, Dec 13, 2006 | 0 | 0 | 0% | $0.00 | $0.00 |
| Tue, Dec 12, 2006 | 0 | 0 | 0% | $0.00 | $0.00 |
| Mon, Dec 11, 2006 | 0 | 0 | 0% | $0.00 | $0.00 |
| Sun, Dec 10, 2006 | 0 | 0 | 0% | $0.00 | $0.00 |
| Sat, Dec 09, 2006 | 0 | 0 | 0% | $0.00 | $0.00 |
| Fri, Dec 08, 2006 | 0 | 0 | 0% | $0.00 | $0.00 |
| Thu, Dec 07, 2006 | 0 | 0 | 0% | $0.00 | $0.00 |
| Wed, Dec 06, 2006 | 0 | 0 | 0% | $0.00 | $0.00 |
| Tue, Dec 05, 2006 | 0 | 0 | 0% | $0.00 | $0.00 |
| Mon, Dec 04, 2006 | 0 | 0 | 0% | $0.00 | $0.00 |

AD SWAP PROGRAM

Select New or Existing Power Billboard for your Ad Swap. This billboard will be placed on your website and can 3D export advertising ○ Swap new Power-Billboard
○ Swap existing Power-Billboard

FIGURE 49

New1 Power-Billboard Targets

To optimize your revenue select one or more target categories to associate with your Power-Billboard by checking Set priority category, then selecting categories from the category list. Imagine what people that visit your website might be most interested in. Check Best Value Ads if you would like 3C depot/RMW Network technology to evaluate and deliver the best ads to display on your page. Select both if you would like 3C depot/RMW Network technology to select the best ads for your page in specific categories only. When you are done click Save and Get Code.

☐ Best Value Ads
☑ Set Category Priority

| | | |
|---|---|---|
| ☐ Activity Partners | ☑ Computers & Networking | ☐ Miscellaneous Vehicles |
| ☐ Aircraft | ☑ Consumer Electronics | ☐ Motorcycles |
| ☐ Antique | ☐ Crafts | ☐ Music |
| ☐ Appliances | ☐ Dolls & Bears | ☑ Musical Instruments |
| ☐ Art | ☐ DVDs, Video & Movies | ☐ Personals |
| ☐ Baby & Children | ☐ Education & Learning | ☐ Pets |
| ☐ Blogs | ☐ Entertainment Memorabilia | ☐ Pottery & Glass |
| ☐ Boats | ☐ Estate Sale | ☐ Real Estate & Housing |
| ☐ Books & Magazines | ☐ Food & Beverage | ☐ Specialty Services |
| ☐ Business & Industrial Products | ☐ Garage Sale | ☐ Sporting Goods |

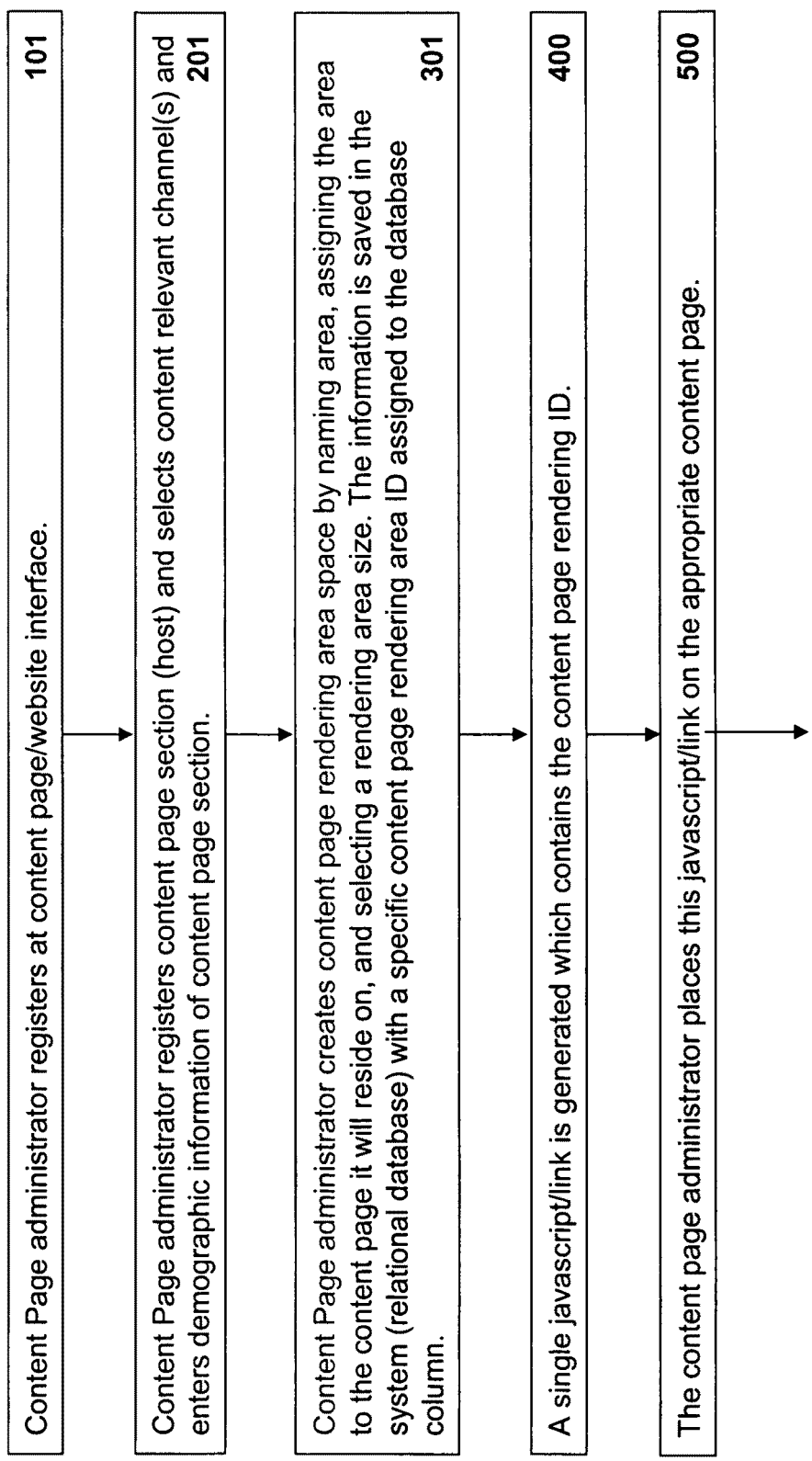
FIG. 54-A

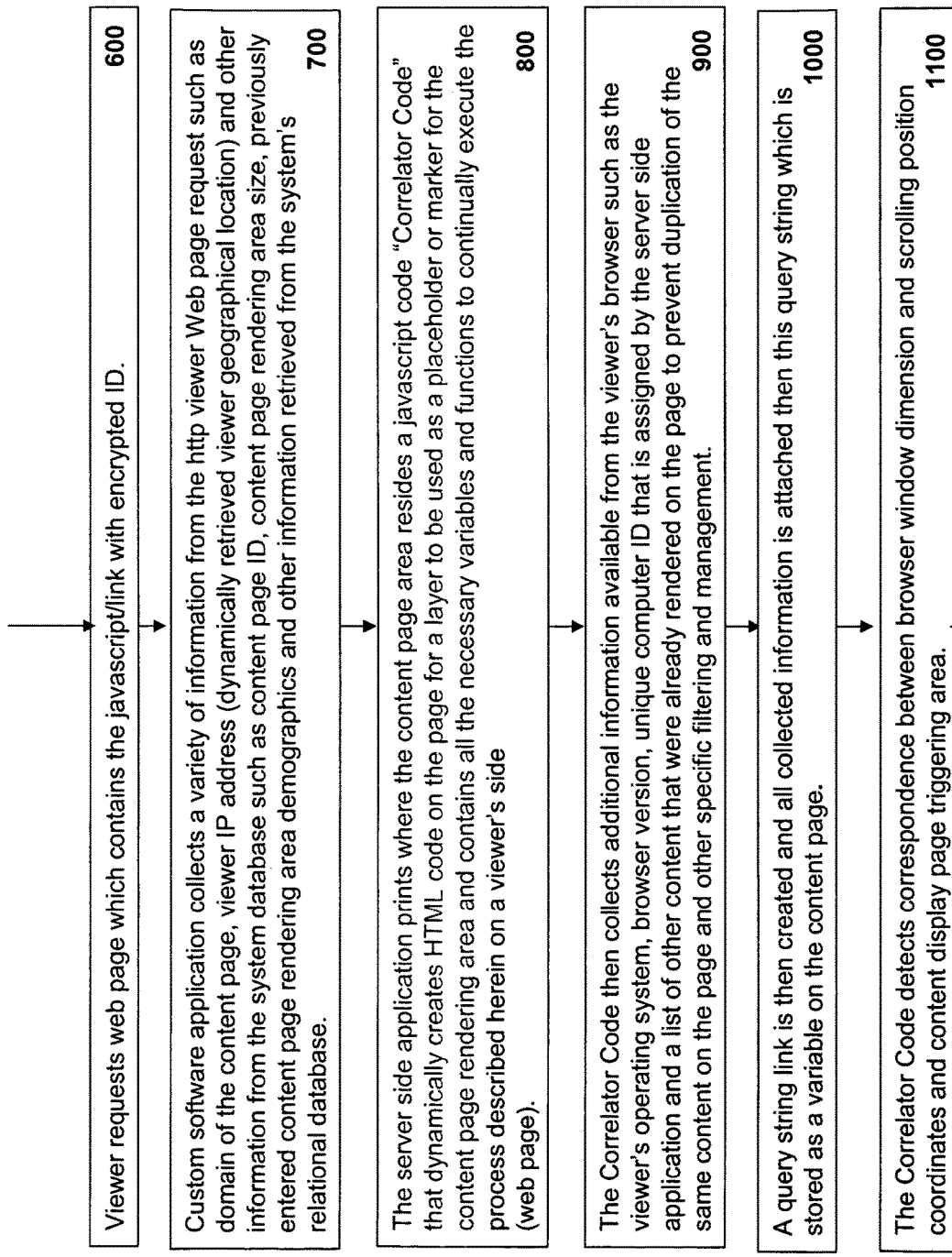
FIG. 54-B

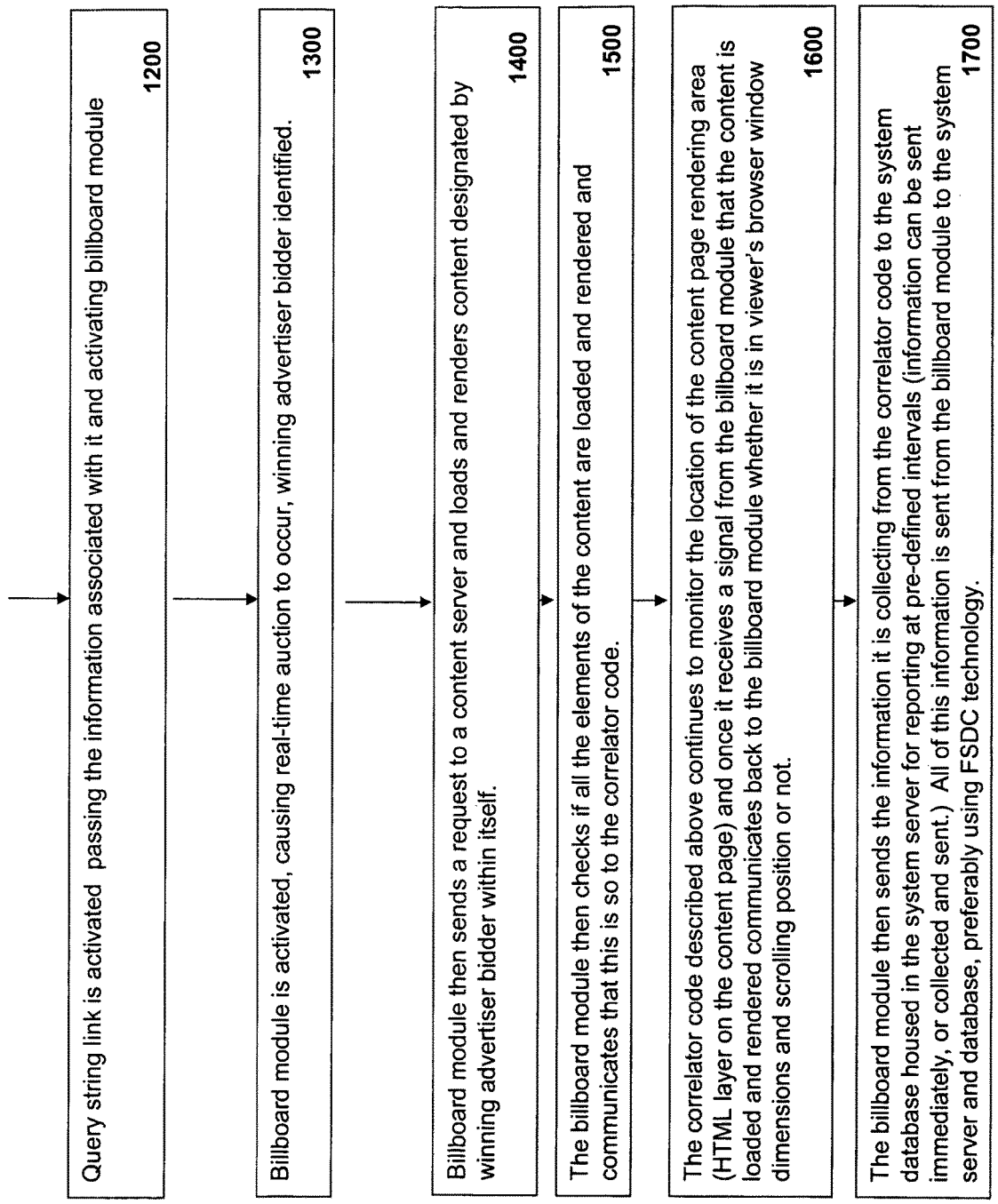
FIG. 54-C

FIG. 56 register new account

Referred by (website): [          ]

Login
User ID: ◆ [          ]
Password: ◆ [          ]
Confirm Password: ◆ [          ]

Name
First Name: ◆ [          ] MI: [  ]
Last Name: ◆ [          ]

Contact Information
Title: [          ]
Company: ◆ [          ]
Address: ◆ [          ]
Address 2: [          ]
City: ◆ [          ]
State/Province: ◆ [-- Select State --]
Zip Code: ◆ [     ]
Phone: ◆ [          ]
Fax: [          ]
Website: [          ]
E-mail: ◆ [          ]
Confirm E-mail: ◆ [          ]

About Your Business
Business Type: ◆ [          ]
Company Size: ◆ [-- Select --]
Company Revenue: ◆ [-- Select --]
How did you learn about: [-- Select --]

◆ ☐ I agree to the    Terms of Use and Network Affiliate Agreement

[ submit ]

Select region that best represent your website's (website section) content. Select as many regions as you feel appropriate, or Not Regional if your website is not bed to any specific region or local business.

Defined Region:
☑ Pittsburgh-New Castle, PA

☐ Complete Network (Show ads based on a viewer location)

[Find]

A B C D E F G H I J K L M N O P Q R S T U V W X Y Z

☐ Aberdeen, SD            ☐ Alexandria, MN
☐ Aberdeen, WA            ☐ Alice, TX
☐ Abilene, TX             ☐ Allentown-Bethlehem-Easton, PA-NJ
☐ Ada, OK                 ☐ Alma, MI
☐ Adjuntas, PR            ☐ Alpena, MI
☐ Adnan, MI               ☐ Altoona, PA
☐ Aguadilla-Isabela-San Sebastin, PR   ☐ Altus, OK
☐ Alamogordo, NM          ☐ Amarillo, TX
☐ Albany, GA              ☐ Americus, GA
☐ Albany-Corvallis-Lebanon, OR   ☐ Ames-Boone, IA
☐ Albany-Schenectady-Amsterdam, NY   ☐ Anchorage, AK
☐ Albert Lea, MN          ☐ Andrews, TX
☐ Albertmlle, AL          ☐ Angola, IN
☐ Albuquerque, NM         ☐ Anniston-Oxford, AL
☐ Alexandria, LA          ☐ Appleton-Oshkosh-Neenah, WI

FIG. 59

Select Channel(s) for www.3cdepot.com

→ Attributes → Region → Channel → Demographics

Select channels that best represent your website's (website section) content. Selecting the right channels here will help the CityAds Dispatcher target advertising that is most interesting to your viewers. Select as many channels as you feel appropriate.

| | |
|---|---|
| ☐ Adult | ☐ Men's |
| ☑ Arts & Hobbies | ☐ Music |
| ☐ Automotive | ☐ Pets & Animals |
| ☑ Business & Finance | ☐ Real Estate |
| ☐ Culture & Society | ☐ Restaurants, Wine & Food |
| ☐ Education & Employment | ☑ Retail |
| ☐ Entertainment | ☐ Social Networking |
| ☐ Family & Parenting | ☐ Sports |
| ☐ Games | ☐ Tech |
| ☐ Health & Fitness | ☐ Teen |
| ☐ Kids | ☐ Travel & Hotels |
| ☐ Media, News & Info | ☐ Women's |

[ Back ]    [ Continue ]

My Websites

The websites you have registered are listed below. To edit a website's information, click on the website name. To create and place a new billboard click Create New Billboard above. To view tracking data on each of your billboards click on the number in the billboard # column below or My Billboard above.

[_____] [FIND]

Report Period: [Mon, Nov 24, 08 - Now ▼]

| Website ↓ | Date Created | Billboards # | CPM Views # | Actual (CPV) Views # | Ad View Rate | Total Clicks # | Click Rate | Video Watched # | Earned Views # | Earned Credits |
|---|---|---|---|---|---|---|---|---|---|---|
| kdka.com/entertainment | Mon, Aug 04, 08 | 3 | 124,392 | 6,401 | 5.15% | 260 | 4.0619% | 153 | 0 | 24,298 |
| www.kjzz.com | Fri, May 02, 08 | 11 | 79,122 | 21,197 | 26.79% | 844 | 3.9817% | 480 | 0 | 2,703 |

Display [20 ▼] records per page.

FIG. 72

My Billboards

Here are the CityAds billboards you have created. Click on a billboard name to copy and paste the billboard code to your website. You can also track billboard statistics here including views and earned credits. Sort billboards by website using the website drop down and search for billboards by name with the find field. Sort statistics for better analysis by clicking on the column names.

—All Websites— ▼ [         ] FIND    Broadcast: All Billboards ▼    Period: 11/24/2008 - Now ▼

| Billboard Name ↓ | Size | Date Created | CPM Views # | Billboard Loads # | Ads Rendered # Partial Views | CPV Views # | Ad Views Rate | Total Clicks # | Click Rate | Video Watched # | Earned Views # | Earned Credits |
|---|---|---|---|---|---|---|---|---|---|---|---|---|
| Bonnie Hunt [1] | 300 x 250 px | Thu, Aug 14, 08 | 1,801 | 314 | 274 | 521 | 28.93% | 107 | 20.537% | 70 | 0 | •0 |
| Bottom Leaderboard | 728 x 90 px | Thu, May 15, 08 | 122,578 | 26,224 | 6,331 | 5,872 | 4.79% | 153 | 2.6056% | 83 | 0 | •24,298 |
| Cooking Delight [1] | 300 x 250 px | Fri, Jul 18, 08 | 1,431 | 376 | 329 | 603 | 42.14% | 145 | 24.0464% | 83 | 0 | •0 |
| Cooking Delight [2] | 300 x 250 px | Tue, Sep 30, 08 | 13 | 0 | 0 | 8 | 61.54% | 0 | | 0 | 0 | •0 |
| erwe | 728 x 90 px | Thu, Oct 30, 08 | 0 | 0 | 0 | 0 | | 0 | | 0 | 0 | •0 |
| HomePage | 300 x 250 px | Thu, May 15, 08 | 38,071 | 10,542 | 9,120 | 1,722 | 4.52% | 245 | 14.2276% | 141 | 0 | •2,703 |
| Internal Rotating My ADS ONLY | 300 x 250 px | Wed, May 28, 08 | 13,980 | 1,027 | 934 | 7,151 | 51.15% | 63 | 0.8810% | 35 | 0 | •0 |
| Joseph Smith Papers [1] | 300 x 250 px | Thu, May 15, 08 | 3,227 | 1,124 | 982 | 1,419 | 43.97% | 112 | 7.8929% | 96 | 0 | •0 |
| KJZZ Cafe | 300 x 250 px | Thu, May 15, 08 | 7,447 | 595 | 530 | 2,685 | 36.05% | 139 | 5.1769% | 69 | 0 | •0 |
| Maverik KickStart [1] | 300 x 250 px | Mon, Jun 02, 08 | 0 | 0 | 0 | 0 | | 0 | | 0 | 0 | •0 |

FIG. 73

SYSTEM AND METHOD FOR CREATION, DISTRIBUTION AND TRACKING OF ADVERTISING VIA ELECTRONIC NETWORKS

CONTINUITY/PRIORITY INFORMATION

This application is a continuation in part of U.S. Nonprovisional patent application Ser. No. 11/803,779 filed on May 16, 2007 now U.S. Pat. No. 10,380,602, which in turn is a continuation in part of U.S. Nonprovisional patent application Ser. No. 11/643,245 filed on Dec. 21, 2006 now U.S. Pat. No. 10,380,597, which is based upon and claims priority back to U.S. Provisional Patent Application Ser. No. 60/753,536 filed on Dec. 24, 2005, the entirety of each of which is incorporated herein by reference. The benefit of the earlier filing date of co-pending Nonprovisional patent application Ser. No. 11/803,779 filed on May 16, 2007 is claimed pursuant to 35 U.S.C. Section 120; the benefit of the earlier filing date of co-pending Nonprovisional patent application Ser. No. 11/643,245 filed on Dec. 21, 2006 is claimed pursuant to 35 U.S.C. Section 120; and the benefit of the earlier filing date of provisional patent application Ser. No. 60/753,536 filed on Dec. 24, 2005 is claimed pursuant to 35 U.S.C. Section 119(e). This application is also a continuation in part of co-pending Nonprovisional patent application Ser. No. 12/316,781 filed on Dec. 15, 2008, the entirety of which is incorporated herein by reference, and the benefit of the earlier filing date of which is claimed pursuant to 35 U.S.C. Section 120.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

A. Technical Field

The present invention relates generally to methods and systems for creation and distribution of advertising, promotional and informational electronic communications regarding products and services via computer and communication networks, and displaying same at desired locations. More specifically, the present invention is a system and method for creation of electronic advertisements using digital content made available for licensing, and placing the ads at desired network locations utilizing an auction of designated advertising space at desired locations on a network. The system can be used to provide an ad content as well as an ad space exchange for content licensors, advertisers and ad publishers, including barter-based implementations.

B. Background

Advertisers seeking the global reach of the Internet and other electronic networks as an effective and efficient medium for disseminating advertisements to consumers have had to deal with various limitations in technology and methods. From the advertiser's perspective, there are two main tasks to accomplish: 1) creation of an effective ad; and 2) effective placement of the ad. From the ad publisher's perspective there are also two main tasks to accomplish: 1) display of the highest revenue-producing ads; and 2) reducing the amount of work necessary to place, maintain, track and process payments for advertising. The creation of electronic advertising content can be an expensive task for those that take the traditional route of either creating content internally or engaging a third party contractor to create same. While there are sources of pre-existing electronic content that can be used in exchange for payment of a fee, because of content provider system limitations in the ability to track usage activity with respect to the content, usually the fee is a flat fee payable up front, which makes the use of such content an expense that users must incur beforehand. This method does not allow for optimization of return on investment, or "ROI," with respect to ads based on real-time ad response, because if the advertising content is not working effectively, to change the content would mean losing all invested in the purchase of that content. This also can result in content licensors not maximizing the revenues generated from their content.

Effective placement of an ad is crucial for success of any ad campaign. The ad must reach the proper audience and as large an audience as possible in order to maximize the effectiveness of the ad in generating business for the advertiser. Ad display space costs money as well, and advertisers therefore need to make sure that the display locations they select for their ads produce an acceptable ROI to be worthwhile. In the case of the Internet, which is dominated by a large number of personal and special interest websites with relatively low traffic, a simple method for publishers to place advertising on their web sites for optimal return is necessary. Internet advertising charging methods include the pre-pay or billed cost-per-impression, or "CPM," or cost-per-click, or "CPC," models, wherein advertisers pay publishers to place their advertisements on a website according to the number of impressions served, or click actions taken on the advertisement. Usually these transactions are done through a third party agency who receives commissions based on a percentage agency discount offered by the publisher.

SUMMARY OF THE INVENTION

The present invention is a system and method for creating electronic advertisements using licensed digital content, and distributing such advertisements for display at desired network locations, including on multiple networks (such as, without limitation, computer networks such as the Internet as well as cellular, wireless, cable, satellite and other networks), whereby the ad to be displayed at a particular network location is selected from a group of ads that reference the same keyword or category and network location via an auction when the display location is acted upon by a network user/ad viewer. The digital content is delivered to designated advertising locations on the network and becomes part of an advertising display composed at the time requested by the network user/ad viewer by using a relational database for storing data required for commands that execute retrieval, assembly and dispatching of the licensed digital content files previously stored in one or more servers, as well as messaging, tracking, display, and billing for both use of the licensed content and display of the ad at the designated location on a cost-per-use basis. Third parties that make their digital content available for licensing and the publishers that display the advertisements on their network locations are automatically paid via the system each time an ad is displayed using their content and ad space, respectively. Ad publishers can participate in a barter-based ad exchange network wherein ad publishers can exchange advertising impressions/views in their publication (whether online or other) for impressions/views of their advertisements via the network. The system and method provides the ability for both publishers and advertisers to optimize the benefits of creating and distributing advertisements electronically, and manage and track every aspect of the advertisement creation and distribution process.

The present invention provides ad publishers with the ability to automatically accept placement of advertising at their network locations by providing a display space module, or "billboard module" that can be easily embedded at the network location where the ad will be displayed, such as, for example, on the ad publisher's web page(s) or, installed in cellular phone or a variety of other network devices that display advertising. This "billboard module" is associated with categories or keywords and communicates with a central dispatcher server that selects advertising and provides instructions to render the advertising in the module.

The present invention allows advertisers to create their own advertisements and license quality third party digital content for use in creating their advertisements (and also for content creators and providers to market their content) with payment for licensing of such third party content and ad distribution based on a cost-per-click, cost-per-impression or other pay-as-used scheme and with clicks/usage of the licensed ad content being accurately trackable. The advertisers can then associate topic keywords with the ads and include a bid for the display of the ad at desired network locations such as in specified areas of websites, search engines, portals or other network location display screens, in response to the "billboard module" being requested or otherwise acted upon. An advertiser can first create a custom advertisement using both content licensed from third parties made available for selection via the system, or use the advertiser's own content, with the instructions being stored in a database to execute and run the created advertisement at a desired location of a website, search engine or other network location when requested. The data stored in the database file for the ad with the rest of the ad execution instructions includes the cost-per-click, cost-per-impression or other charge rates for the licensed content used in the ad, which is the amount that the advertiser will be charged for using the licensed content each time the content is displayed to a user as part of the advertisement. The data stored in the database can also include the cost-per-click or other amount that the advertiser "bids" for display of the advertisement at certain locations on the website, search engine user search results screen, or other network location display screen when specified topic keywords are used as search queries. The system selects the advertisement to display in a designated ad space by conducting a real-time auction based at least in part on the bids placed by the advertisers for display of their ad at the location. The auction can also be based at least in part on the parameters of the advertisements, including, but not limited to, click-through rate, ad space size, display region and ad type. The auction is conducted immediately upon the request and initiation of the "billboard module" by a network user/ad viewer. If the advertisement is meant to display on a web page, the auction will begin when the web page containing the embedded billboard module is served. Like any page on the Internet, this page may be requested in a variety ways, including entering a URL address in a browser URL field, initiating a search by entering a specified search term in a search engine website, or clicking on the specified link, button or other symbol on any web advertising or content. In the case of search engines, the auctioned ad space is preferably space on the user query search results page other than in the actual search results list, which distinguishes the present invention's auction from those often used with respect to the preferred placement of advertiser listings in search results listings. In fact, present invention's method of auctioning ad space operates completely independently of any search engine query operation; the auction of ad space can be implemented with respect to any ad space, not just space on a search engine screen. Also, ads may be displayed after a search query that have no direct relationship to the search query keywords, making it possible for publishers to display second generation relevant ads. For example, when someone searches for bathing suits, an ad may appear for a diet product, because the ad module on the search result page contained "diet" as a topic keyword. The module may be placed in cell phones or physical electronic billboards presenting advertising as a result of auctions initiated at certain times of the day or when a phone is opened, or based on other customizable parameters. This also can prevent publishers from running advertisements of their competitors, which is something that was not accomplishable under current keyword advertising systems.

The auction comparison can take into a account various customizable parameters to select the ad to be displayed at a designated location, including without limitation, topic keywords, categories, the advertisers' CPC/CPM bids and the ads' click-through, as well as the cost-per-click, cost-per-impression or other cost-per-use license fee for the licensed content comprising the ad. Actual ad parameters such as ad size, ad type, geographic display region, click-through rate and other parameters can also be used in the auction to select the ad to be displayed.

The system's relational database, housed preferably in a dispatcher server, contains data files with the parameters and execution instructions for ads, and each ad parameter file has a unique identifier. The advertising space module or "billboard module," is preferably of the .swf format, or .net, .asp, AJAX and consists of code placed at the ad display location that triggers ad file selection auction and display of the selected ad when acted upon. The billboard module may be embedded as an object in a web page of a website, search engine or other network location, or used in a self-contained device, such as a cellular phone or other mobile device or electronic billboard. When requested or otherwise acted upon by the viewer, the billboard module communicates with the remote dispatcher server where the relational database is located. The relational database has all the information necessary to run the auction of available advertisements and then retrieve, assemble and present the advertising content of the auction winner to the viewer of the designated billboard module. The billboard module can contain instructions, including ad space size location and keywords associated with the ad space and may display more than one ad simultaneously or rotate different advertising in the same ad space. The keywords associated with the advertising space may be entered into the billboard module in a variety of ways, including manually by a webmaster, or dynamically, such as when a search engine user enters the keyword as a query, in which event the keyword is passed to the billboard module at the time the search is executed.

The present system provides publishers with an account where they can enter information including their preferred method of receiving payment, address, and other relevant information. Publishers are also provided the opportunity to select ad size parameters, enter keywords or select categories to associate with their ad space. The system then generates the instructions and or the code necessary to embed a billboard module at the publisher's ad space. In the case of a website with search functionality, instructions will be generated on embedding the module so search query words are automatically passed to the module. The publisher is also given an interface to view metadata associated with the billboard module's activity, including clicks, impressions, and amount owed.

The present system provides advertisers with an account where they can enter instructions to select ad content from a variety of third party owned digital media and put together an electronic ad. Here they can also create customized advertising content and their advertising campaign by entering keywords to associate with the advertisement, the ad display locations desired and the CPC/CPM bid for display of the ad at such locations, regional targeting information or other parameters. Advertisers are also provided an account to deposit funds that is drawn upon based on their advertising activity. They are also provided an interface where they can view real-time metadata on the advertising campaign activity, including clicks, views, and amount paid.

The system is intended to be used by advertisers to create and place advertisements on third party websites, search engines and other network locations. The system's existence and operation is not apparent to end user/consumer who is the intended viewer of the advertisements. The system serves the advertisement files in addition to tracking impressions and click through rates in real time while the advertisement runs.

The present invention, in a preferred embodiment, uses file server direct connection or "FSDC" technology to process ad viewer activity tracking data. This allows the system to send a tracking string with information (variables) received from the dispatcher server by the ad file directly to a tracking server. In a preferred embodiment, the tracking functions of the present invention are performed in a more efficient manner than prior art systems. Instead of redirecting a website user's request as discussed above, when a network user views an advertisement using the present invention and in response clicks or requests a URL or other location address from the information provided, the network user is taken directly to the URL or other location of interest, while a query string is independently sent to the system's tracking server from the ad file. The performance of the tracking server is not apparent to the network user and cannot affect the user. The tracking data is more accurate and can represent several different customizable parameters sent from the destination file viewed rather than merely counting the number of requests. Furthermore, the use of independent connection processes insures that the network user's system and privacy is not further exposed to the tracking system. Within the context of server side data sharing, the present invention provides fast and efficient, predominantly one-way communication, without requiring storage of any files on a network user's computer system. The system, by utilizing FSDC for tracking, directly establishes network connections between the ad file and the dispatcher server system where the tracking parameters and click-through destinations for advertisements are stored in the dispatcher server database by means of a single compiled file that does not require an additional network communications system such as a web browser or other supporting application. Specifically, a network connection is established to an encoded URL or other location address, and information is delivered to the tracking server in the form of a query string. Differing from a typical browser, or other typical network enabling software systems, the communication link established by the compiled file is predominantly one way and non-conversational. Impact on system resources is reduced as overhead support software is not required. Likewise bandwidth is conserved and issues of privacy are maintained as minimal information is exchanged without network user interaction or storage of files on the user's computer memory.

The present invention improves over prior advertising systems and methods in many ways. The present invention does not embed advertising HTML files within a web page, providing considerable economies to advertisers in saved labor, time and cost in terms of both inserting advertisements into web page files, and later changing any of those advertisements. The present invention functions totally transparently to a network user and which neither inconveniences nor burdens the user. The present invention does not require a network user to download or install on the user's computer a separate application program specifically to receive advertising or perform any affirmative act other than normal browsing to receive such advertising. The present invention also provides proper accounting to an advertiser, content licensor and ad publisher by accurately and validly ascertaining and tracking user click-throughs/impressions of fully rendered advertisements. The present invention also allows ad publishers to maximize the revenues an increase effectiveness they receive from running third party ads, by being able to select for display (via the auction) the most profitable ads due to cost-per-click and click-through rate statistics. The present invention allows advertisers to more accurately target their advertising on search engine websites by separating the advertising auction process from the search engine process, allowing for second generation relevancy. The present invention allows for optimization of advertising campaigns by allowing for real-time auctions for available advertising spots, taking into account the amount of available advertising spots at the time of the action, optimizing the value of the advertising spot at the time it is requested, and by allowing for the assembly of advertising on the fly for display on the network, and the ability to license quality digital media creative files on a cost effective cost-per-use basis, and update campaign parameter and creative according to campaign results derived in real time by FSDC tracking.

Additionally, for those advertisers that do not have an e-commerce website, the system allows them to create their own online e-commerce catalog and connect their product or catalog of products to their advertising. Users can then, when viewing the advertisement, access and review the product/catalog information and select items for purchase. The system provides the online e-commerce functionality to allow users to purchase and pay for the advertiser's products online, which is a valuable feature for those that do not have their own e-commerce capability, and provides a turnkey advertising and e-commerce system for users, providing them with the ability to create professional looking large display ads which are more effective in an easy and cost-efficient way.

The present invention can be used to implement a barter-based advertising exchange network where in ad publishers can exchange advertising impressions/views in their publication (whether online or other) for impressions/views of their own advertisements at third party publisher network locations. The ad publishers preferably contribute more ad impression/views than they receive in exchange such that a pool or inventory of available impressions/views is available for selection and use by participating ad publishers/advertisers. Ad content licensors can also participate in barter transactions whereby they can barter their content in exchange for ad impressions/views for display of their own ads at third party network locations or other barterable advertising commodities.

In one embodiment, the invention further includes a system and method for delivering and rendering the ad content automatically and only when and/or to the extent that a pre-defined area of the ad content display page where the content is to be rendered, which is preferably the billboard module location on the ad publisher display location on an electronic network, is within the viewer's browser window dimensions and scrolling position, or within a pre-defined distance from the viewer's browser window dimensions and scrolling position. As used herein, the term "render" or "rendering" refers to the process of requesting and loading content so that it may be viewed, heard or otherwise perceived by a viewer communicating electronically using a browser. The pre-defined area, designated by the ad content display page administrator to trigger rendering, is referred to below as the "ad content display page triggering area." In a preferred embodiment, the pre-defined area of the ad content display page referred to as the "ad content display page triggering area" is the designated ad content display page area where the content is to be rendered, which is preferably the billboard module location on an ad publisher ad content display location. In other embodiments the ad content display page triggering area can be an area of the ad content display page other than the billboard module location area where the content will be rendered. The invention in this embodiment can be configured to trigger rendering of content in a designated billboard module ad content display page rendering area when the pre-defined ad content display page triggering area is within the dimensions and scrolling position of a viewer's browser window, or alternatively, when the pre-defined ad content display page triggering area is within a pre-defined distance outside of the viewer's browser screen dimensions and scrolling position. The invention in this embodiment further includes additional interface features, primarily for interaction with publishers (either additional to the billboard module creation interface or included as part of such interface) for receiving, in addition to ad content display page address and ad content file information (which may be in the form of instructions to retrieve one or more ad content files stored in a content server or other storage device, which may be either part of the system-end components or remotely located components), the billboard module ad content display page rendering area and ad content display page triggering area parameters and other ad content display page data from ad content display page administrators for storing one or more records containing such data in a system server database, each record being given an identification code. As with other embodiments of the invention, a system software application generates a single tag based on said ad content display page data, and the tag is placed on the ad content display page as the billboard module. The tag includes the identification code for the corresponding record with ad content display page data stored in the system database and a link to a system server-side application. When a viewer requests the designated ad content display page, the tag is activated and links to a system server-side application. The system server-side application then collects data from the request, including, but not limited to, the address of the ad content display page and the viewer's network address (for example, the Internet Protocol address associated with a viewer computer when the network is the Internet), and retrieves the corresponding record containing ad content display page data stored in the system server database, and generates code, preferably JavaScript code, referred to herein as a "correlator code," which is written to or otherwise embedded on the ad content display page and interacts with the viewer's browser. The correlator code can be positioned anywhere on the ad content display page, not necessarily the billboard module location on the ad content display page where the particular content will be rendered. The correlator code may also be placed directly on the web page without the use of the server side application. A unique identification code is then assigned to the particular viewer/browser which can be created by the correlator code itself, or can be created by the system server-side software application and be retrieved from cookies or from the system database. The correlator code collects additional information from the viewer's browser, including, without limitation, the viewer's operating system and browser type/version, and a list of other content that was already rendered on the page to prevent duplication of the same content on the ad content display page, among other data and preferably also indexes the page for content and whether the browser window is open, minimized, or otherwise covered by another browser window or other application opened by a viewer. The correlator code in one embodiment dynamically generates HTML code on the ad content display page to be used as a marker for the ad content display page area where the content will be rendered. The marker may be HTML code or coordinates in the correlator code, or can be created by other means for creating a page area marker. The system correlator code then generates a query string link including the data collected via the correlator code and server-side application and the query string link is stored as a variable on the ad content display page. The correlator code periodically checks viewer browser screen coordinate data from the viewer's browser application with ad content display page coordinates for the pre-defined ad content display page triggering area (which may be the same area as the billboard module content display page rendering area), in addition to periodically checking whether the browser window is open, minimized, or otherwise covered by another browser window or other application opened by a viewer. As a viewer scrolls through a ad content display page (whether up and down or left and right) or the viewer's browser window dimensions change, the correlator code periodically checks data from the viewer's browser regarding the viewer's browser window scrolling position and dimensional coordinates and when there is correspondence between the browser window dimensional and scrolling position coordinates and the coordinates for the ad content display page triggering area (which may be partial correspondence or full correspondence, or correspondence with coordinates that are a pre-defined distance outside the viewer's browser dimensional and scrolling position coordinates), the query string link is activated, activating the billboard module and the content is rendered in the designated ad content display page rendering area. The billboard module may be embedded on the page in a variety of ways, including but not limited to by the web publisher, or by the system itself at the time the correlator code is written or otherwise embedded on the page. The correlator code also records at the display page data retrieved from the viewer's browser regarding the rendering of the content The correlator code is preferably JavaScript code, although the invention is not limited to use of JavaScript; other scripting or compiling languages can be used, such as, without limitation, JScript, ECMAScript or other scripting capable of generating code that determines whether or not the specified ad content display page triggering area is within, or within a pre-defined distance outside of, the dimensions and scrolling position of a viewer's browser window. The correlator code contains all of the necessary variables and functions to execute the correlation process described above in conjunction with the viewer's browser. The correlator code is code delivered in the form of source code that interprets and executes the script accordingly by the browser application of the viewer although it resides on the ad content display page itself. It is not an applet or other compiled file or self-executing software application. Content is only rendered on an ad content display page to a viewer when and/or to the extent that the pre-defined ad content display page triggering area is within, or within a pre-defined distance outside of, the viewer's browser screen dimensions and scrolling position. In a preferred embodiment, the pre-defined ad content display page triggering area is the area of the ad content display page where the content is to be rendered, which is the billboard module location on an ad publisher's site in a preferred embodiment, and content to be rendered in the pre-defined area of the ad content display page is not rendered unless and until the particular area of the ad content display page is within the viewer's browser screen dimensions and scrolling position, or within a pre-defined distance outside of the viewer's browser screen dimensions and scrolling position. This embodiment of the present invention enables use of bandwidth and other communications resources more effectively and efficiently.

Reports regarding the delivery and rendering of content can be generated by the system for use by system users and third party content providers and content publishers (e.g., web pages) to better analyze the effectiveness of their content distribution. Unlike other systems, the invention in this embodiment enables precise and accurate accounting of what content actually appears within in a viewer's browser window dimensions and scrolling position area, in addition to whether the browser window is open, minimized, or otherwise covered by another browser window or other application opened by a viewer and enables analysis of content rendering activity with respect to particular areas of an ad publisher's ad content display page, i.e., which areas are most active with regard to content rendering to viewers, enabling effective content placement page organization schemes and content placement fee structures based on rendering activity for the particular content display area of an ad content display page relative to other areas of the page and the viewer's browser window dimensions. In this embodiment, the invention gathers information to better deliver content loaded, including reach, frequency, viewer's geographic location, the demographics of the viewership, keywords derived from the indexing of page content, among other data, allowing websites to effectively provide content on their web pages on an as needed basis and then to utilize the information in myriad ways. With the invention in this embodiment, content placed in any designated ad publisher's web page area, including but not limited to, below the fold areas of a web page, can be loaded as needed, and its usage/rendering can be reported and billed only if the viewer scrolls them into the available area of their browser window, and when response rates are calculated against the ads loaded and rendered.

The invention in this embodiment gives ad publishers, by specifying a predefined area on the ad content display page which, when its coordinates correspond in a pre-defined manner with coordinates of the viewer's browser dimensions and scrolling position, triggers content rendering at the ad content display page, the ability to provide to viewers of their pages a variety of content including promotions, video promotions, advertising and third party network advertising on their web pages and deliver this content to the page when and/or only to the extent that the pre-defined ad content display page triggering area of the ad content display page is within, or within a pre-defined distance outside of, the then current dimensions and scrolling position of the viewer's browser window. The invention, in this embodiment, may then trigger several actions, including an indicator to show the viewer or system users that the ad content is rendered and available, and report with accuracy whether or to what extent the ad content display page area where particular ad content is to be rendered, which is the billboard module location in the ad publisher's ad content display page in a preferred embodiment, is within the available area of viewer's browser window, for how long the ad content was available to trigger further action, considering whether the browser window where the content is rendered is open, minimized, or otherwise covered by another browser window or other application opened by a viewer, how many unique viewers were presented the ad content (reach), the amount of times each unique viewer was presented the ad content (frequency) the general geographic location of the viewer, the browser version used by the viewer, what actions were taken on the advertisement in the form of clicks, the click rate in relation to the number of views, and other meta data in relation to the rendered content. The ad content can be successively rendered automatically to the viewer as the viewer scrolls through an ad content display page, with the effects of instant rendering attracting the attention of the viewer.

The invention in this embodiment also allows ad publishers (e.g., ad content display page administrators), to generate accurate reports to analyze ads on their pages according to different areas of their ad content display pages and how they relate to the available areas of viewer's browser windows, enabling accurate accounting and reporting of ad content rendering and viewer ad content display page viewing and scrolling characteristics, providing insights as to what display areas of a content display site are most effective for ad content display. The reports consist of accurate data of their pages, and how often they become available to a viewer within their browser window. Ad content display pages are, in one embodiment, divided into four areas, top, above the fold, below the fold, and bottom, although further division is programmable as desired. The data for each area is based on the collected rendering activity data from the rendering of ad content in the specified area of the ad content display page.

In a preferred embodiment, the computer and communications network is the Internet, the content display sites and pages websites and web pages, and ad content display page administrators may be web page administrators, but this embodiment of the present invention is not limited to any particular communications network or content display site. The content can be stored at a network location other than the content display site server, such as, for example, one or more content file servers, which can be remotely located, with the instructions being stored in the system database to execute and render the content at the specified rendering area on a ad content display page when requested.

This embodiment of the present invention allows content display page administrators to divide their content display site pages into one or more content rendering areas. Ad publishers, as ad content display page administrators, interact with the system to designate such content rendering areas, specifying their position and size and designating the billboard modules and/or content files to be located and/or rendered thereat. The system processes the specified information and provides a JavaScript tag that includes the identification code for the system server database record storing the ad content display page information provided by the ad content display page administrator and includes a link to a system server-side application at the system server. When the viewer requests the particular ad content display page, the JavaScript tag links to the system server-side application and the system server-side application retrieves data from the viewer's request as well as the record with data for the particular ad content display page and generates code, referred to as a "correlator code" which is preferably JavaScript code, that dynamically creates a marker for the ad content display page area, and also correlates the pre-defined ad content display page triggering area with viewer browser window scrolling position and dimensions, and the correlator code generates a query string link which is stored as a variable on the ad content display page, including data collected from the viewer's browser via the correlator code. The marker may be HTML code or coordinates in the correlator code, or can be created by other means for creating a page area marker. As the viewer scrolls through the ad content display page, the correlator code determines whether the browser scrolling position and dimensional coordinates correspond with ad content display page coordinates for the pre-defined ad content display page triggering area on the ad content display page, (which may be the area on the ad content display page where the billboard module is located, which is where the content is to be rendered or any other pre-defined area of the ad content display page) and when browser window and the pre-defined ad content display page triggering area's coordinates correspond (the correspondence can be customized and pre-defined as well, and can be partial correspondence, full correspondence or correspondence with coordinates that are a pre-defined distance outside of the viewer's browser window dimensional and scrolling position coordinates), the query string link stored on the page is triggered, activating the billboard module, and the real time auction is conducted to select a bidding advertiser's ad parameter and command file at the dispatcher server for rendering at the designated billboard module location at the ad content display page, and the content designated for rendering at or in relation to such billboard module ad content display page area is retrieved, assembled and rendered in the designated billboard module ad content display page rendering area. The specified content is rendered only if and when such pre-defined content triggering area, which can be the same as the content rendering area, is determined by the correlator code to be within, or within a pre-defined distance outside of, the dimensions and scrolling position of the viewer's browser window. When the pre-defined ad content display page triggering area is the area where the content is to be rendered, i.e., the billboard module location on the ad publisher's ad content display page, the content is rendered only when and/or to the extent that the billboard module area of the ad content display page where the content is to be rendered is within, or within a pre-defined distance outside of, the dimensions and scrolling position of the viewer's browser window.

As with other embodiments of the present invention, the system database storing the records with ad content display page data is preferably a relational database, housed preferably in a system-end server, preferably the system dispatcher server. Each such record has a unique identifier. The system server-side software application contains all code that is necessary to communicate with the system server database as well as with the ad publishers and their ad content display pages and generate the correlator code which is written to or otherwise embedded on the ad content display page and interacts with the viewer's browser to control the triggering of billboard modules, content requesting and rendering when the billboard module display page area where the content is to be rendered is within, or within a pre-defined distance outside of, the dimensions and scrolling position of a viewer's browser window. The JavaScript tag placed on the ad content display page for the particular content rendering area consists of a tag placed somewhere on the ad content display page containing a link to the system server-side software application and an encrypted ID for the applicable content rendering area record stored at the system database located preferably at the system server. When a viewer requests the particular ad content display page, the request activates the link to the system server-side application, which retrieves the record with data corresponding to the encrypted id for such record and retrieves viewer data from the http request itself. The system server-side application generates the custom correlator code to be written to or otherwise embedded on the ad content display page. The correlator code then creates a marker for the ad content display page area where the content will be rendered. The marker may be HTML code or coordinates in the correlator code, or can be created by other means for creating a page area marker. The correlator code collects additional information from the viewer's browser, which may include information regarding the viewer's computer system, browser type/version, and information regarding content that has previously been rendered on the ad content display page to prevent duplication of content on the page, among other data, and also collects and indexes data pertaining to text on the ad content display page. A unique identification code is then assigned to the particular viewer/browser, which can be created by the correlator code itself or can be created by the system server side software applications and be retrieved from cookies or from the system database. The correlator code creates a query string link with the information collected by the correlator code attached thereto and the query string link is stored as a variable on the ad content display page. When the pre-defined ad content display page triggering area is within, or within a pre-defined distance outside of, the dimensions and scrolling position of the viewer's browser screen, the correlator code triggers the query string link that is stored on the page and activates the billboard module. Then the billboard module establishes communication with a separate ad dispatcher server database, which selects an ad/content record to render in the billboard. The instructions in the record are retrieved by the billboard module and the content is rendered in the designated billboard module within content display page rendering area. The correlator JavaScript code on the ad content display page contains the variables and commands to continuously determine what ad content display page area(s) is/are within, or within a pre-defined distance outside of, the dimensions and scrolling position of the viewer's browser, including whether the browser window where the content is rendered is open, minimized, or otherwise covered by another browser window or other application opened by a viewer. The correlator code establishes continuous communication with the billboard module. The information gathered can be sent back to any server for tracking and reporting via the billboard module using FSDC. The billboard module may also cease rendering or send additional requests to the ad dispatcher server to select a new ad/content to render in the billboard module, say if the billboard was in view for a pre-determined period of time, or has been scrolled outside the viewer's browser window dimensions.

BRIEF DESCRIPTION OF THE DRAWINGS

All of the figures depict preferred embodiments although other embodiments are contemplated and the present invention is not limited to the embodiments shown.

FIG. 4 depicts a sample system dispatcher server database parameter file.

FIG. 7 depicts a sample system user registration screen.

FIG. 8 depicts a sample system user log-in screen.

FIG. 9 depicts a sample initial advertisement creation input screen.

FIG. 17 depicts a sample keyword and maximum bid data input screen.

Figure 18:
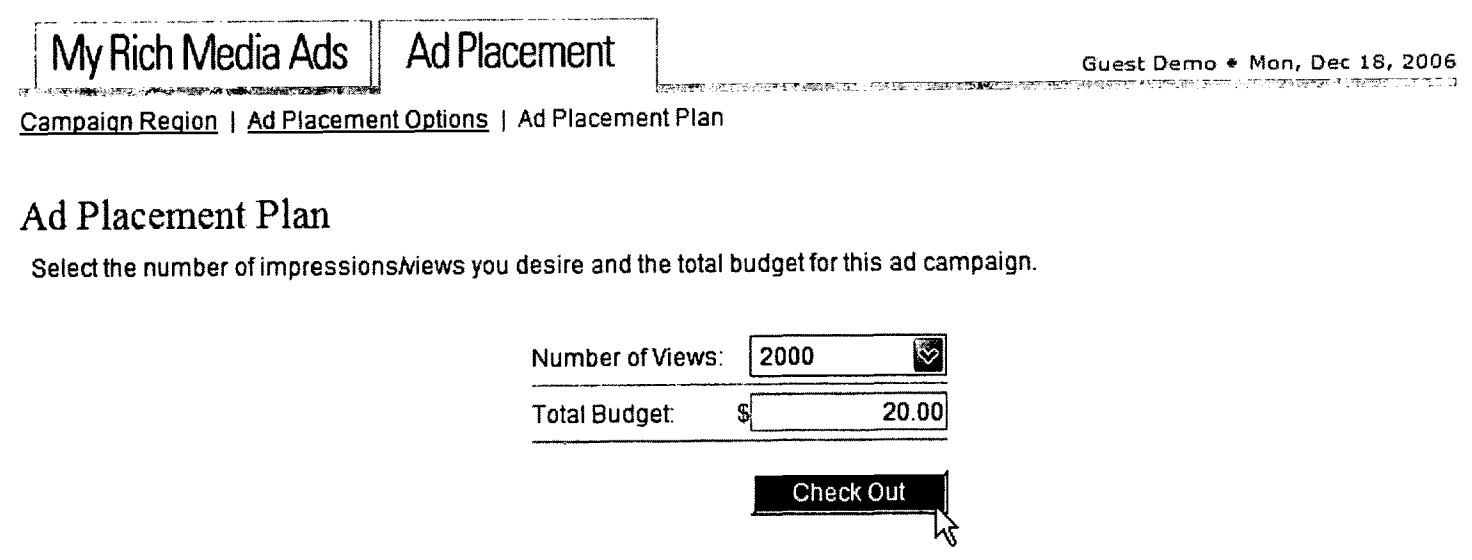

FIG. 18 depicts a sample ad placement plan budget input screen.

FIG. 19 depicts a sample target category selection screen.

FIG. 21 depicts a sample ad payment data input screen.

FIG. 22 depicts a sample ad publisher website registration screen.

FIG. 23 depicts a sample ad publisher billboard identification screen.

FIG. 27 depicts a sample ad publisher billboard target category selection screen.

FIG. 29 depicts a sample skip/destination URL input screen, for use when billboard is created for an interstitial ad.

FIG. 31 depicts a sample ad publisher billboard location within an ad publisher web page, showing billboard module placement at top bar.

FIG. 32 depicts a sample rendered ad in an ad publisher search engine web page screen.

FIG. 33 depicts a sample ad parameter data base listing showing multiple ad parameter files.

FIG. 34 depicts a sample ad campaign statistics screen with data regarding performance of ads and budget consumption.

FIG. 35 depicts a sample single ad statistics screen.

FIG. 41 depicts a sample system screen showing products posted by advertisers for sale via the system.

FIG. 42 depicts a sample product information and selection page.

FIG. 43 shows a sample check-out and payment screen used in the e-commerce functionality provided to advertisers that do not have their own e-commerce capability.

FIG. 49 depicts a sample system screen for participants in the system's ad exchange program to select target categories to be associated with the ad space on said participant's network location contributed to said program by said participant.

FIG. 54-A is a process flow diagram showing the process flow of the present invention in an embodiment including the content rendering control feature of the present invention.

FIG. 54-B is a continuation of a process flow diagram showing the process flow of the present invention in an embodiment including the content rendering control feature of the present invention.

FIG. 54-C is a continuation of a process flow diagram showing the process flow of the present invention in an embodiment including the content rendering control feature of the present invention.

FIG. 56 depicts a sample system ad publisher content site administrator user registration screen in an embodiment including the content rendering control feature of the present invention.

FIG. 59 depicts a sample user registration screen whereby ad publisher ad content display page administrators enter their ad content display page's primary audience geographic location in an embodiment including the content rendering control feature of the present invention.

FIG. 60 depicts a sample user registration screen whereby ad publisher ad content display page administrators enter their ad content display page's content type in an embodiment including the content rendering control feature of the present invention.

Figure 61:
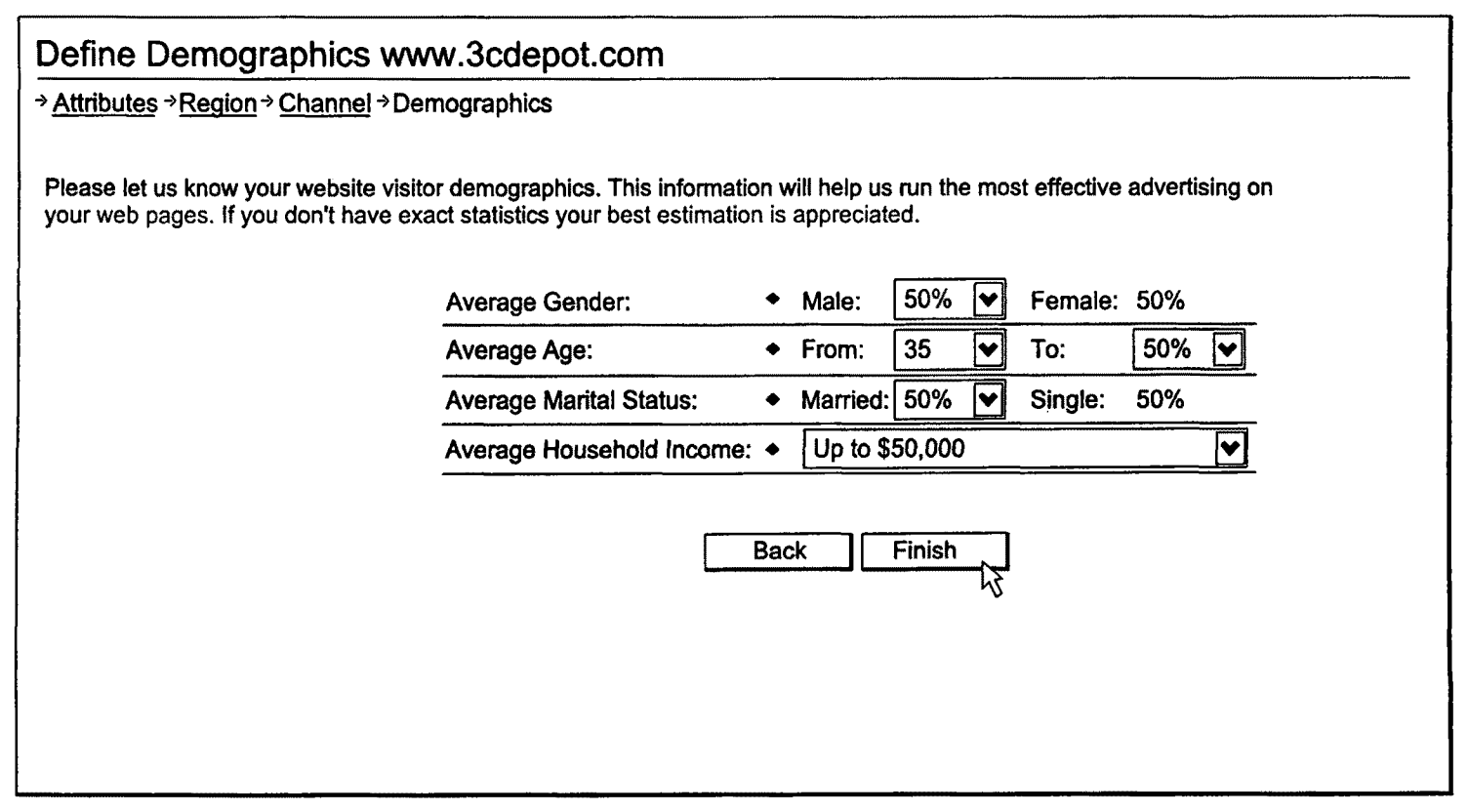

FIG. 61 depicts a sample user registration screen whereby ad publisher ad content display page administrators enter their ad content display page audience demographic data in an embodiment including the content rendering control feature of the present invention.

FIG. 72 depicts a sample system ad content display page data report screen in an embodiment including the content rendering control feature of the present invention.

FIG. 73 depicts a sample system content rendering area data report screen in an embodiment including the content rendering control feature of the present invention.

DESCRIPTION OF A PREFERRED EMBODIMENT OF THE INVENTION

Figure 1:
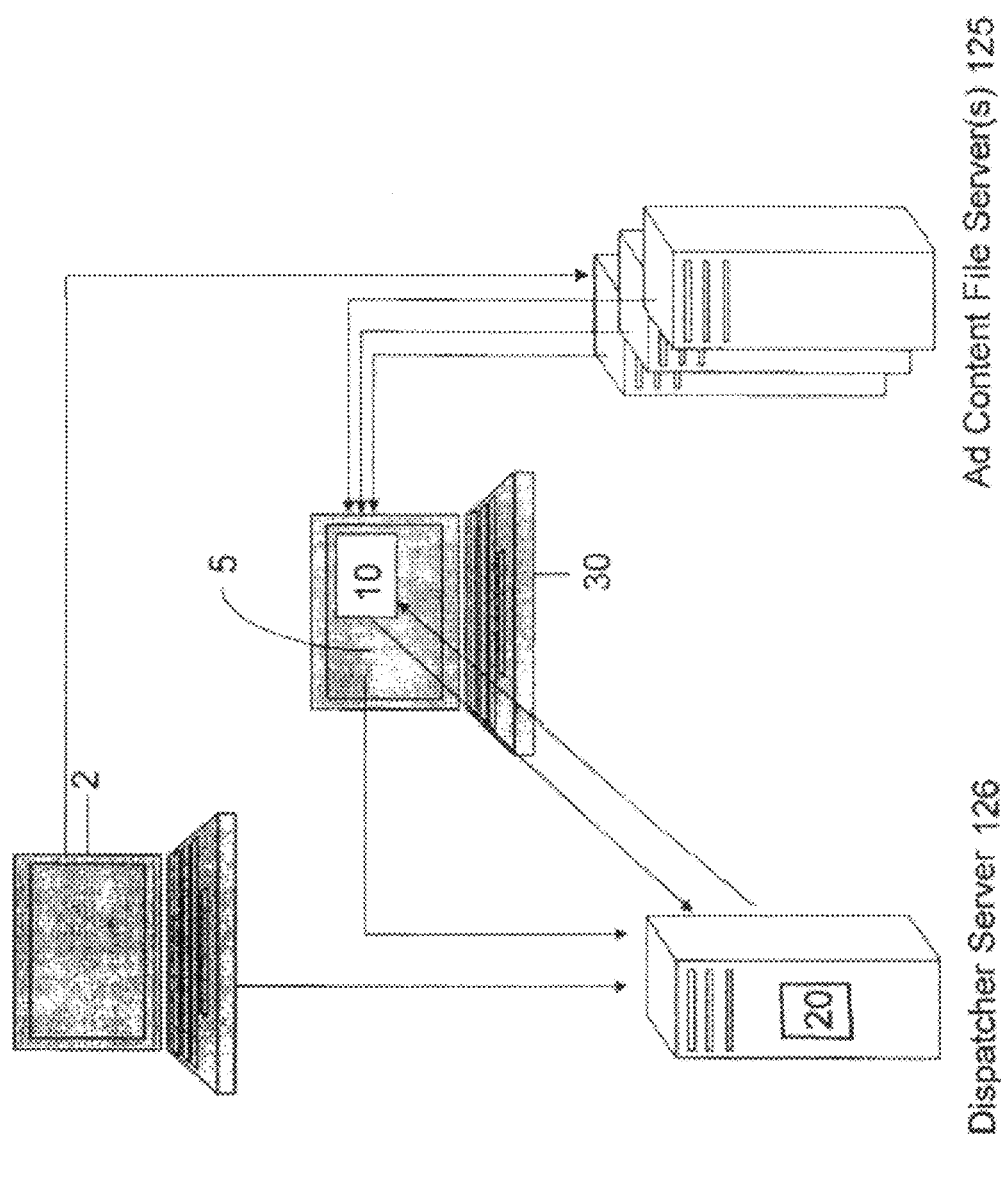
FIG. 1 is diagrammatical overview of the communication flow of the present invention.

According to a preferred embodiment hereof, the present invention is an all inclusive electronic advertising network system and method, including means for advertisers to create advertisements using licensed digital content on a cost-per-use basis, and means for distributing said advertisements via a "billboard module" and a dispatcher server automatically conducting a real-time auction to select an ad for display whenever a billboard module on the network is requested by a network user/ad viewer. When the billboard module is requested at a network location it communicates with the relational database using the protocol appropriate for the particular network. At this time the auction takes place, first finding all of the ad parameter files in the database for the ads waiting for display that reference the same billboard module associated keywords or categories and other information passed from the billboard module, then using an algorithm to determine which ad (s) will ultimately be displayed in the ad space. Once the winning ad of the auction is determined, the ad is displayed within the designated billboard module according to the instructions in the relational database file for the ad. This file stores data required for commands that execute assembly, retrieval of selected digital media files previously stored in electronic format in one or more servers, as well as ad viewer tracking data, billing for licensed digital media and for display of the ad at the designated location, as well as where to direct the viewer of the ad, such as, in web implementations, to the desired destination website page relating to said advertisement, if the viewer desires to obtain more information regarding the advertisement, or to the next or previous designated web page or other network location. The relational database containing the ad placement parameters is stored in an ad dispatcher server which can be separate from the database and server providing the actual ad and digital media files. The real-time auction to select the ad to be displayed can be based on the advertiser bids or the advertisement parameters of the advertisements, such as, without limitation: click-through rate, ad space size, display region and ad type, or a combination of such parameters and bids. In a preferred embodiment, the triggering of the billboard module is controlled by a control mechanism based on whether the billboard module display location area on the ad publisher's ad content display page is within the dimensions and scrolling position of the viewer's browser window, or within a pre-defined distance from the viewer's browser window dimensions and scrolling position.

The system of the present invention in a preferred embodiment comprises: a system-end computer equipped and configured for Internet or other network communications, including a dispatcher server including an ad parameter and command file database, and one or more software applications to execute a real-time auction to select an ad to be displayed at a particular network location; and also including computer processing means and one or more Internet or other network communications interface software applications for interfacing with system advertisers, providing a menu screen for advertisers to enter instructions for the creation of an ad, including messaging to be included in the ad, selection of an ad template, selection of digital content for the ad which may be licensed from third parties, and an area to enter instructions for an ad campaign, including selection of ad display locations, entry of cost-per-click bids for display of the ads and keywords or categories to be associated with the ad, and creating a data file in said dispatcher server database that contains parameters and commands to be used by the billboard module to provide access to said template advertisement file, licensed digital content, messaging, as well as the total cost-per-use of the licensed digital media files, the keywords/categories the ad will be associated, the network locations where the ad will be displayed and the advertiser's bid for display of the ad at the desired location; one or more content servers configured and equipped for Internet or other network communications communicating with said system-end dispatcher server and network user/ad viewer-end computer systems and having one or more digital content files stored thereon; an ad publisher interface communicating with one or more ad publisher end computers configured and equipped for Internet or other network communications and also providing a menu screen for ad publishers to enter registration information, select categories or keywords to associate with their ad spaces and provide instructions to embed or install any number of "billboard modules" on their ad spaces. When activated/initiated, said billboard modules establish communications with the dispatcher server, causing a real-time auction to be executed for all advertisements in the dispatcher database with like parameters (e.g., the same keywords, categories and geographical region) and selecting one or more advertisements for display at the billboard module location based on the advertisers' bid for same or based on the advertisement parameters, including, but not limited to, click-through rate, ad space size, display region and ad type, or a combination of such parameters and bids, and then causing the selected ad to be displayed at the module by executing the instructions for the selected ad stored in the ad parameter/command file in the dispatcher server; said one or more ad publisher computers communicating with one or more network user/ad viewer-end computer configured and equipped for Internet or other network communications and communicating with said ad space location.

Additionally, for those advertisers that do not have an e-commerce website, the system allows them to create their own online e-commerce catalog and connect their product or catalog of products to their advertising. Users can then, when viewing the advertisement, access and review the product/catalog information and select items for purchase. The system provides the online e-commerce functionality to allow users to purchase and pay for the advertiser's products online, which is a valuable feature for those that do not have their own e-commerce capability, and provides a turnkey advertising and e-commerce system for users, providing them with the ability to create professional looking large display ads which are more effective in an easy and cost-efficient way.

As noted previously, the auction occurs when a billboard module is activated/initiated anywhere on the network. The billboard module then establishes communication with the relational database containing information on all of the advertisements ready for display in the ad space on the network, then sends a request for advertising. This request includes a variety of information not limited to the keywords or categories associated with the advertising module and the size and dimensions of the available advertising space. The system runs a comparison, based on an algorithm, of all advertisements in the database with keywords that match the keywords associated with the advertising display location up for auction. This algorithm takes into account a variety of customizable parameters, including, without limitation the CPC/CPM bid on the advertisement and the click-through rate of the advertisement. The winning advertisement is then displayed in the advertising space. The advertisement displayed may also be assembled according to instructions in the same or other database. These instructions may call elements from a variety of locations, and assemble them for display within the advertising module. All actions taken on the advertising content are then sent back to the relational database using FSDC.

The billboard modules themselves are preferably .swf files, any comparable code such as .net .asp or AJAX that contains all the necessary code to send and retrieve data and variables from the dispatcher server. The module, when initiated, it establishes communication with the dispatcher with the appropriate network protocol, then the database runs applications required for the advertising auction. Based on the results of the auction, communication is sent back to the module with instructions on how to assemble and display the ad(s) where to retrieve the ad template file, files and digital media to present.

The ad template files themselves are preferably rich media files, preferably .swf, which is a Macromedia/Adobe Flash format any comparable code such as .net .asp, or AJAX that can be embedded to dynamic. This is a smart rich media file that can gather from and send information to a relational database and can retrieve and display an ad file from any server location. This ad file may be a static HTML image, or a rich media file such as .swf. The .swf file acts as a template file implements all of the necessary actions to retrieve a variety of data, including text messaging, digital media files including picture and rich media files including video, instructions on when to play or to be skipped, to track all custom parameters and to load a go-to page when it is a appropriate (for instance at the end of the ad or when it is skipped by user, or if an ad is clicked by a viewer). The template .swf file can be stored on any server connected to Internet. The digital media files are preferably stored at a content server or content database. The graphical user interface is stored preferably on the dispatcher server, and includes "thumbnails" or preview displays of the ad content files templates, digital media libraries with elements ready for licensing on a cost per use basis, and information regarding the location of the ad content files in order to easily identify and manage ads, but not necessarily the full ad file. It should be understood that the ad file and associated messaging and digital media files can be stored and accessed from any server. As the ad plays in the billboard module, tracking metadata is sent back to the dispatcher server enabling the billing of the advertiser, and payment to the ad publisher and owners of licensed digital content.

The interface means, processor means and computer communications means can have various embodiments, including, without limitation, use of traditional Internet browser applications, whether customized for use in the present system, or existing third party software applications to provide the advertisements to the user. In a preferred embodiment, the network location where the ad is desired contains an embed object command which activates the billboard module when the web page is requested or the location is otherwise acted upon. The billboard module is preferably an .swf file but may be an asp, .net or AJAX file, that establishes communication with the system-end dispatcher server. The billboard module file may reside in any server or other hardware connected to the network. When network users act upon a network location with an embedded billboard module, the billboard module loads in the viewer's browser and establishes communication with the dispatcher server. The module then transmits an identifier, and associated information such as keywords, categories, geographical location, ad size, etc, to the dispatcher server and the system auction software application conducts an auction to select the ad to be displayed from those that are associated with and have placed bids for display at the billboard module by comparing all advertisements in the database with like parameters and applying an algorithm that takes into account a number of variables such as, without limitation, cost-per-use bid, click-through rate and then retrieves the selected ad parameter/command file from the database and then communicates the location of the selected advertising or advertising template file. The dispatcher then passes all necessary information from the database into the advertisement template file. The advertisement is then rendered in the template file within the ad billboard module, according to the instructions in the ad parameter/command file in the dispatcher server database. Use of a template file is optional. Instructions may include, but are not limited to, text messaging, location of licensed digital media content, go-to locations (upon click action by viewer) and other tracking information. That information can be passed to the advertising template via a data string that loads the ad and then some of the information can be used as part of the tracking string sent from the ad file. When the ad files are retrieved and run, metadata is sent to the dispatcher server using FSDC and the system calculates and charges the specified cost-per-use of the display of the ad at the desired location, and of the licensed content, drawing funds from the advertiser's system account to pay the content licensor and ad space location owner.

Referring to FIG. 1, which depicts a diagrammatical overview of the communication flow of the present invention, without reference to any particular type of network, there is an ad publisher with ad space made available for ad placement 5 which communicates with the system-end dispatcher server 126 to create the ad publisher's system account, enter the keywords or categories that the ad publisher wants associated with the ad publisher's ad space, and receive from the dispatcher server 126 the software code comprising the billboard module 10 to be embedded at the ad publisher's ad space 5. In FIG. 1, the billboard module 10 is depicted on the ad publisher's ad space 5 represented by the screen on the computer icon, and the computer 30 is a network user/ad viewer-end device. Advertiser computer 2 communicates with the content server 125 to license content to create an ad and with the dispatcher server 126 to enter the parameters and commands to retrieve the content files (the dispatcher server and the content server can comprise the same server), assemble them into the overall ad, preview and display the ad at the designated ad space 5, also including the keywords to be associated with the ad, possibly geographical, timing, or other parameters as to display of the ad, the location of the ad space 5 where the ad will be displayed, and a bid for display of the ad at the ad space 5 when an ad viewer acts upon the billboard module 10 and the ad is the one selected in the auction that automatically ensues at the dispatcher server 126 when the billboard module 10 is activated. The advertiser's ad parameters and commands and bid display are stored as a file in the ad parameter and command file database 20 within the dispatcher server 126. When an ad viewer requests or otherwise acts upon the location where the billboard module 10 is embedded, the billboard module 10 communicates with the dispatcher server 126 and ad parameter and command file database 20 and the relevant keywords and other information relating to the ad space 5 is provided from the billboard module 10 which are used by the system software applications to conduct a real-time auction to select an ad for display from those that have the corresponding keywords and other parameters based on the bids placed with respect to such ads for display or based on ad parameters, including, but not limited to, click-through rate, ad space size, display region and ad type, or a combination of such parameters and bids. Once the auction is conducted and an ad is selected, the corresponding ad parameter and command file for the ad in the ad parameter and command file database 20 is activated to retrieve the ad content files comprising the ad from the ad content file server(s) 125, assemble and display the ad at the ad space 5. Meta data relating to the ad is sent back to the dispatcher server 126 for tracking and also charging for use of the licensed content and display of the ad at the ad space 5. The advertiser's account is debited and the content licensors and ad publishers are paid.

Figure 5:
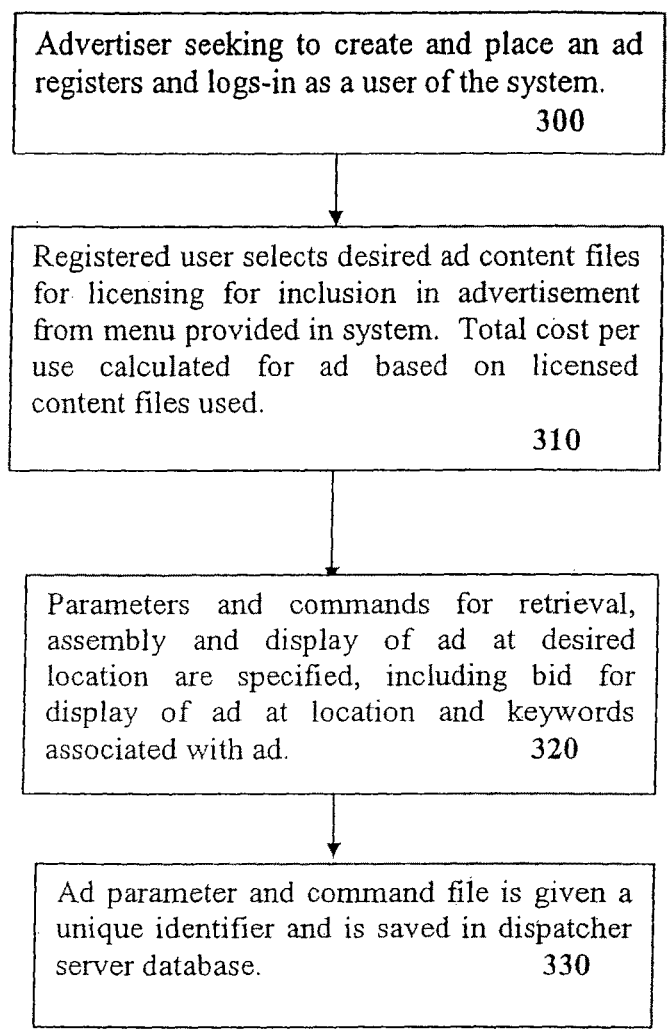
FIG. 5 is a flow chart depicting the pay-per-use content licensing process flow.

The system is preferably made available to website operators and advertisers via a system website for use by them after registering as a website advertisement administrator. Referring to FIG. 5, which shows the process flow of the advertising method implemented with the system of the present invention via the Internet, an advertiser creates and places an ad by executing the following steps:

Registering with the system as an advertisement administrator 300, 310 advertisers are directed to a menu where they create their advertising display by entering messaging, uploading logos or pictures, selecting from a variety of digital content libraries made available through the system for licensing on a cost-per-use basis, and create an advertising campaign by entering keywords or selecting categories to associate with said advertisement, network location and geographical region for the advertisement's display, go-to location upon click action on the advertisement, cost-per-use bid, minimum daily budget and other ad parameter data. Advertisers are also provided the opportunity to run real-time test auctions to evaluate approximate results of their campaign with the parameters they have selected. These items of information are then stored as the unique record in the database that can be retrieved and used by the billboard module and advertisement template file (.swf .asp, .php, .net, AJAX or other file format) parameter command file for that particular ad placement 330. The record also includes the cost-per-use data for all of the ad content files forming part of the ad, and also the "bid" for display of the ad at specified network locations in response to user queries on search engines and/or websites using specified words or other user action at the specified network location where the ad is to be displayed.

After clicking "Save" in the system user screen when the above-referenced data is entered, a unique specific database record containing the specified custom parameters in the system's dispatcher server. When a billboard module on the network is requested, a communication is established with the dispatcher server, and after comparison, one or more of these specific database records are requested and the advertising is displayed/placed in the module. This placement can be "bid" on by multiple advertiser's that seek to have their ads displayed in such locations, and the system's auction function allows the website operator/ad displayer to display the ads that are most profitable for it to display, i.e., those that generate the most advertising revenue or otherwise have the most favorable parameters. This relational database entry also may contain custom parameters which, with the help of the FSDC tracking system, will pass tracking data relating to impressions and any actions (clicks on multiple parameters) taken on that particular advertisement for tracking and compilation for the website operator/advertiser's future reference. The present invention makes serving ads possible without any pre-loading technology required.

Registering with the system as a publisher administrator, publishers are directed to a menu where they enter information including contact information, and account information as to where they would like payments for advertising made to. They are also offered a menu to select preferred ad space sizes and dimensions, and enter keywords to associate with the ad space (billboard module) or select from a list of categories to associate with the billboard module. Upon submission the code necessary to embed the module in a web page is generated, with instructions. In the case of a website with search functionality, instructions will also be given on dynamically associated keyword requests with the advertising module.

Figure 2:
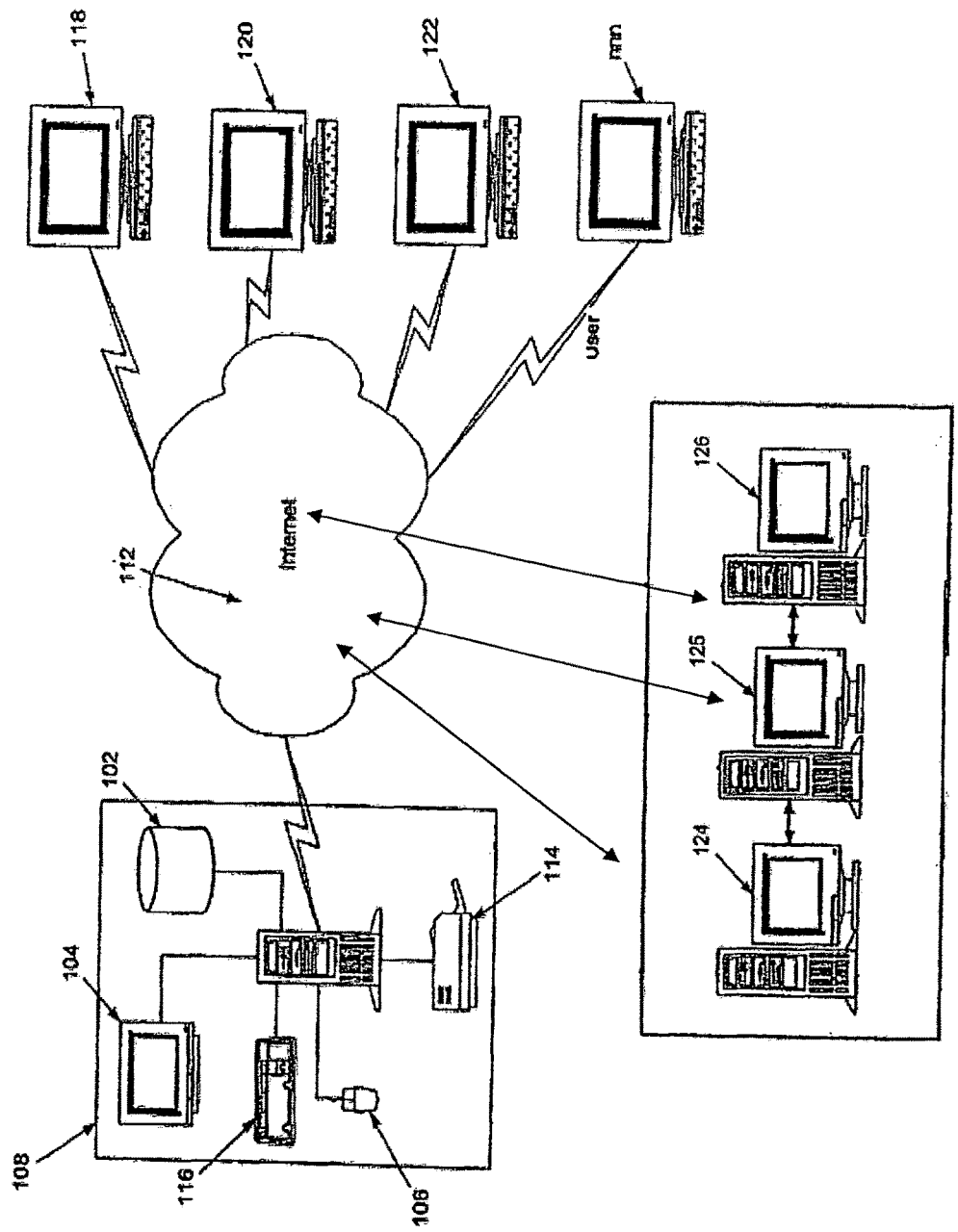
FIG. 2 is a diagrammatical representation of system components and their interrelationship.
Figure 3:
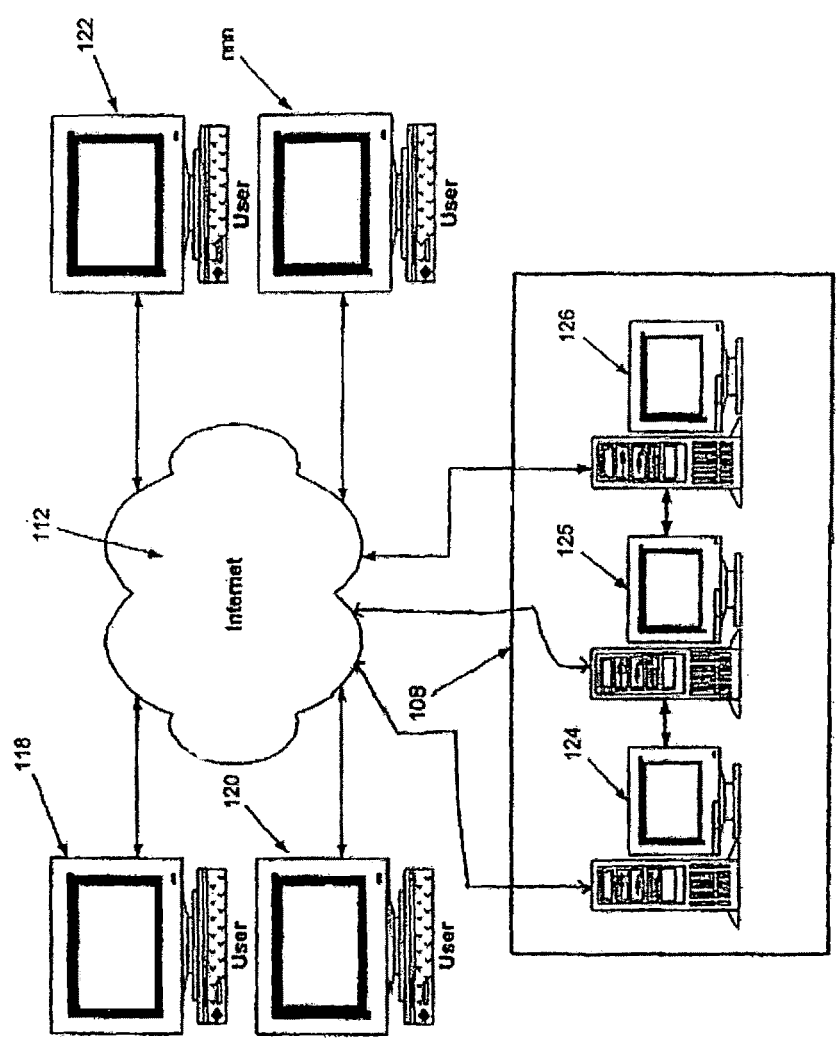
FIG. 3 is a diagrammatical overview of the relationship among system servers and website viewers.

Referring now to FIGS. 2 and 3, an overview of a preferred embodiment of the present invention is shown. The present invention communicates with a website viewer and ad creator/publisher computer systems 108. The ad creator can publish other advertisers' ads on his own site or publish his own ads on other sites having billboards made available by others. The computer system 108 comprises input and output devices, as is well-known in the art. For example, the computer system 108 preferably comprises a display screen or monitor 104, a keyboard 116, a printer 114, a mouse 106, etc. The computer system 108 is preferably connected to the Internet 112 that serves as one preferred communications medium. The Internet 112, as previously discussed, comprises a global network of networks and computers, public and private. The Internet 112 is the preferable connection method by system users 118, 120, 122 and nnn in preferred embodiments of the present invention. The website user/advertisement viewer's computer is preferably similar in its features.

Referring now to FIG. 3, the system-end computer 108 is shown. The computer system 108, in a preferred embodiment, comprises an ad dispatcher server 126, a tracking server 124 (which can be the same as or part of the dispatcher server), one or more licensed digital content file servers 125. The dispatcher server 126, licensed digital content file servers 125 and tracking server 124 preferably run in a variety of operating system environments, including MS Windows NT, MS Windows 2000, Linux and others, and preferably utilize a variety of database management systems, including MS SQL Server, Oracle and others.

Connectivity between the system user-end, the system-end and ad viewer-end may be effected in various forms without violating the scope and spirit of the present invention. In particular, network connectivity may be made by a telephone line/modem combination as is well known in the art, a dedicated ISDN line or a cable modem-type set-top-box which provides for Internet connectivity through certain forms of cable television services. Wireless communication can also be utilized. In each of the aforementioned cases, the computer of the website user-end portion will need to be provided with a suitable I/O card, such as a modem, ISDN card, and the like, in order to effect an appropriate interface with the network connection.

In application, the system provides for placement and delivery of advertisements as a compiled file. Preferably, this compiled file is a flash file identified by the .SWF suffix other files can be used. The use of the Macromedia/Adobe Flash file is preferred because of the ability to provide instructional code within the .swf file, and because nearly all customer computer systems have been enabled with the Flash player as a result of normal Internet browser configuration. Also, .swf files have become more universal, and able to execute in a variety of devices, including cell phones, PDA's, television and other devices. It is to be understood that under the teachings of the present invention, any type of file that is capable of operation without the initiation of an additional application could be used in place of Flash and the .swf file and use of a .swf file is not a limitation of the present invention.

Under the present invention, the clicking of the ad link or entry of the specified keyword as a search query, or other ad viewer action at the billboard module placed at the display location activates the corresponding ad parameter/command file in the ad parameter file database at the dispatcher server. Sample billboard module code is provided below:

```
KeyFrame # 1
_root.stop( );
// Get Objects for Template
sendForObjects = new LoadVars( );
receiveObjects = new LoadVars( );
// event handler to kickoff
_root.onLoad = function( ) {
// the sendForObjs keywords for ad auction and receive variable that are
used for ad population
    sendForObjects.sendForObjs = "flashPort";
    sendForObjects.sendAndLoad("http://www.3cdepot.com/adAuction/
getAds.asp?keywords="+q+"&nocache="+new Date( ).getTime( ),
receiveObjects, "POST");
    // used in below function to check if our receiveObjects object
has loaded
    receiveObjects.onLoad = receiveObjectsLoaded;
};
// if object data received, send to next frame
function receiveObjectsLoaded(success) {
    if (success) {
        // destroy the objects
        delete receiveObjects( );
        delete sendForObjects( );
        _root.nextFrame( );
    } else {
        (_root.errorMsg.text="Error Accessing Database");
    }
}
KeyFrame #2
//create variables to store ads's clientUID and userUID
catClientUID = receiveObjects.catClientUID;
catUserUID = receiveObjects.catUserUID;
catalogName = receiveObjects.catalogName;
//create array to store Ad Optional Attributes
catArray = receiveObjects.catAttribsList.split('|');
for (n=0; n<catArray.length; n++) {
    d = catArray[n].split('#');
    item = {AdTitle:d[0], AdHeight:d[1], AdWidth:d[2], image_src:d[3],
url:d[4], message:d[5], subTitle:d[6], bgColor:d[7], textColor:d[8],
sound:d[9]};
    catArray[n] = item;
}
//remove last object from array since its undefined
catArray.pop( );
//initialize catalog attribute variables from array
AdTitle = _level0.catArray[0]["AdTitle"];
bgColor = _level0.catArray[0]["bgColor"];
AdHeight = _level0.catArray[0]["AdHeight"];
AdWidth = _level0.catArray[0]["AdWidth"];
url = _level0.catArray[0]["url"];
textColor = _level0.catArray[0]["textColor"];
inseam = _level0.catArray[0]["inseam"];
image_src = _level0.catArray[0]["image_src"];
subTitle = _level0.catArray[0]["subTitle"];
sound1 = _level0.catArray[0]["sound"];
/*----------------------------------------------------*/
//create array to store item and its properties
itemPropArray = receiveObjects.itemObjsList.split('|');
for (n=0; n<itemPropArray.length; n++) {
    d = itemPropArray[n].split('#');
    item = {auctionUID:d[0], adUID:d[1], order_num:d[2],
adName:d[3], img:d[4], clientUID:d[5], userUID:d[6], title:d[7],
caption:d[8]};
    itemPropArray[n] = item;
}
//remove last object from array since its undefined
itemPropArray.pop( );
//sort array by order_num
itemPropArray = itemPropArray.sortOn("order_num");
nextFrame( );
Keyframe # 3
_root.stop;
// create array to store to be duplicated clip names
clipNames = new Array( );
//function which loops through array and generate a duplicatemovie
statement for each item in array
//numItems accepts number up to max items in catalog
//imageDir points to folder structure where images are stored (either "",
"1", or "½")
//clipToDuplicate is the name of the parent movieclip to duplicate
//imageHolderPath is the dot notation target path to the imageHolder mc
function
createItems(numItems,imageDir,clipToDuplicate,imageHolderPath,
image Spacing) {
//for (var h = 0; h<itemPropArray.length; h++) {
for (var h = 0; h<numItems; h++) {
    //get the adUID from array to be used for duplicate movieclip
name
    itemObjUID = itemPropArray[h]["itemUID"];
    //get the adName from array to be used in textfield
    itemThumbNail = itemPropArray[h]["thumbNails"];
    //get the title from array
    itemTitle = itemPropArray[h]["title"];
    itemCaption = itemPropArray[h]["caption"];
    //get the clientUID and userUID to be used in path to image
    clientUID = itemPropArray[h]["clientUID"];
    userUID = itemPropArray[h]["userUID"];
    //duplicate the movieclip
    randomNum = random(1000);
    _root[clipToDuplicate].duplicateMovieClip(itemObjUID,
randomNum);
    //store newly duplicated clipnames in array
    clipNames.push(itemObjUID);
    //set the textfields with title and caption
    set(itemObjUID + imageHolderPath + ".textF.text",
String(itemTitle));
    set(itemObjUID + imageHolderPath + ".captionF.text",
String(itemCaption));
    //set background color of caption textBox
    set(itemObjUID + imageHolderPath +
".captionF.backgroundColor", "0x5A6B73");
    set(itemObjUID + imageHolderPath + ".captionF.borderColor",
"0xCCCCCC");
    //position movie clips
        if (h<1) {
            var xpos = 5;
            setProperty(itemObjUID, _x, xpos);
        }
        else {
            xpos = xpos + imageSpacing;
            setProperty(itemObjUID, _x, xpos);
        }
        //load thumbnails
        loadMovie("http://www.3cdepot.com/ads/images/"+clientUID+"/"+
userUID+"/"+imageDir+"/"+itemThumbNail, itemObjUID +
imageHolderPath + ".imageHolder");
    }
}
//store the number of items from array to be duplicated
arrLength = itemPropArray.length;
play( );
KeyFrame # 4
_root.stop;
// create array to store to be duplicated clip names
thumbClipNames = new Array( );
//function which loops through array and generate a duplicatemovie
statement for each item in array
//numItems accepts number up to max items in catalog
//imageDir points to folder structure where images are stored (either "",
"1", or "½")
```

```
//clipToDuplicate is the name of the parent movieclip to duplicate
//imageHolderPath is the dot notation target path to the imageHolder mc
function
createThumbs(numItems,imageDir,clipToDuplicate,imageHolderPath,
image Spacing) {
  //for (var h = 0; h<itemPropArray.length; h++) {
  for (var i = 0; i<numItems; i++) {
    //get the adUID from array to be used for duplicate
movieclip name
    th_itemObjUID = itemPropArray[i]["itemUID"];
    //give special movieclip name designation to thumbnails
    th_itemObjUID = th_itemObjUID + "th"
    //get the adName from array to be used in textfield
    th_itemThumbNail = itemPropArray[i]["thumbNails"];
    //get the clientUID and userUID to be used in path to
image
    th_clientUID = itemPropArray[i]["clientUID"];
    th_userUID = itemPropArray[i]["userUID"];
    //duplicate the movieclip
    th_randomNum = random(10000);
    _root[clipToDuplicate].duplicateMovieClip(th_itemObjUID,
th_randomNum);
    //store newly duplicated clipnames in array
    thumbClipNames.push(th_itemObjUID);
    //position movie clips
      if (i<1) {
        var th_ypos = 400;
        setProperty(th_itemObjUID, _y, th_ypos);
      }
      else {
        th_ypos = th_ypos + imageSpacing;
        setProperty(th_itemObjUID, _y, th_ypos);
      }
//load thumbnails
loadMovie("http://www.3cdepot.com/ads/images/
"+th_clientUID+"/"+th_userUID+"/"+th_itemThumbNail,
th_itemObjUID + imageHolderPath +
".imageHolderSm");
  }
}
//store the amount of items from array to be duplicated
thumbArrLength = itemPropArray.length;
//function that places thumbnail clips at specified x and y points
function placeThumbs(clipNum,x,y) {
  setProperty(thumbClipNames[clipNum], _x, x);
  setProperty(thumbClipNames[clipNum], _y, y);
}
play( );
KeyFrame # 5
//Send tracking parameters
if (_level0.x != null && _level0.x != "") {
  loadVariablesNum("http://www.3cdepot.com/ads/counter/?x="+_level
0.x+"&t="+_level0.catalogName+"&c="+_level0.c+"&p="+_level0.p,
0);
}
KeyFrame # 6
//call the functions to create ads
createItems(arrLength,"1","itemHolderLg","", 180);
createThumbs(thumbArrLength,"","itemHolderSm","",60);
placeThumbs(0,353,150);
```

A sample of code that is embedded in the ad publisher's ad space on a website is provided below:

```
<%@LANGUAGE="VBSCRIPT" CODEPAGE="1252"%>
<!DOCTYPE html PUBLIC "-//W3C//DTD XHTML 1.0
Transitional//EN" "http://www.w3.org/TR/xhtml1/DTD/xhtml1-
transitional.dtd">
<html xmlns="http://www.w3.org/1999/xhtml">
<head>
<meta http-equiv="Content-Type" content="text/html;
charset=iso-8859-1" />
<title>Ad Module</title>
</head>
<body>
<object classid="clsid:D27CDB6E-AE6D-11cf-96B8-
444553540000"
codebase="http://download.macromedia.com/pub/shockwave/cabs/
flash/swflash.cab#version=7,0,19,0" width="260" height="400"
title="Ad_module_1">
  <param name="movie"
value="http://www.3cdepot.com/ads/module_1.swf?keywords=<%
= Request.QueryString("q") %>" />
  <param name="quality" value="high" />
  <embed
src="http://www.3cdepot.com/ads/module_1.swf?keywords=<%=
Request.QueryString("q") %>" quality="high"
pluginspage="http://www.macromedia.com/go/getflashplayer"
type="application/x-shockwave-flash" width="260"
height="400"></embed>
</object>
</body>
</html>
</html>
```

A sample of code embedded in a search engine ad publisher's ad space is provided below:

```
<!DOCTYPE html PUBLIC "-//W3C//DTD XHTML 1.0
Transitional//EN" "http://www.w3.org/TR/xhtml1/DTD/xhtml1-
transitional.dtd">
<html xmlns="http://www.w3.org/1999/xhtml">
<head>
<meta http-equiv="Content-Type" content="text/html;
charset=iso-8859-1" />
<title>Ad Module</title>
</head>
<body>
<object classid="clsid:D27CDB6E-AE6D-11cf-96B8-
444553540000"
codebase="http://download.macromedia.com/pub/shockwave/cabs/
flash/swflash.cab#version=7,0,19,0" width="260" height="400"
title="Ad_module_1">
  <param name="movie"
value="http://www.3cdepot.com/ads/module_1.swf" />
  <param name="quality" value="high" />
  <embed src="http://www.3cdepot.com/ads/module_1.swf"
quality="high"
pluginspage="http://www.macromedia.com/go/getflashplayer"
type="application/x-shockwave-flash" width="260"
height="400"></embed>
</object>
</body>
</html>
```

As directed by the billboard module, the dispatcher server conducts an auction to select the ad to be displayed from those that have bid for display with reference to the particular keyword(s) or topic and then retrieves the selected ad's ad parameter/command file from the dispatcher server (.swf file or HTML, asap, net, or AJAX file in which .swf file is embedded). Sample ad auction algorithm code is provided below:

```
CREATE PROCEDURE dbo.ab_AdAuction
(@keywords nvarchar(50), @blockSize INT, @area tinyint, @cityUID INT,
@stateCode varchar(2), @dup_postingUID INT)
AS
SET NOCOUNT ON
BEGIN
```

```
DECLARE @areaStr varchar(200), @postingSrt varchar(200), @rq
varchar(8000), @li INT, @total_ratinginBlock decimal(9,4), @procentage
decimal(9,4), @numberofrecords INT, @item_table TINYINT,
@fakeCategoryUID INT, @postingUID INT
DECLARE @ID INT, @views decimal(9,2), @clicks decimal(9,2), @percentage
decimal(9,4), @bid money, @cnt INT, @ctr decimal(9,4), @rating decimal(9,4)
DECLARE @numberofBlocks INT, @av_clicks decimal(9,2), @av_views
decimal(9,2), @av_ctr decimal(9,4), @totalAds tinyint
CREATE TABLE #table2 (blockNumber INT, [ID] INT, ctr decimal(9,4), rating
decimal(9,4), bid money, [views] INT, clicks INT, rating_pr decimal(9,4), view_pr
decimal(9,4), postingUID INT )
CREATE TABLE #table1 ([ID] INT, ctr decimal(9,4), rating decimal(9,4), bid
money, [views] decimal(9,4), clicks decimal(9,4), postingUID INT)
SET @totalAds = 0
-- Get city local -based search result
SET @areaStr = "
IF @area <> 0
SET @areaStr = ' AND area='+Str(@area)
SET @postingSrt = "
IF @dup_postingUID <> 0
SET @postingSrt = ' AND postingUID <> '+Str(@dup_postingUID)
SET @rq = 'DECLARE ad_cursor CURSOR SCROLL KEYSET FOR SELECT
TOP 20 [ID], [views], clicks, bid, postingUID FROM dbo.adsWHERE ad_option =
2 AND cityUID='+Str(@cityUID)+' AND local_flag IS NOT NULL AND stop_flag
IS NULL'+@areaStr+@postingSrt
IF @keywords <> "
SET @rq = 'DECLARE ad_cursor CURSOR SCROLL KEYSET FOR SELECT
TOP 20 [ID], [views], clicks, bid, postingUID FROM dbo.adsWHERE FREETEXT
(*,"'+@keywords+'") AND ad_option = 2 AND cityUID='+Str(@cityUID)+' AND
local_flag IS NOT NULL AND stop_flag IS NULL'+@areaStr+@postingSrt
EXEC (@rq)
OPEN ad_cursor
SET @numberofrecords = @@CURSOR_ROWS
FETCH ABSOLUTE 1 FROM ad_cursor INTO @ID, @views, @clicks, @bid,
@postingUID
     SET @cnt=0
     WHILE @@FETCH_STATUS=0 AND @cnt < 20
     BEGIN
SET @ctr = 0
SET @rating = 0
IF @views > 0 AND @clicks > 0
BEGIN
SET @rating =100
SET @ctr = ((@rating / @views) * @clicks)
SET @rating = (@bid * @ctr)
END
INSERT #table1 VALUES (@ID, @ctr, @rating, @bid, @views, @clicks,
@postingUID)
          FETCH NEXT FROM ad_cursor INTO @ID, @views, @clicks,
@bid, @postingUID
          SET @cnt = @cnt+1
          SET @totalAds = @totalAds +1
     END
CLOSE ad_cursor
DEALLOCATE ad_cursor
-- Get state-based search result (it could be also based on msa, cbsa, csa or
other region criteria)
IF @totalAds < @blockSize
BEGIN
SET @rq = 'DECLARE ad_cursor CURSOR SCROLL KEYSET FOR SELECT
TOP 20 [ID], [views], clicks, bid, postingUID FROM dbo.adsWHERE ad_option =
2 AND stateCode="'+@stateCode+'" AND local_flag IS NULL AND stop_flag IS
NULL'+@areaStr+@postingSrt
IF @keywords <> "
SET @rq = 'DECLARE ad_cursor CURSOR SCROLL KEYSET FOR SELECT
TOP 20 [ID], [views], clicks, bid, postingUID FROM dbo.adsWHERE FREETEXT
(*,"'+@keywords+'") AND ad_option = 2 AND stateCode="'+@stateCode+'"
AND local_flag IS NULL AND stop_flag IS NULL'+@areaStr+@postingSrt
EXEC (@rq)
OPEN ad_cursor
SET @numberofrecords = @@CURSOR_ROWS
FETCH ABSOLUTE 1 FROM ad_cursor INTO @ID, @views, @clicks, @bid,
@postingUID
     SET @cnt=0
     WHILE @@FETCH_STATUS=0 AND @cnt < 20
     BEGIN
SET @ctr = 0
SET @rating = 0
IF @views > 0 AND @clicks > 0
```

-continued

```
BEGIN
SET @rating =100
SET @ctr = ((@rating / @views) * @clicks)
SET @rating = (@bid * @ctr)
END
INSERT #table1 VALUES (@ID, @ctr, @rating, @bid, @views, @clicks,
@postingUID)
        FETCH NEXT FROM ad_cursor INTO @ID, @views, @clicks,
@bid, @postingUID
            SET @cnt = @cnt+1
            SET @totalAds = @totalAds +1
    END
CLOSE ad_cursor
DEALLOCATE ad_cursor
END
-- Get national search result
IF @totalAds < @blockSize
BEGIN
SET @rq = 'DECLARE ad_cursor CURSOR SCROLL KEYSET FOR SELECT
TOP 20 [ID], [views], clicks, bid, postingUID FROM dbo.adsWHERE ad_option =
2 AND stateCode <> '''+@stateCode+''' AND local_flag IS NULL AND stop_flag
IS NULL'+@areaStr+@postingSrt
IF @keywords <> ''
SET @rq = 'DECLARE ad_cursor CURSOR SCROLL KEYSET FOR SELECT
TOP 20 [ID], [views], clicks, bid, postingUID FROM dbo.adsWHERE FREETEXT
(*,'''+@keywords+''') AND ad_option = 2 AND stateCode <> '''+@stateCode+'''
AND local_flag IS NULL AND stop_flag IS NULL'+@areaStr+@postingSrt
EXEC (@rq)
OPEN ad_cursor
SET @numberofrecords = @@CURSOR_ROWS
FETCH ABSOLUTE 1 FROM ad_cursor INTO @ID, @views, @clicks, @bid,
@postingUID
    SET @cnt=0
    WHILE @@FETCH_STATUS=0 AND @cnt < 100
    BEGIN
SET @ctr = 0
SET @rating = 0
IF @views > 0 AND @clicks > 0
BEGIN
SET @rating =100
SET @ctr = ((@rating / @views) * @clicks)
SET @rating = (@bid * @ctr)
END
INSERT #table1 VALUES (@ID, @ctr, @rating, @bid, @views, @clicks,
@postingUID)
        FETCH NEXT FROM ad_cursor INTO @ID, @views, @clicks,
@bid, @postingUID
            SET @cnt = @cnt+1
            SET @totalAds = @totalAds +1
    END
CLOSE ad_cursor
DEALLOCATE ad_cursor
END
-- run in case to fill out without keywords
IF @keywords <> ''
IF @totalAds < @blockSize
BEGIN
SET @rq = 'DECLARE ad_cursor CURSOR SCROLL KEYSET FOR SELECT
TOP 20 [ID], [views], clicks, bid, postingUID FROM dbo.adsWHERE stop_flag IS
NULL AND ad_option=2 AND local_flag IS NULL AND postingUID NOT IN
(SELECT postingUID FROM #table1) ORDER BY [ID] DESC'
EXEC (@rq)
OPEN ad_cursor
SET @numberofrecords = @@CURSOR_ROWS
FETCH ABSOLUTE 1 FROM ad_cursor INTO @ID, @views, @clicks, @bid,
@postingUID
    SET @cnt=0
    WHILE @@FETCH_STATUS=0 AND @cnt < 100
    BEGIN
SET @ctr = 0
SET @rating = 0
IF @views > 0 AND @clicks > 0
BEGIN
SET @rating =100
SET @ctr = ((@rating / @views) * @clicks)
SET @rating = (@bid * @ctr)
END
INSERT #table1 VALUES (@ID, @ctr, @rating, @bid, @views, @clicks,
@postingUID)
```

```
            FETCH NEXT FROM ad_cursor INTO @ID, @views, @clicks,
@bid, @postingUID
                SET @cnt = @cnt+1
                SET @totalAds = @totalAds +1
        END
CLOSE ad_cursor
DEALLOCATE ad_cursor
END
-- Set variables for sorting
DECLARE @totalRating decimal(9,4), @totalViews decimal(9,4), @rating_pr
decimal(9,4), @view_pr decimal(9,4), @avg_rating decimal(9,4), @min_rating
decimal(9,2)
SET @totalRating = (SELECT SUM(rating) FROM #table1)
SET @totalViews = (SELECT SUM([views]) FROM #table1)
--SET @avg_rating = (SELECT AVG(rating) FROM #table1)
SET @avg_rating = (SELECT MAX(rating) FROM #table1)
-- Sort ads by ratings
DECLARE ad_cursor CURSOR SCROLL KEYSET FOR SELECT [ID], ctr, rating,
bid, [views], clicks, postingUID FROM #table1 ORDER BY rating DESC, bid
DESC
OPEN ad_cursor
SET @numberofrecords = @@CURSOR_ROWS
FETCH ABSOLUTE 1 FROM ad_cursor INTO @ID, @ctr, @rating, @bid,
@views, @clicks, @postingUID
        SET @cnt=0
        SET @li = 0
        SET @numberofBlocks = 1
        SET @total_ratinginBlock = 0
        WHILE @@FETCH_STATUS=0 AND @cnt < (@numberofrecords+1)
        BEGIN
IF @li < @blockSize
SET @li = @li+1
ELSE
BEGIN
SET @li = 1
SET @numberofBlocks = @numberofBlocks + 1
END
IF (@views < 100 OR @views IS NULL) AND (@clicks = 0 OR @clicks IS
NULL)
SET @rating = @avg_rating
IF @totalRating > 0
SET @rating_pr = (100 / @totalRating * @rating)
IF @totalViews > 0
SET @view_pr = (100 / @totalViews * @views)
IF @cnt < 5
UPDATE dbo.adsSET [views]=[views] +1 WHERE [ID]=@ID AND ad_option=2
INSERT #table2 VALUES (@numberofBlocks, @ID, @ctr, @rating, @bid,
@views, @clicks, @rating_pr, @view_pr, @postingUID)
                FETCH NEXT FROM ad_cursor INTO @ID, @ctr, @rating,
@bid, @views, @clicks, @postingUID
                SET @cnt = @cnt+1
        END
CLOSE ad_cursor
DEALLOCATE ad_cursor
DROP TABLE #table1
SELECT TOP 5 a.[ID], a.rating_pr, a.view_pr, b.area, a.postingUID,
b.posting_date, b.main_categoryUID, folder=CASE WHEN b.url='class'THEN
'class' ELSE 'item' END, b.title, heading=CASE
WHEN (b.heading IS NOT NULL AND b.heading <> '') THEN b.heading ELSE
b.heading_alt END, b.price, b.specialPrice, b.onSpecial, b.[description], b.src,
region=(b.city+', '+b.stateCode), b.timeZone, b.categoryName,
b.sub_categoryUID, b.subCategoryName FROM #table2 a INNER JOIN
dbo.depot_items b ON a.postingUID=b.[ID]
DROP TABLE #table2
END
GO
```

Using the data from the dispatcher server, the coding of the .swf template file renders the advertisement, drawing a variety of elements including messaging, including text, images, and third party digital content from a variety of locations. A sample of coding that retrieves the parameter/command data for the ad selected by the auction is provided below:

```
<%@LANGUAGE="VBSCRIPT" CODEPAGE="1252"%>
<%
Dim searchString, numberOfSpots, category, city, stateCode,
postingUID, i
searchString = "key words sent from ad module"
numberOfSpots = 5 ' can be any number starting from 1
category = 3 ' if there are category-based
city = 1180 ' city ID in database
stateCode = "AZ" ' or other region criteria
postingUID = 0 ' needed to filter ads of the product on the actual product
page
i= 0
set adsRs = Server.CreateObject("ADODB.Recordset")
adsRs.ActiveConnection = connection_string
adsRs.CursorType = 0
adsRs.CursorLocation = 2
adsRs.LockType = 3
adsRs.Open("dbo.ab_AdAuction '" & searchString & "', " &
numberOfSpots & ", " & category & ", " & city & ", '" & stateCode
& "', " & postingUID)
While Not adsRs.EOF
Response.Write "&ad" & i "=" & adsRs.Fields.Item("ID").Value
i = i + 1
  adsRs.MoveNext
  Wend
adsRs.Close( )
adsRs.ActiveConnection = Nothing
Set adsRs = Nothing
%>
```

Using data received from the dispatcher server, the coding of the .swf file also establishes a connection to a tracking server which is preferably used to store and provide to system users website advertisement viewer activity tracking data. On viewer interaction, such as via clicks, the coding of the .swf file establishes two substantially simultaneous connections, with one to the indicated tracking server for tracking purposes and the second is the actual link from the ad location to the advertised content (click-through scenario). A sample depiction of an ad parameter/command database file stored in the system dispatcher server is provided in FIG. 4.

The method of the present invention in a preferred embodiment comprises the steps of: selecting one or more digital content files previously stored in electronic file format in a mass storage device of a computer system made available for licensing on a cost-per-click, cost-per-impression or other pay-per-use basis for use in creating an ad for placement on a website or other network location; storing in an ad parameter/command file within a database at the system dispatcher server the commands needed to retrieve and assemble said licensed content as well as the total cost-per-click or other cost-per-use of the licensed content used in the ad, the keyword topic terms, if any, that the ad will be associated with and the advertiser's bid amount for display of the ad at a specified location when the specified search terms are entered as search queries or clicked on as links and tracking parameters, for use upon selection of the ad to be displayed placing an ad billboard module at the desired ad display network location, which, when clicked on by the website user, causes the website or other location to communicate with the dispatcher server to execute a real-time auction to select the ad to be displayed, and then retrieve the stored ad parameter/command file for the selected ad from the dispatcher server database and then using the retrieved values in said data string and commands for said ad placement, to retrieve the ad content files from where they are stored, assemble them into the overall ad and display them at the specified network location. The advertisement viewer is then directed to specified go-to web page(s) depending on said advertisement viewer's activity with respect to said advertisement. The advertiser is charged the total cost-per-click or other cost-per-use charge for the licensed and content and the ad space every time the advertiser's ad is run and, the content licensor and ad space location owner are paid.

In a preferred embodiment, the ad viewer can access and view the advertisements without having to download or cache any files on the website user's system. Utilizing FSDC technology, the ad's custom tracking parameters as well as the ad viewer's actions in clicking on the ad links provided is itself used as a tracking signal by the system and is saved in the related tracking database.

Figure 6:
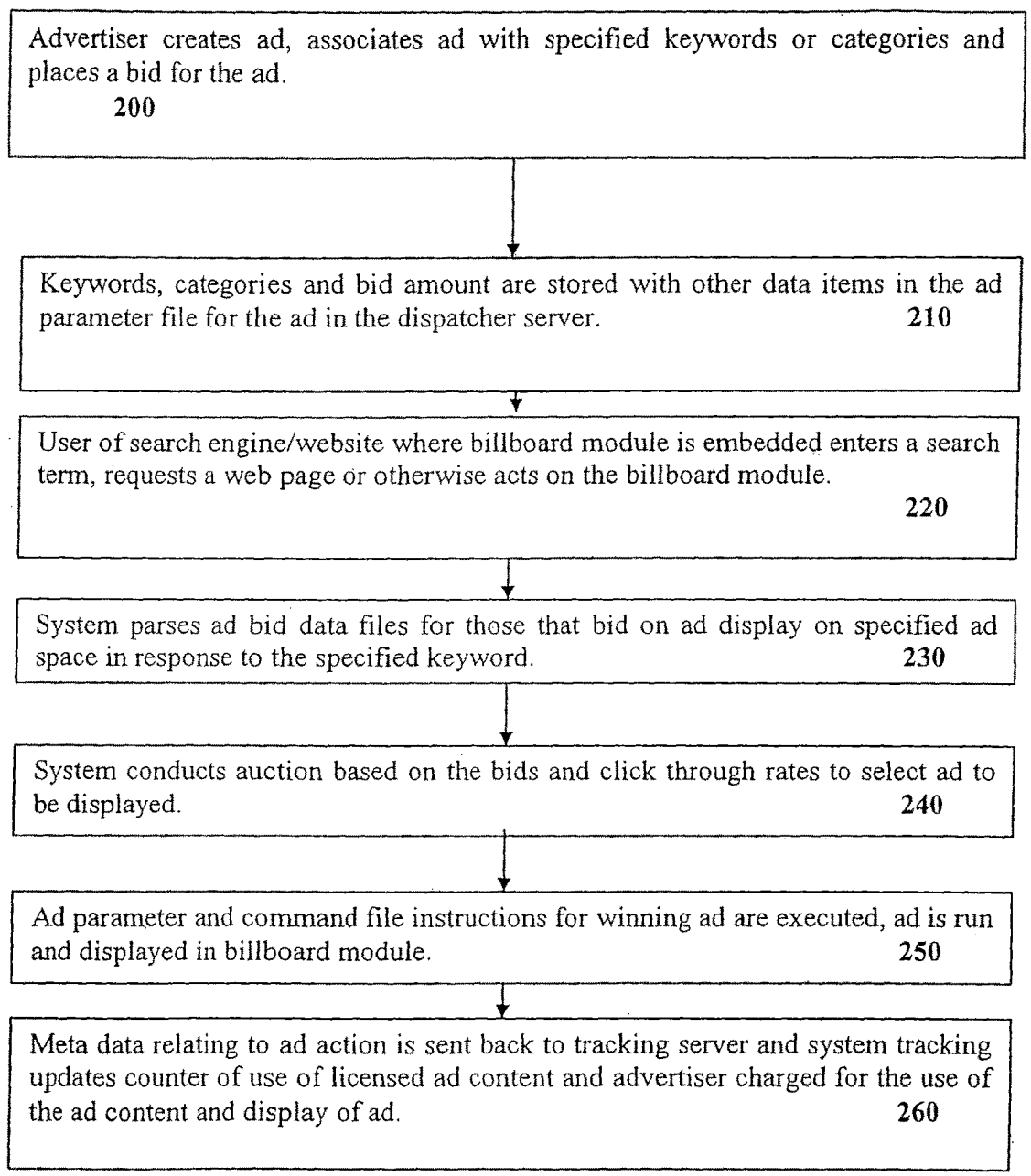
FIG. 6 is a flow chart depicting the ad spot-auction process flow.

Referring now to FIG. 6, when a network user (in an Internet-based embodiment) requests a webpage where the billboard module is embedded, referencing a keyword, or enters a query using the keyword 220, the billboard module executes a request to the system's dispatcher server to run a real-time auction for selection of the particular ad file to be displayed from the group of ad files that have the same keyword and display location references based on the bids placed for display of such ads 240 or based upon ad parameters, including but not limited to, click-through rate, ad space size, display region and ad type, or a combination of such parameters and bids, and then to retrieve the ad placement parameter file for the selected ad 200. This ad file may be a static HTML image file, but also may be an advertising template file that plays within the module and refers to the dispatcher server which contains unique identifiers for that particular ad placement transaction stored in the database. The database can be in SQL Server format, or, alternatively, it can be in Oracle, Microsoft Access or any other server-based database format. The database stores the unique parameters for the particular ad placement rendering. The stored information contains the following components in addition to other customizable parameters:

1. URL link to the ad content files to be shown (the ad content files can be located on any server, but are preferably stored in a database within a separate content server so that updating of content files can be done separately from use of the system at one web location rather than on every website where an ad is placed).
2. Variables that hold custom parameters for tracking (as many as needed), including link(s) to click action target page or pages.
3. The cost-per-click or other cost-per-use charge total for the licensed content used in the ad.
4. The "bid" price for display of the ad in a desired location and/or in response to one or more specified search query terms.
5. The specified search keywords/query terms with which the ad will be associated.

The dispatcher server, in response to the request, initiates the link to the ad template file at the ad server and passes into it the following information: messaging including text and font format, location of images, location of third party digital content files, Location of link to go-to page, click destinations and variables that contain custom tracking parameters 210. The ad then grabs this information from the query string and acts accordingly (displaying ad file 250 and sending tracking parameters to a tracking server using FSDC in a preferred embodiment 260).

System Screens

As further described below, FIGS. 7-35 depict representative samples of the system's graphical user interface screens, which provide a system user template for creating parameter/command uniform resource locator address data string files for retrieval, assembly and display, to be stored as files within the database of the dispatcher server.

FIGS. 9-21, each discussed further below, depict sample system user screens for users of the system seeking to create and place ads. These screens walk the advertiser through a straightforward process of creating the ad, including selection of ad content, inputting text and messaging for the ad, designating the ad title, click destination, size, associated keywords and/or categories, ad placement payment options, budgeting, geographic region for ad coverage and other parameters. The screens can have, as depicted in the samples, main menu items such as "Create New Ad" which leads to the screens for creating new ads and "My Rich Media Ads" which leads to screens whereby the users of the system can access and use the ads.

FIG. 7 depicts a sample system user/advertiser user registration login screen. Users who are registered with the system enter their user identification and password to access the system as depicted in FIG. 8. New operator users must register with the system by completing an online form as depicted in FIG. 7. Once logged in, website operator users are presented with a screen such as FIG. 8 which has various options, including edit user information, portfolio and tracking and add new advertisement.

Figure 10:
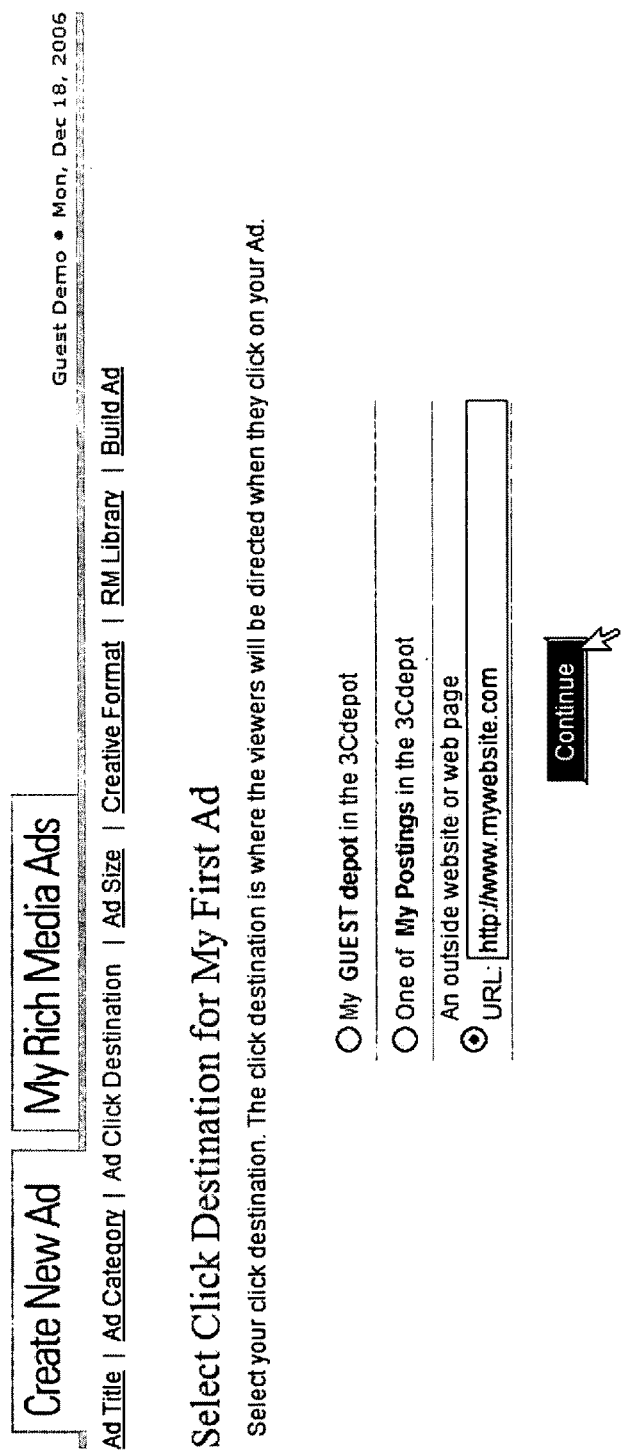
FIG. 10 depicts a sample advertisement click destination input screen.
Figure 11:
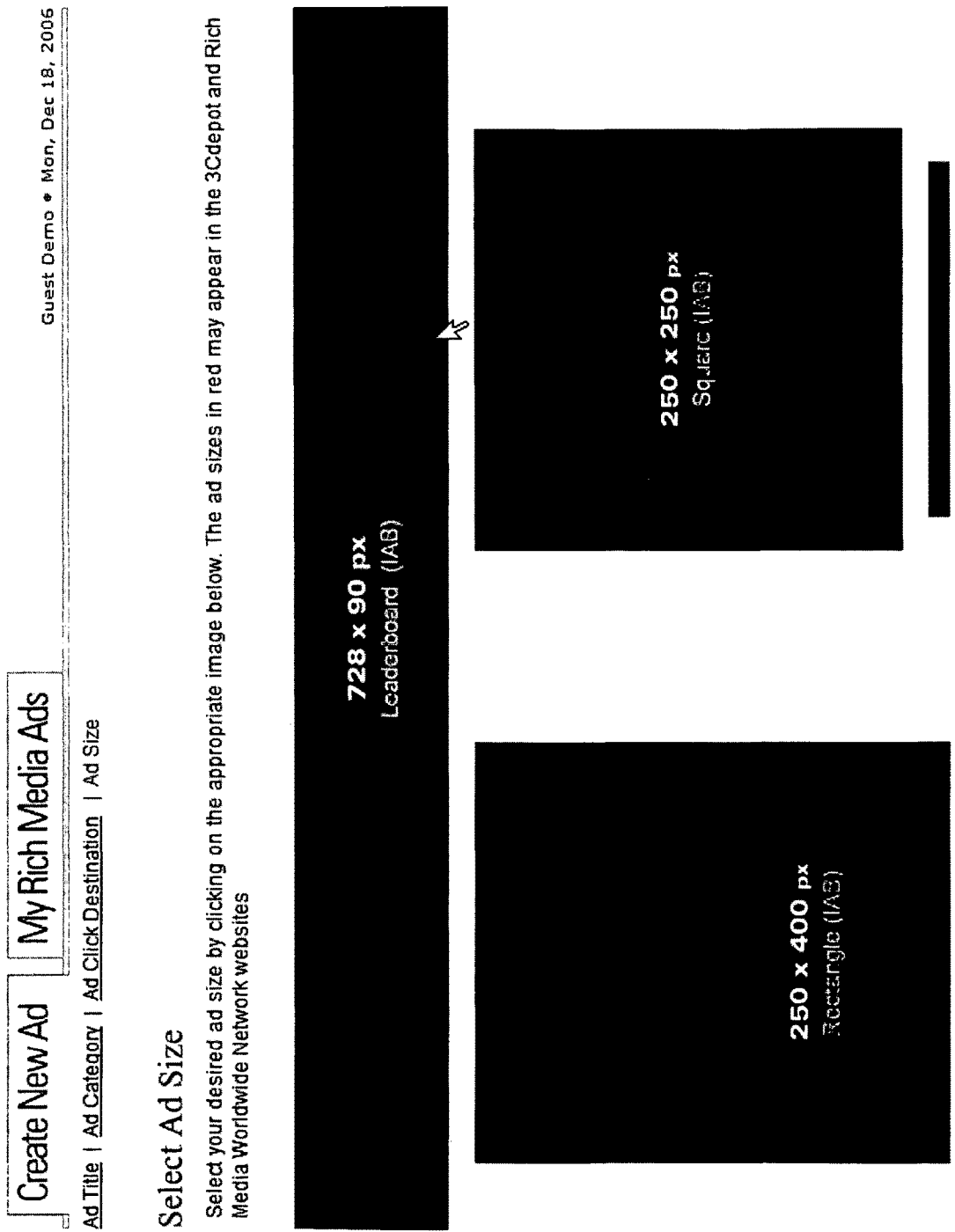
FIG. 11 depicts a sample system user ad size selection screen.
Figure 12:
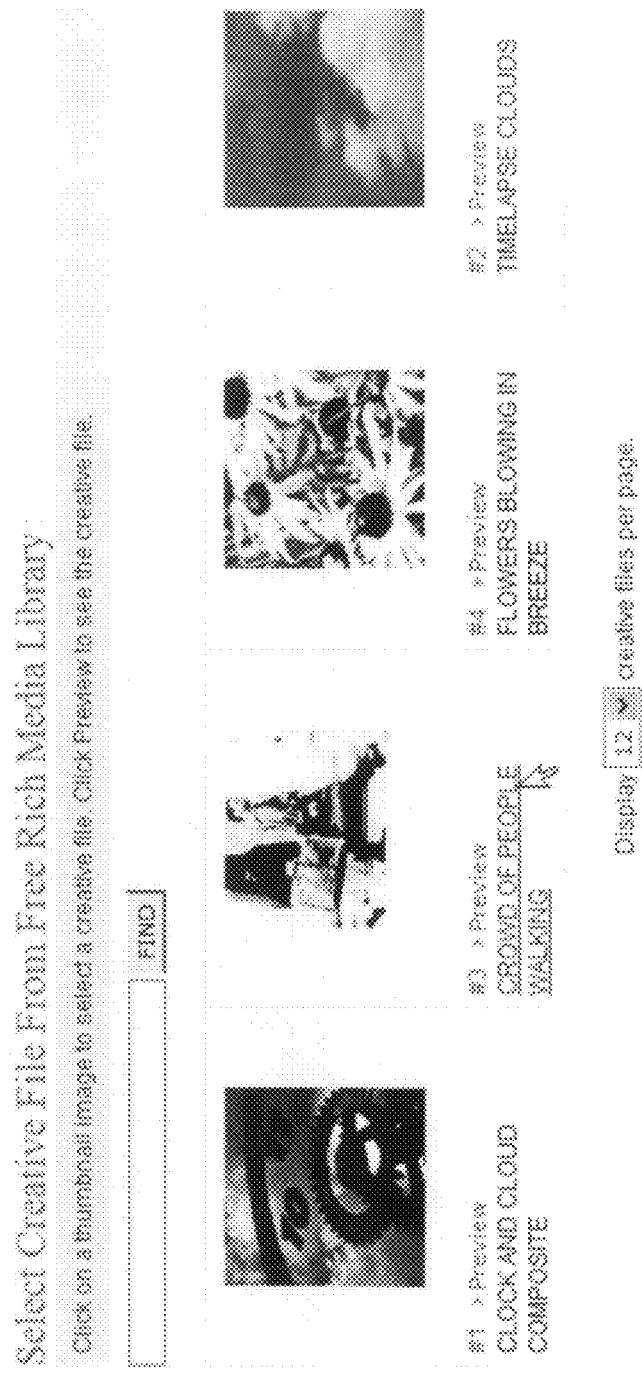
FIG. 12 depicts a sample system advertisement creative content catalog and selection screen.
Figure 13:
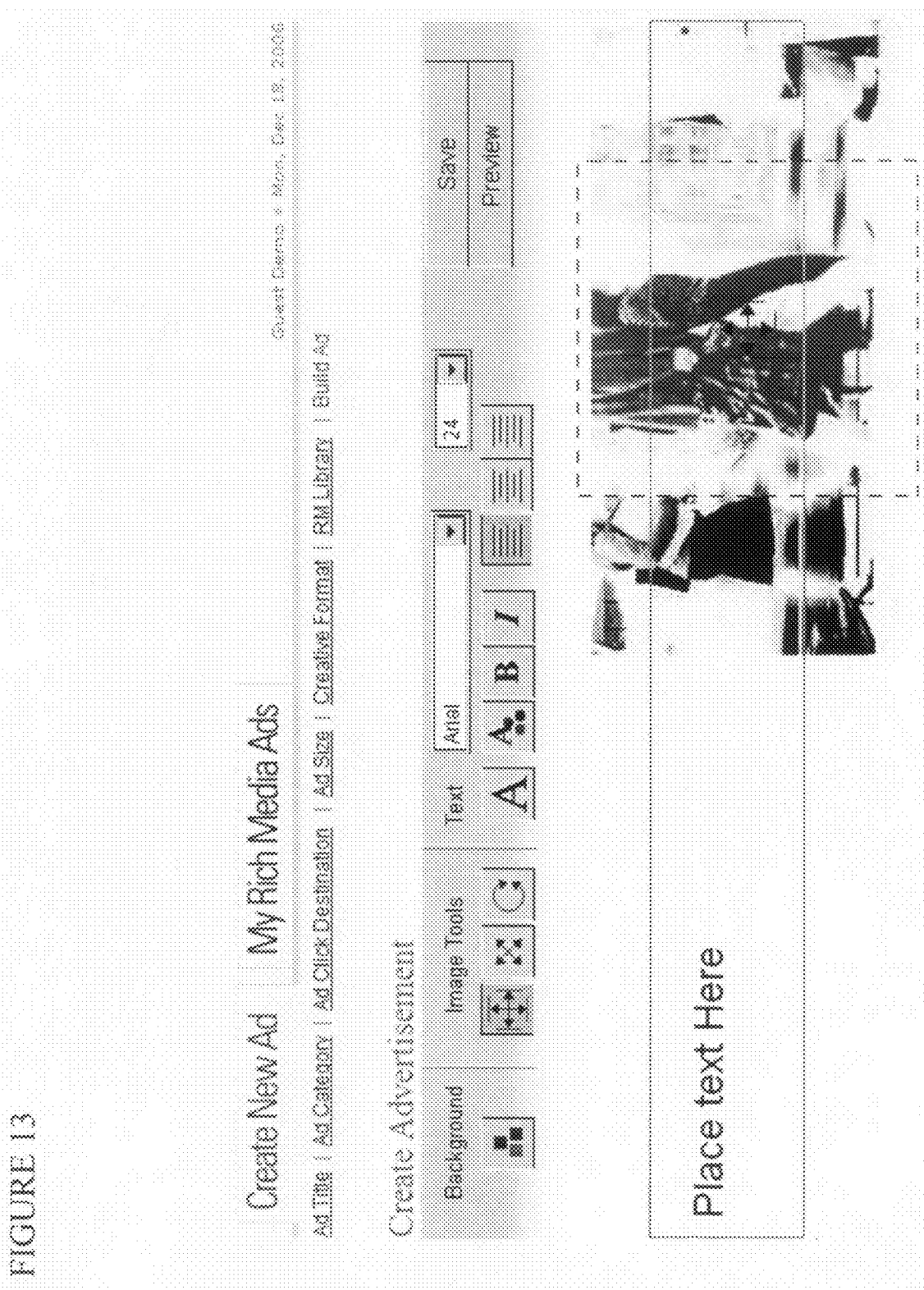
FIG. 13 depicts a sample system ad text and messaging input screen.
Figure 20:
FIG. 20 depicts a sample ad budget data input screen.

FIG. 9 depicts a sample initial advertisement creation input screen. After logging in, the advertisers enters a title for the ad to be created. The advertiser then enters the destination for the advertisement, which is where the ad viewers will be directed when they click on the ad. The advertiser can designate its own website or a third party website or can designate the system's e-commerce depot which allows advertisers that do not have e-commerce capability of their own to use the system's features which allow ad viewers to purchase the advertiser's products on services, providing electronic payment and order/purchase processing. FIG. 10 depicts a sample advertisement click destination input screen. The advertiser then selects the ad size at a screen such as the sample screen depicted in FIG. 11. The advertiser then selects the ad creative content files to be used in the ad, via a content library provided via a user screen such as the sample screen depicted in FIG. 12. The advertiser then enters the advertiser's desired ad text and messaging, via an input screen such as the sample ad text and messaging input screen depicted in FIG. 13. The advertiser then previews and saves the ad, via a screen such as the sample preview and save screen depicted in FIG. 14. The advertiser then selects the geographic region for which to run the ad. This feature enables very targeted advertising. FIG. 15 depicts a sample geographic region input screen. The advertiser then selects a payment program for the ad via an ad placement options screen such as the sample screen depicted in FIG. 16. The options, as previously mentioned can include all varieties of payment, such as, without limitation, pay-per-click, payment of a specified fixed amount for a specified number of views, ad swapping, bartering, and other payment options. The advertiser then enters keywords to be associated with the ad, as well as the advertiser's bid for display of the ad when triggered by the designated keywords. FIG. 17 depicts a sample keyword and maximum bid amount input screen, in an embodiment utilizing a pay per click ad charging payment option. The advertiser can test in real time the effectiveness of its keyword and bid selections and calibrate them accordingly to achieve best results. The advertiser also creates an advertising budget if the ad is being paid for via a pay per view/impression payment option, via an ad placement plan budget input screen such as the sample screen depicted in FIG. 18. The advertiser also can select target categories to be associated with the ad, via a target category selection screen such as the sample screen depicted in FIG. 19. FIG. 20 depicts a sample of another ad budget data input screen where an advertiser can create a budget using different parameters, such as, for example, but without limitation, a maximum several budget or a maximum daily limit. The advertiser then enters payment information, such as the advertiser's credit card data to pay for the ad. When the advertiser clicks "Submit" as depicted in FIG. 21 (an ad payment data input screen), all of the ad information is sent to the dispatcher server and the ad is published.

FIGS. 22-32, each discussed further below depict sample system users screens for users that have websites and are seeking to publish ads on their own site. As shown in the figures referenced above, the screens can have several menu items, such as, for example but without limitation, "My Websites" which includes the ad publisher's website information, "My Billboards," which includes the parameter files for billboards established by the ad publisher, and "Create New Billboard," which leads to the screens that take the ad publisher through the steps for establishing a billboard for display of system ads.

Figure 24:
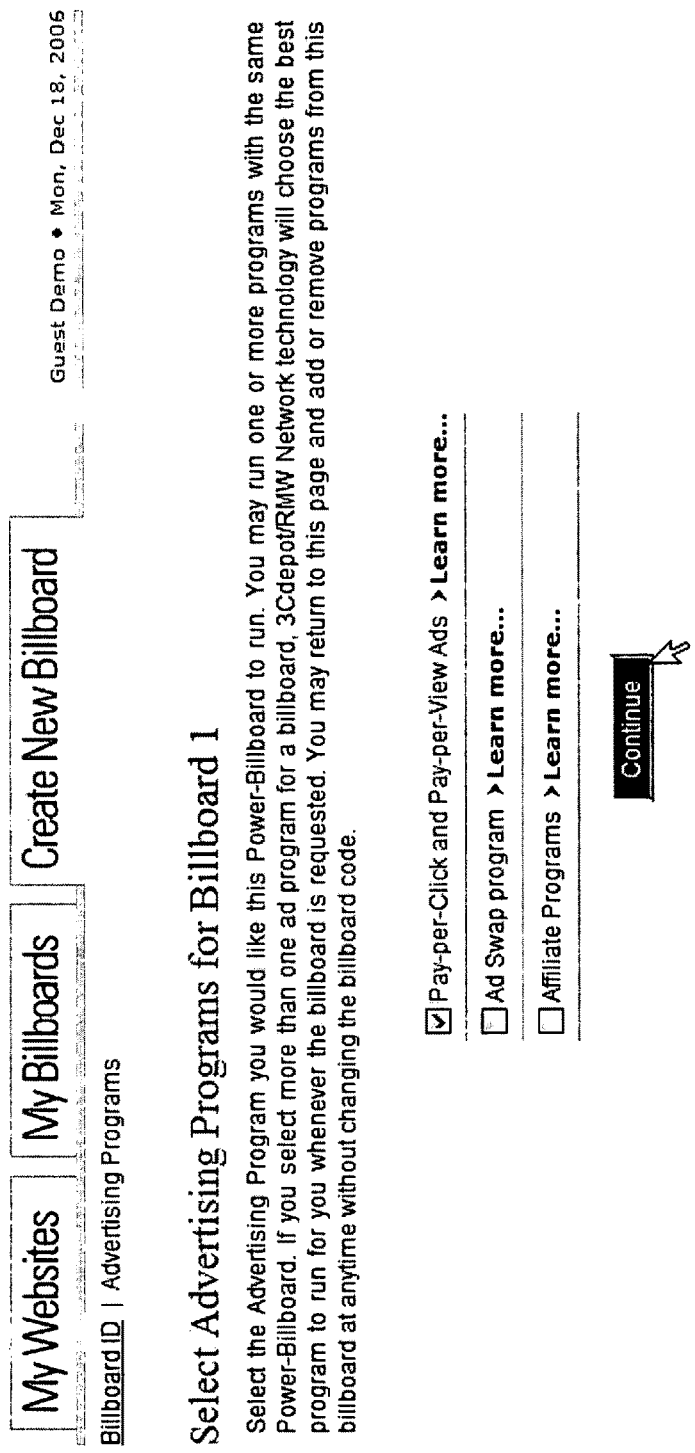
FIG. 24 depicts a sample billboard advertising program selection screen.
Figure 25:
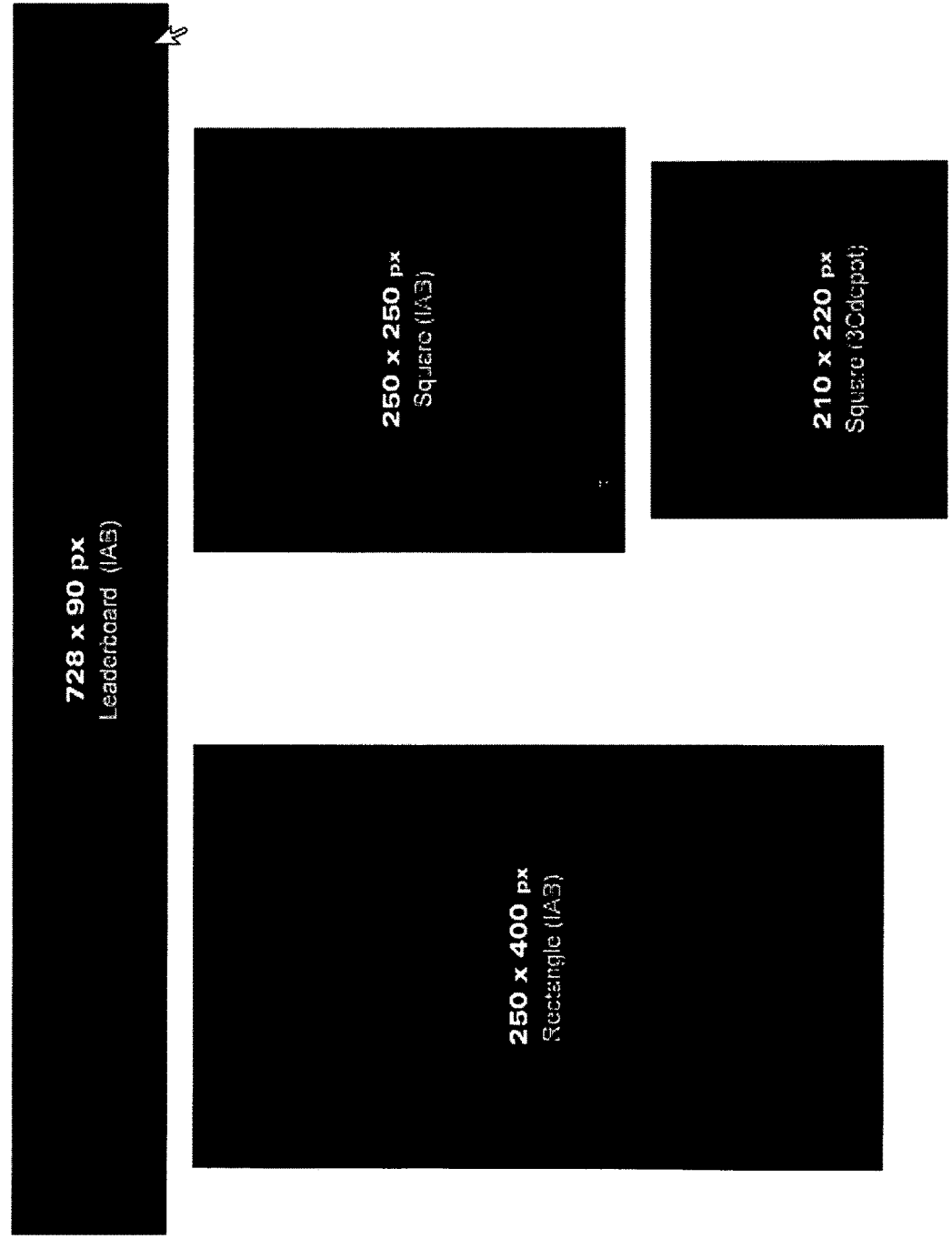
FIG. 25 depicts a sample ad publisher billboard size selection screen.
Figure 26:
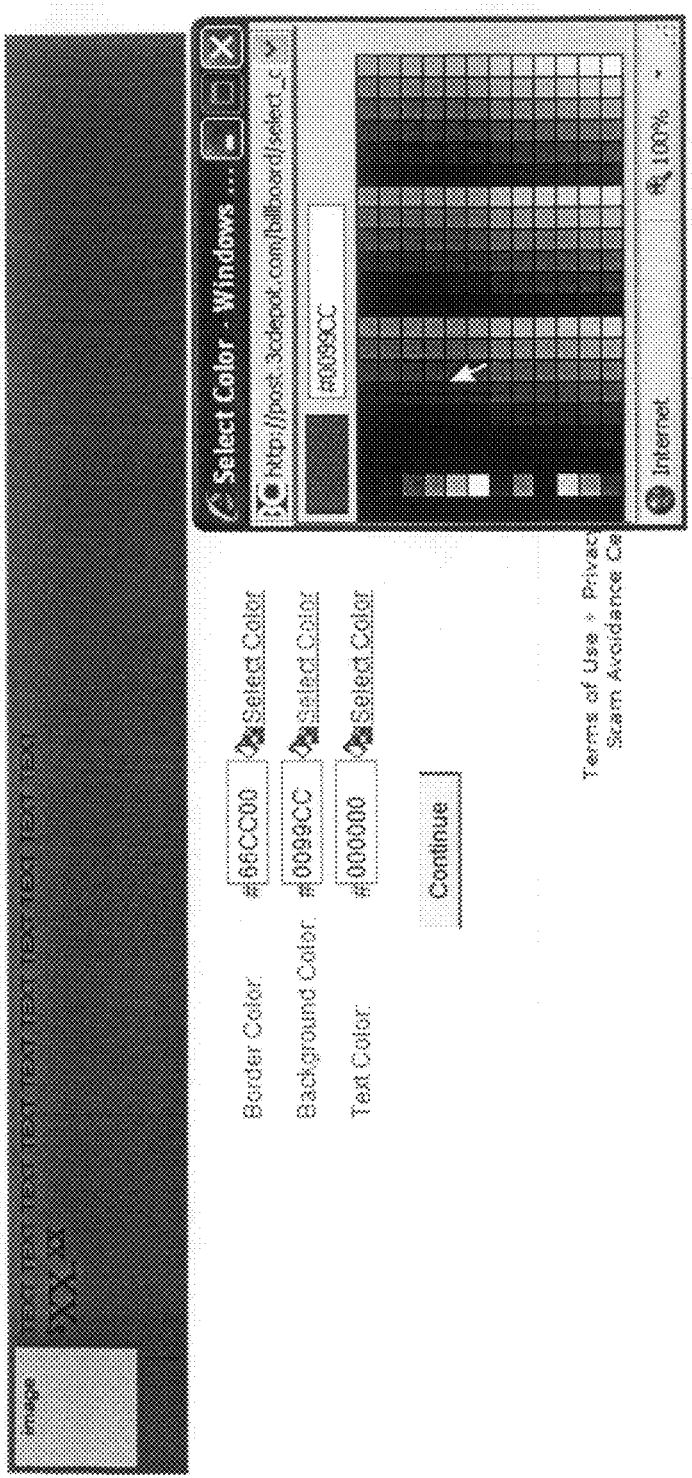
FIG. 26 depicts a sample billboard module customization selection screen.
Figure 28:
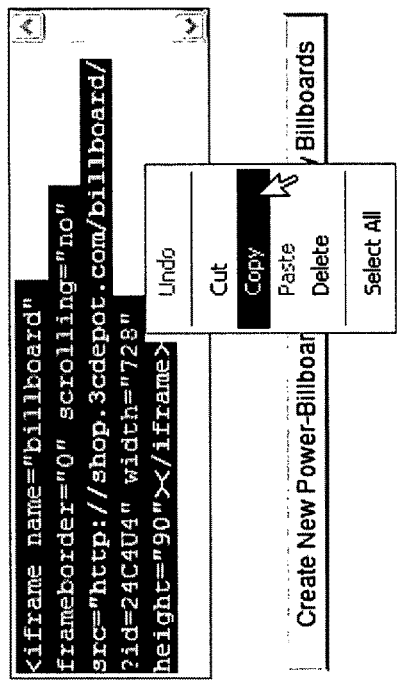
FIG. 28 depicts a sample ad publisher billboard code copying screen.
Figure 30:
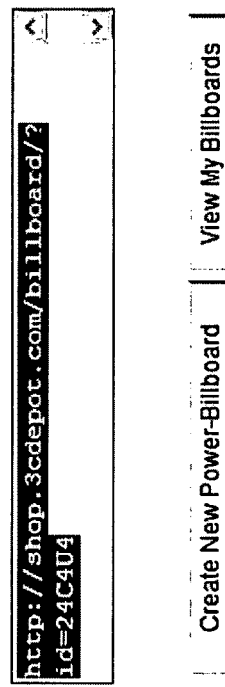
FIG. 30 depicts a sample interstitial ad/billboard URL copying screen.

Ad publishers first register their website and upload their website logo into the system via a Website Registration screen such as the sample screen depicted in FIG. 22. The ad publisher then enters an identification for the billboard to be created via a billboard ID input screen such as the sample depicted in FIG. 23. The ad publisher selects a payment program to associate with the billboard being created. These are the parameters by which the ad publisher would charge when an ad is displayed in the billboard. FIG. 24 depicts a sample advertising program selection screen, showing three non-limiting examples of options, such as pay per click or pay per view, ad swapping and affiliate programs. The ad publisher also selects the size for the billboard via a size selection screen such as the sample depicted in FIG. 25. The ad publisher can customize the billboard by selecting border color, background color, text color or select options to match the ad publisher's website. FIG. 26 depicts a sample customization selection screen. The ad publisher then selects target categories to be associated with the billboard for relevant ad placement. FIG. 27 depicts a sample billboard target category selection screen. The ad publisher then receives code to copy and paste into their website page, via a "Get Code for Billboard" screen such as the sample depicted in FIG. 28. If an interstitial advertisement billboard is set up, (where the advertisement runs between web pages) the ad publisher is also prompted to enter the URL for the skip/destination web page. FIG. 29 depicts a sample skip/destination URL input screen. In the case of interstitial ads, the ad publisher is given a unique URL generated by the system which the publisher copies and pastes into the ad publisher's website in the place of the skip/destination URL. When an ad viewer clicks on the link/billboard space, the user first sees the interstitial ad, then the destination page. If the viewer clicks on the ad then the viewer is directed to the interstitial ad's destination URL that was specified by the advertiser that created the ad. FIG. 30 depicts a sample interstitial URL copying screen. The ad publisher places the billboard module code in their website. When the website page is requested, the billboard module communicates with the dispatcher server and an advertiser's ad is selected and rendered in the billboard module space on the designated page. FIG. 31 depicts a sample ad publisher billboard location within a website screen, showing the placement of the billboard module, represented by the "Need Shoes??? Click Here!" area of the screen. With search engine websites, when the page is requested, the system determines the searched keyword and passes it to the billboard module and the billboard module communicates with the system dispatcher server and advertiser's ad is selected and rendered in the billboard module on the ad publisher's web page. A sample of a rendered shoe ad in response to a query using the Keyword "Shoes" is depicted in the sample ad publisher search engine web page screen in FIG. 32. The system also provides various operational parameter/data screens. FIG. 33 depicts a sample ad parameter data base listing showing multiple ad parameter files. FIG. 34 depicts a sample ad campaign statistics screen with data regarding performance of ads and budget consumption. FIG. 35 depicts a sample single ad statistic screen.

Figure 14:
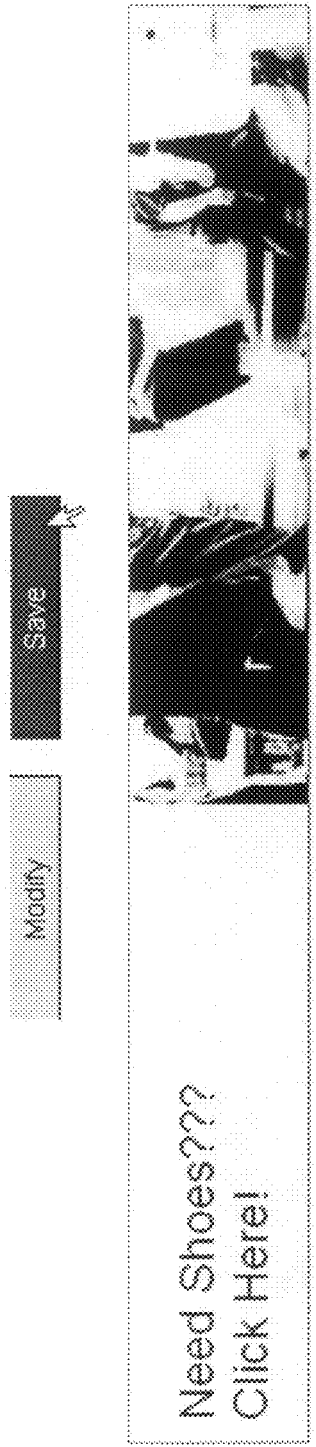
FIG. 14 depicts a sample system ad preview and save screen.
Figure 15:
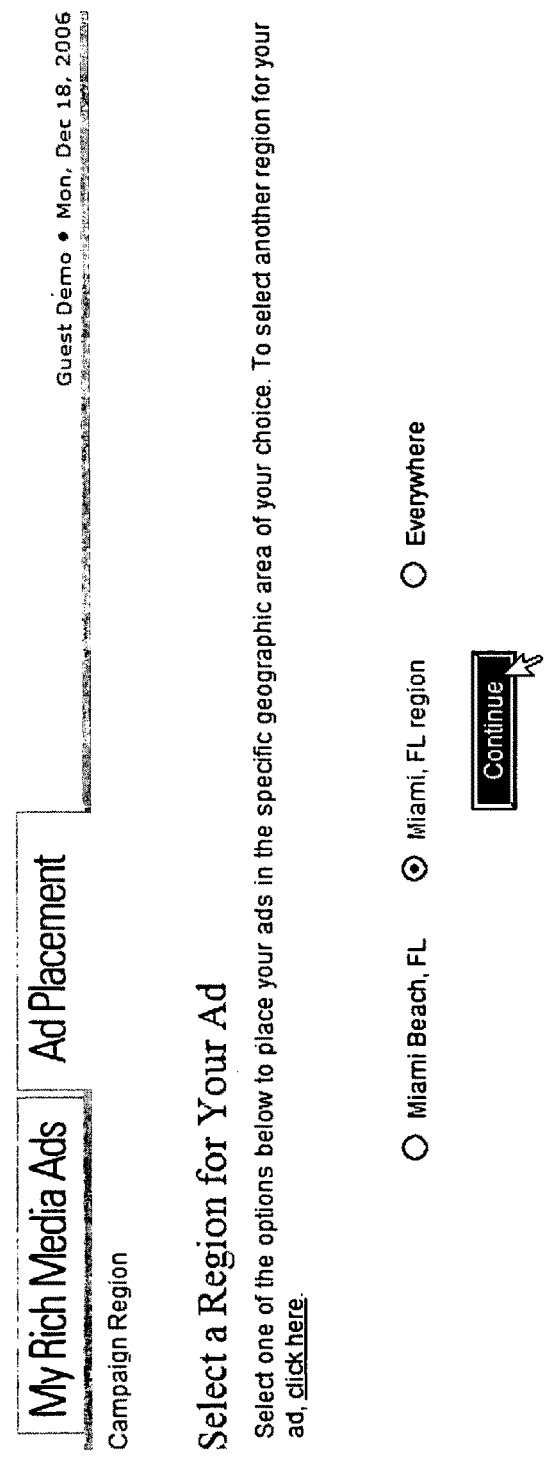
FIG. 15 depicts a sample system geographic region designation screen.
Figure 16:
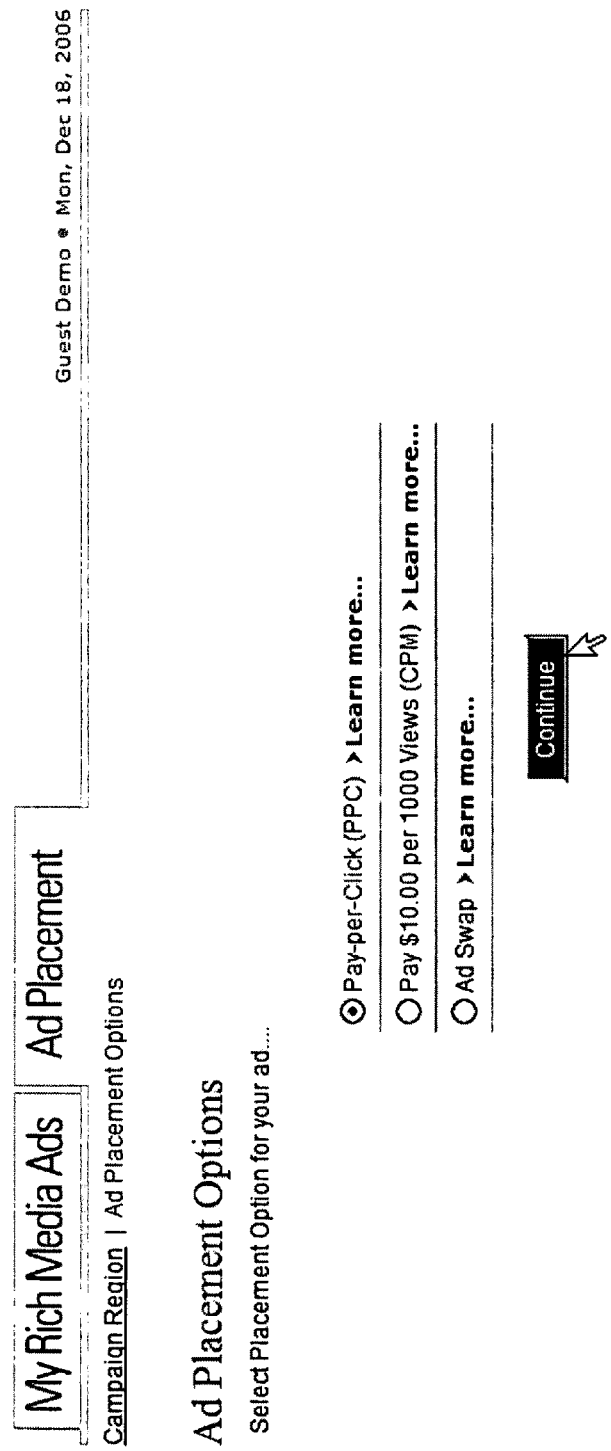
FIG. 16 depicts a sample ad payment option selection screen.

Information about the content file(s) selected are saved in the system ad parameter file database as a row of data and a unique ID is given to the row as shown in FIG. 14. In the example in FIG. 14, the unique id is noted in Column A, the cost per use of the licensed ad content used in the ad is noted in Column H and the cost-per-click bid by the advertiser for display of the ad in response to keywords specified in Column J is noted in Column I. The ad display location owner is also registered with the system and the offered ad display space is embedded with a billboard module associated with specified keywords designated by the ad display location's owner. The designation by the ad space owner/ad publisher of keywords to be associated with the billboard module embedded at a particular network location enables the ad space owner to designate the subject matter of ads that the ad space owner would like to run at the particular location. When a network user/ad viewer either requests a web page that contains the embedded billboard module, otherwise acts on the billboard module or enters one of the designated keywords as a query, the system conducts the auction to select the ad to be displayed from the group of ads that reference the same keyword and display location, and then the ad parameter/command file for the selected ad is accessed and the commands are retrieved and run, retrieving, assembling and displaying the licensed content files in accordance with the instructions.

Figure 44:
FIG. 44 depicts a sample system screen for the ad exchange feature of the system.
Figure 45:
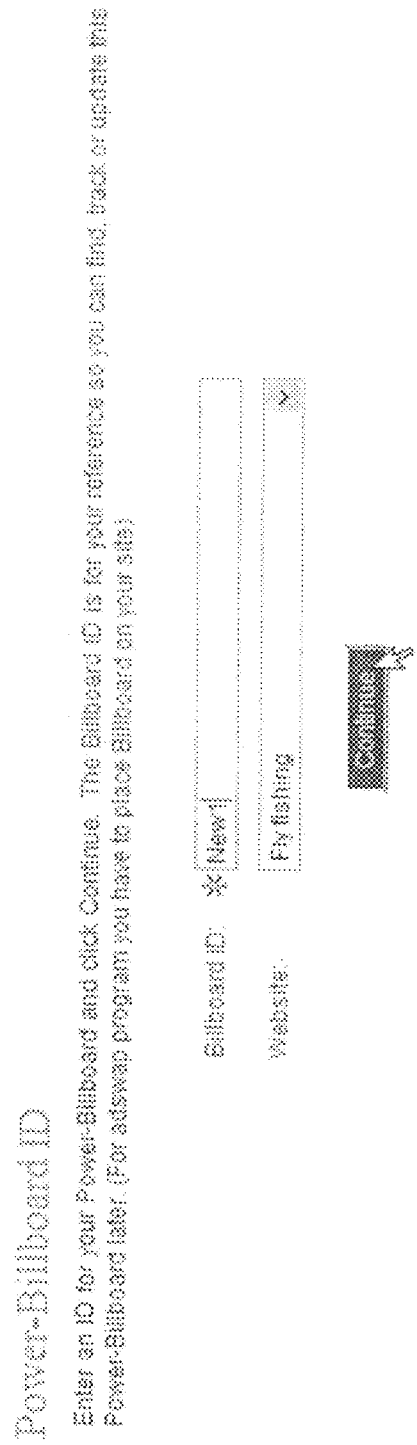
FIG. 45 depicts a sample system screen for participants in the system's ad exchange program to specify the identification parameters for ad space to be made available on the participant's network location for placement of other participants' ads.
Figure 46:
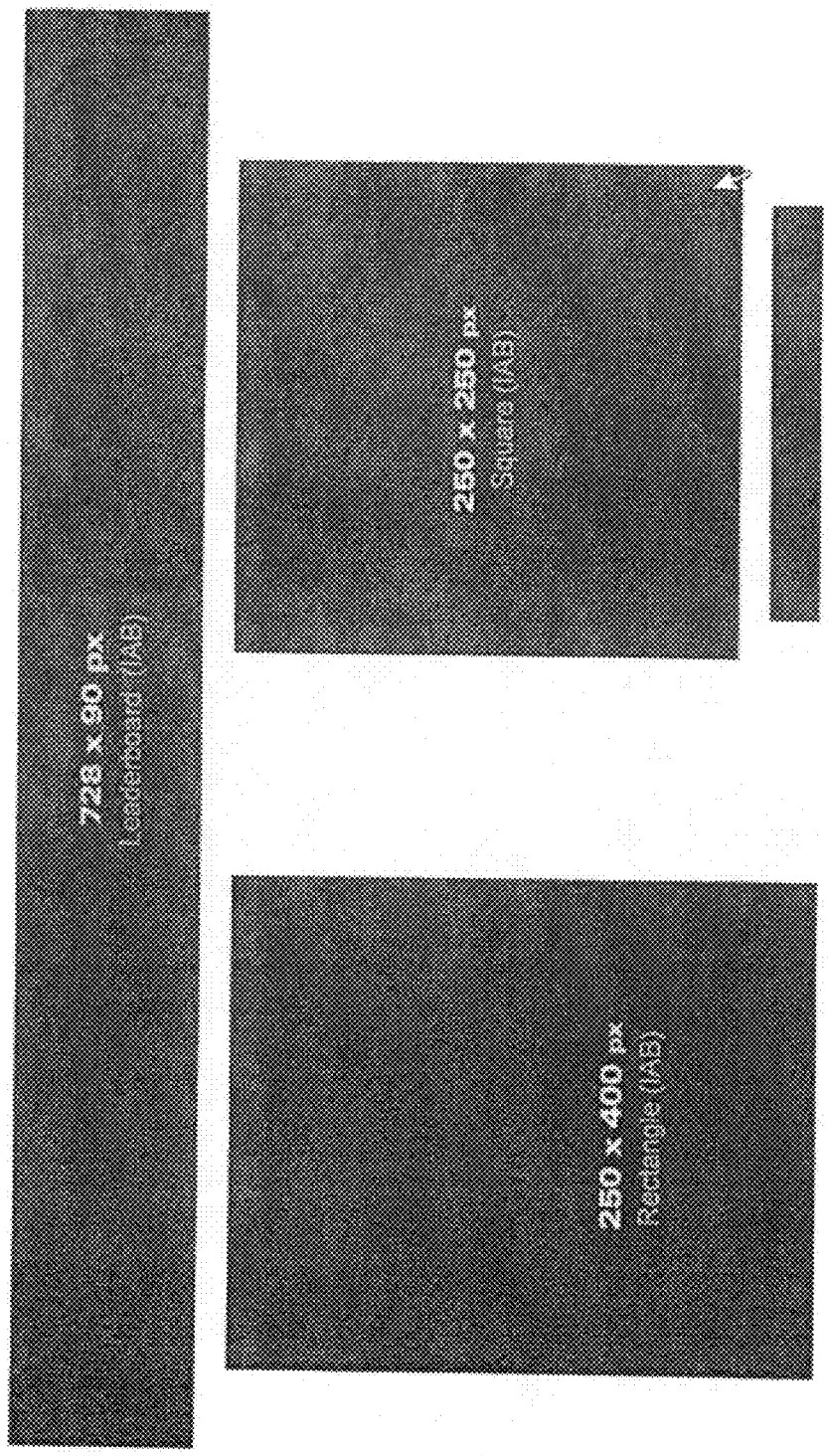
FIG. 46 depicts a sample screen for participants in the system's ad exchange program to specify size parameters for the ad space to be made available on the participants network location for placement of other participants' ads.
Figure 47:
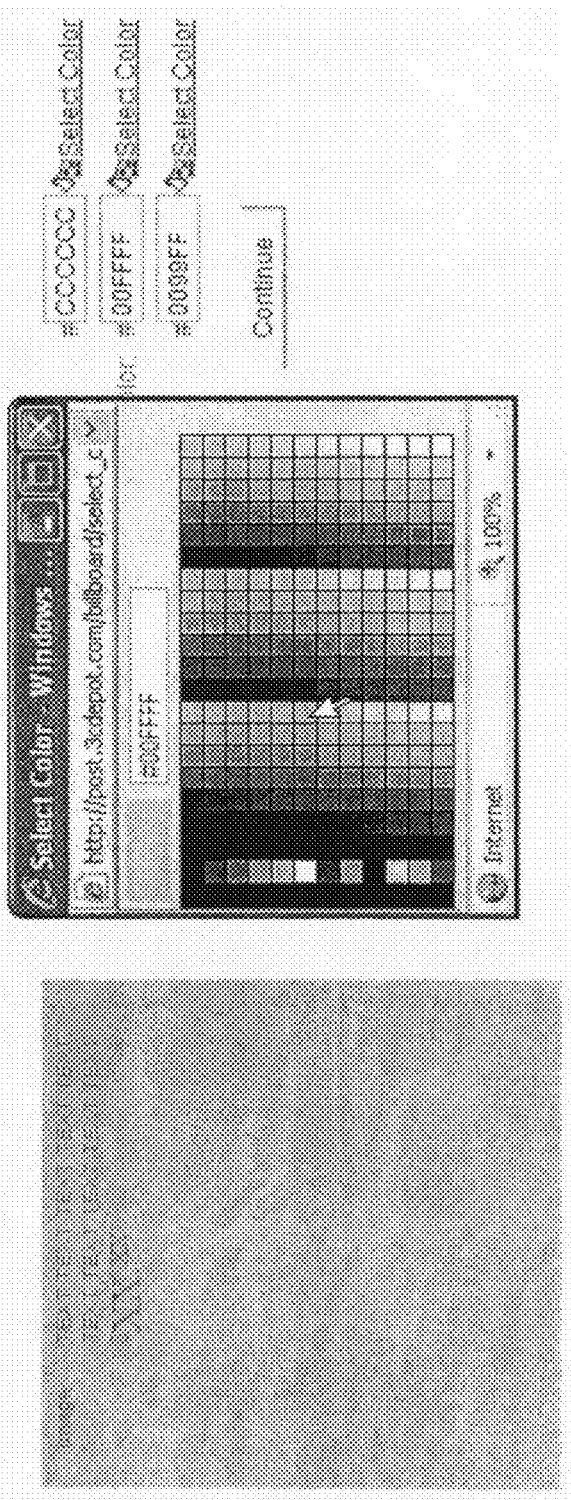
FIG. 47 depicts a sample system screen for participants in the system's ad exchange program to customize the appearance of the ad space to be made available on the participant's network location for placement of other participants' ads.
Figure 48:
FIG. 48 depicts a sample system screen for participants in the system's ad exchange program to select the advertisement for said participant's own products/services to be placed at third party network locations in exchange for the ad space contributed by said participant.
Figure 50:
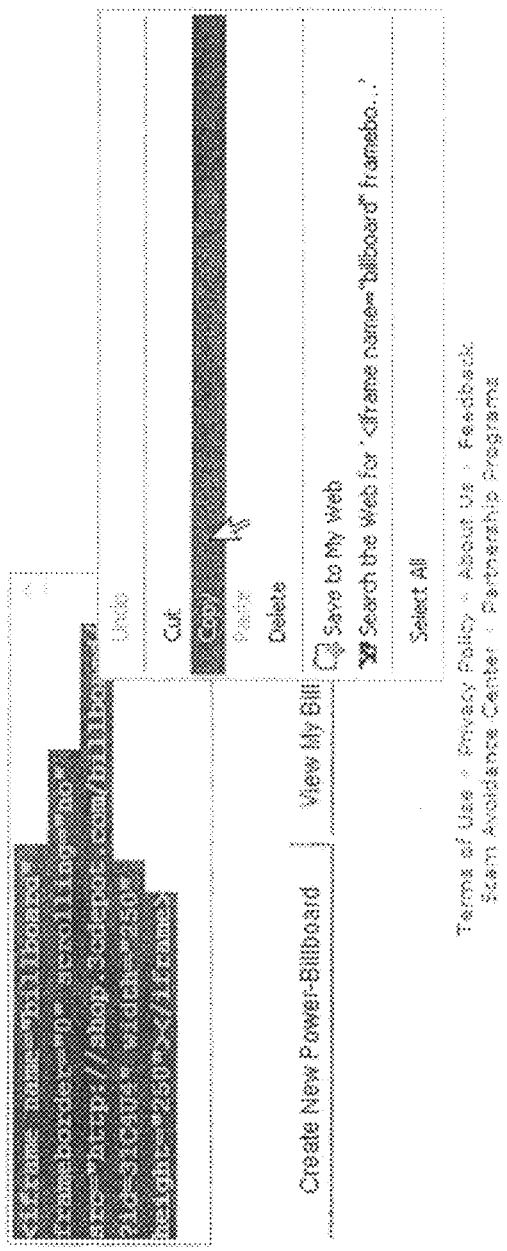
FIG. 50 depicts a sample system screen for participants in the system's ad exchange program to receive and copy ad space code to be placed in said participant's own network location to run ads placed by other program participants.

In one embodiment of the present invention, ad publishers can participate in a barter-based advertising exchange network wherein ad publishers can exchange advertising impressions/views in their publication (whether online or other) for impressions/views of their own advertisements at third party publisher network locations. The ad publishers preferably contribute more ad impression/views than they receive in exchange such that a pool or inventory of available impressions/views is available for selection and use by participating ad publishers/advertisers. With this exchange network, ad publishers can also advertise, and advertisers can use their own unused advertising "space" such as views/impressions on their own website, as currency for paying for their own ad placements, making advertising less expensive and increasing ROI for the advertiser by minimizing the out of pocket cash outlay for advertising, and publishers are able to liquidated unsold inventory of ad impressions/views at no incremental cost. Content licensors can also use the system to barter their ad content in exchange for impressions/views of their own ads at third party network locations, or other barterable advertising commodities. The system is used to implement a method for ad publishers to exchange ad views/impressions via bartering, comprising the following steps: contributing ad views/impressions available on an ad publisher's network location to a system for the creation, distribution and tracking of electronic advertisements on a network, comprising a system-end computer equipped and configured for network communications, including computer processing means, a dispatcher server containing a database that stores one or more files containing parameters and commands for each advertisement, a system advertiser user-end computer configured and equipped for network communications and communicating with said network and communicating with one or more ad publisher-end computers configured and equipped for network communications and communicating with said system dispatcher server and network user-end computers, one or more advertisement servers configured and equipped for network communications communicating with said system-end dispatcher server and ad publisher-end computers and having one or more advertisement content files stored thereon which are made available for licensing for use in creating an advertisement, one or more network communications interface software applications for interfacing with system advertiser users and also providing a menu for selection of one or more advertising content files made available for licensing for use in creating an advertisement and creating a file in said dispatcher server database that contains parameters and commands to retrieve, assemble and display said one or more advertisement files as well as the total cost-per-use of the licensed ad content files and the location(s) where the ad will be displayed, network communication means for displaying said advertisement, and a tracking server communicating with said advertisement server and said dispatcher server for tracking of usage of licensed advertisement content files to calculate and charge said system advertiser user the cost-per-use rate for said licensed advertisement content files each time said files are displayed, thereby creating an inventory pool of available ad views/impressions on said system for use by ad publishers and other advertisers seeking to publish their ads, and providing to said ad publishers in exchange for said contributed ad views/impressions the right to display said ad publishers' own ads using network location views/impressions selected from said inventory of said contributed ad views/impressions. FIG. 44 depicts a sample system screen for the ad exchange feature of the system. After the ad exchange program participant signs into the system, the ad exchange program is selected and the participant then creates the "billboard" module for the ad space being contributed by said participant on said participant's website, other network location or publication, where the ads of other participants in the ad exchange program will be displayed. The participant can designate a previously created billboard or can create a new one for use in the ad exchange program. FIG. 45 depicts a sample system screen for the participants in the ad exchange program to specify the identification parameters for the ad space to be made available on said participant's website, other network location or publication. The identification parameters are used for the participant to later find, track or update the billboard space. FIG. 46 depicts a sample system screen for participants to specify the size parameters for the ad space to be made available on the participant's website, other network location or publication. FIG. 47 depicts a sample system screen for participants to customize the appearance of the ad space being made available on the participant's website, other network location or publication to match the overall appearance of said website, other network location or publication. FIG. 48 depicts a sample system screen for participants to select the advertisement for their own products/services to be run at third party program participants' network locations in exchange for the ad space contributed to the program by said participant. FIG. 49 depicts a sample system screen for participants in the program to select target categories to be associated with the ad space on said participant's own website being contributed by said participant to the program. FIG. 50 depicts a sample system screen where participants in the program receive and can copy the code to be placed in said participant's own network location in order to display ads placed by other program participants. As network ads are displayed on the participant's own website or other network location or publication, the participant earns credits or rights to have their own ad displayed at other third party network locations.

As shown in FIGS. 34 and 35, which depict sample system tracking screens, meta data on any action taken on the ad is sent back to the database file for the ad via FSDC, and the licensed ad content usage and ad display location charges are applied. The advertiser preferably places a deposit with the system to be drawn against as the advertiser's ad is displayed.

The ad spots can be made available either generally or in relation to the use of specified search terms or keywords. In the case of a website, the website operator can designate keywords that relate to a particular ad space by entering the words into the code for the billboard module that will be embedded at the ad space location. This is done via the system user interface when the web publisher creates a billboard module. In case of a search engine, keywords can be assigned to an ad space from the search field entry. Advertisers seeking to place an ad at the ad space noted enter into the system ad parameter data file the specific keywords to be associated with the ad and a maximum bid for display of the ad at the designated space when the designated keywords are entered as search queries. The ads are displayed once selected based on the bid for each ad or other customizable parameters such as, for example, frequency of display (e.g., display the ad periodically, such as once a day or every five ads displayed, or other). Advertisers can run test auctions to assess the bid amount and frequency of display of the ad based on such bid amount. Sample system code for executing a test auction is provided below:

Sample Test Bid Ad Auction SQL procedure:

```
CREATE PROCEDURE dbo.ab_testAdauction
(@postingUID INT, @ad_option INT, @test_bid money, @blockSize INT,
@keywords nvarchar(150), @search nvarchar(50), @showtime decimal(9,2)
OUTPUT, @best_ctr decimal(9,2) OUTPUT, @competitors INT OUTPUT,
@goodwords INT OUTPUT)
AS
SET NOCOUNT ON
BEGIN
-- Check first 5 search words (where search is URLencrypted string) against
keywords
DECLARE @mesStr varchar(60), @curStr INT, @var1 varchar(60), @var2
varchar(60), @var3 varchar(60), @var4 varchar(60), @var5 varchar(60)
BEGIN
SET @goodwords = 0
IF (@keywords LIKE '% '+@search+' %' OR LEFT(@keywords,
LEN(@search)+1) LIKE @search+' %' OR RIGHT(@keywords,
LEN(@search)+1) LIKE '% '+@search+' ')
SET @goodwords = 1
ELSE
BEGIN
SET @var1 = ''
SET @var2 = ''
SET @var3 = ''
SET @var4 = ''
SET @var5 = ''
SET @mesStr = @search
-- Word # 1
SET @curStr = 0
WHILE @curStr < LEN(@mesStr)
BEGIN
IF SUBSTRING (@mesStr, @curStr,1) = '+'
IF @var1 = ''
BEGIN
SET @var1 = LEFT(@mesStr,@curStr -1)
SET @mesStr = RIGHT(@mesStr, LEN(@mesStr) - (LEN(@var1)+1))
END
SET @curStr = @curStr +1
END
IF @var1 = ''
SET @var1 = @mesStr
ELSE
IF (@keywords LIKE '% '+@var1+' %' OR LEFT(@keywords,
LEN(@var1)+1) LIKE @var1+' %' OR RIGHT(@keywords, LEN(@var1)+1)
LIKE '% '+@var1+' ')
SET @goodwords = 1
-- Word # 2
IF LEN(@search) >= (LEN(@mesStr) + 1 + LEN(@var1))
BEGIN
SET @curStr = 0
WHILE @curStr < LEN(@mesStr)
```

-continued

```
BEGIN
IF SUBSTRING (@mesStr, @curStr,1) = '+'
IF @var2 = ''
BEGIN
SET @var2 = LEFT(@mesStr,@curStr −1)
SET @mesStr = RIGHT(@mesStr, LEN(@mesStr) − (LEN(@var2)+1))
END
SET @curStr = @curStr +1
END
IF @var2 = ''
SET @var2 = @mesStr
END
IF (@keywords LIKE '% '+@var2+' %' OR LEFT(@keywords,
LEN(@var2)+1) LIKE @var2+' %' OR RIGHT(@keywords, LEN(@var2)+1)
LIKE '% '+@var2+' ')
SET @goodwords = 1
-- Word # 3
IF LEN(@search) >= (LEN(@mesStr) + 1 + LEN(@var1) + 1 + LEN(@var2))
BEGIN
SET @curStr = 0
WHILE @curStr < LEN(@mesStr)
BEGIN
IF SUBSTRING (@mesStr, @curStr,1) = '+'
IF @var3 = ''
BEGIN
SET @var3 = LEFT(@mesStr,@curStr −1)
SET @mesStr = RIGHT(@mesStr, LEN(@mesStr) − (LEN(@var3)+1))
END
SET @curStr = @curStr +1
END
IF @var3 = ''
SET @var3 = @mesStr
ELSE
IF @search LIKE @var3 SET @goodwords = 1
END
IF (@keywords LIKE '% '+@var3+' %' OR LEFT(@keywords,
LEN(@var3)+1) LIKE @var3+' %' OR RIGHT(@keywords, LEN(@var3)+1)
LIKE '% '+@var3+' ')
SET @goodwords = 1
-- Word # 4
IF LEN(@search) >= (LEN(@mesStr) + 1 + LEN(@var1) + 1 + LEN(@var2)
+ 1 + LEN(@var3))
BEGIN
SET @curStr = 0
WHILE @curStr < LEN(@mesStr)
BEGIN
IF SUBSTRING (@mesStr, @curStr,1) = '+'
IF @var4 = ''
BEGIN
SET @var4 = LEFT(@mesStr,@curStr −1)
SET @mesStr = RIGHT(@mesStr, LEN(@mesStr) − (LEN(@var4)+1))
END
SET @curStr = @curStr +1
END
IF @var4 = ''
SET @var4 = @mesStr
ELSE
IF @search LIKE @var4 SET @goodwords = 1
END
IF (@keywords LIKE '% '+@var4+' %' OR LEFT(@keywords,
LEN(@var4)+1) LIKE @var4+' %' OR RIGHT(@keywords, LEN(@var4)+1)
LIKE '% '+@var4+' ')
SET @goodwords = 1
-- Word # 5
IF LEN(@search) >= (LEN(@mesStr) + 1 + LEN(@var1) + 1 + LEN(@var2)
+ 1 + LEN(@var3) + 1 + LEN(@var4))
BEGIN
SET @curStr = 0
WHILE @curStr < LEN(@mesStr)
BEGIN
IF SUBSTRING (@mesStr, @curStr,1) = '+'
IF @var5 = ''
BEGIN
SET @var5 = LEFT(@mesStr,@curStr −1)
SET @mesStr = RIGHT(@mesStr, LEN(@mesStr) − (LEN(@var5)+1))
END
SET @curStr = @curStr +1
END
IF @var5 = ''
```

```
SET @var5 = @mesStr
ELSE
IF @search LIKE @var1 SET @goodwords = 1
END
IF (@keywords LIKE '% '+@var5+' %' OR LEFT(@keywords,
LEN(@var5)+1) LIKE @var5+' %' OR RIGHT(@keywords, LEN(@var5)+1)
LIKE '% '+@var5+' ')
SET @goodwords = 1
END
END
IF @goodwords=1
BEGIN
SET @search = Replace(@search,'+',' ')
IF EXISTS (SELECT postingUID FROM dbo.ad_classifieds WHERE
FREETEXT(*, @search) AND stop_flag IS NULL AND ad_option=1 AND
postingUID <> @postingUID AND postingUID IS NOT NULL)
-- There are competitors!!!
BEGIN
-- Set temp tables
CREATE TABLE #table2 (blockNumber INT DEFAULT (0), [ID] INT
DEFAULT (0), ctr decimal(9,4) DEFAULT (0), rating decimal(9,4) DEFAULT
(0), bid money DEFAULT (0), [views] decimal(9,4) DEFAULT (0), clicks
decimal(9,4) DEFAULT (0))
CREATE TABLE #table1 ([ID] INT DEFAULT (0), postingUID INT DEFAULT
(0), ctr decimal(9,4) DEFAULT (0), rating decimal(9,4) DEFAULT (0), bid
money DEFAULT (0), [views] decimal(9,4) DEFAULT (0), clicks decimal(9,4)
DEFAULT (0))
-- Set common variables
DECLARE @totalRating decimal(9, 2), @blockRating decimal(9, 2),
@blockNumber INT, @rq varchar(8000)
DECLARE @li INT, @record_postingUID INT, @total_ratinginBlock
decimal(9,4), @procentage decimal(9,4), @numberofrecords INT
DECLARE @ID INT, @views decimal(9,2), @clicks decimal(9,2),
@percentage decimal(9,4), @bid money, @cnt INT, @ctr decimal(9,4),
@rating decimal(9,4)
DECLARE @numberofBlocks INT, @av_clicks decimal(9,2), @av_views
decimal(9,2), @av_ctr decimal(9,4)
-- Set request and run it
SET @rq='DECLARE ad_cursor CURSOR SCROLL KEYSET FOR
SELECT [ID], postingUID, [views], clicks, bid FROM dbo.ads WHERE
FREETEXT (*,'''+@search+''') AND stop_flag IS NULL AND
ad_option='+Str(@ad_option)+' AND postingUID <> '+STR(@postingUID)
EXEC (@rq)
OPEN ad_cursor
SET @numberofrecords = @@CURSOR_ROWS
FETCH ABSOLUTE 1 FROM ad_cursor INTO @ID, @record_postingUID,
@views, @clicks, @bid
    SET @cnt=0
    WHILE @@FETCH_STATUS=0
    BEGIN
-- Set click through rate and rating based on bid amount and click through
rate as a coefficient
SET @ctr = 0
SET @rating = 0
IF (@views > 0 AND @clicks > 0 AND @bid > 0)
BEGIN
SET @ctr = ((100 / @views) * @clicks)
SET @rating = (@bid * @ctr)
END
-- save record in temp table
INSERT #table1 VALUES (@ID, @record_postingUID, @ctr, @rating, @bid,
@views, @clicks)
        FETCH NEXT FROM ad_cursor INTO @ID,
@record_postingUID, @views, @clicks, @bid
        SET @cnt = @cnt+1
    END
CLOSE ad_cursor
DEALLOCATE ad_cursor
-- Set testing click through rate and rating based on average stats
IF EXISTS (SELECT [ID] FROM #table1 WHERE ctr > 0)
BEGIN
SELECT @av_views = AVG([views]), @av_clicks = AVG([clicks]), @av_ctr =
AVG(ctr) FROM #table1
SET @rating=(@test_bid * @av_ctr)
END
ELSE
SELECT @av_views=0, @av_clicks=0, @av_ctr=0,
@rating=100.00/(@numberofrecords+1)
-- Keep testing record
```

```
INSERT INTO #table1 ([ID], postingUID, ctr, rating, bid, [views], clicks)
VALUES (0, @postingUID, @av_ctr, @rating, @test_bid, @av_views,
@av_clicks)
-- Sort by ratings and blocks to be shown where rating is used as % of total
views
DECLARE ad_cursor CURSOR SCROLL KEYSET FOR SELECT [ID], ctr,
rating, bid, [views], clicks FROM #table1 ORDER BY rating DESC
OPEN ad_cursor
FETCH ABSOLUTE 1 FROM ad_cursor INTO @ID, @ctr, @rating, @bid,
@views, @clicks
    SET @cnt=0
    SET @li = 0
    SET @numberofBlocks = 1
    SET @total_ratinginBlock = 0
    WHILE @@FETCH_STATUS=0
    BEGIN
IF @li < @blockSize
SET @li = @li+1
ELSE
BEGIN
SET @li = 1
SET @numberofBlocks = @numberofBlocks + 1
END
IF @av_ctr=0 SET @rating = 100.00/(@numberofrecords+1)
INSERT #table2 VALUES (@numberofBlocks, @ID, @ctr, @rating, @bid,
@views, @clicks)
        FETCH NEXT FROM ad_cursor INTO @ID, @ctr, @rating,
@bid, @views, @clicks
        SET @cnt = @cnt+1
    END
CLOSE ad_cursor
DEALLOCATE ad_cursor
SELECT @blockNumber=blockNumber FROM #table2 WHERE [ID]=0
SET @totalRating = 0
SET @blockRating = 0
IF EXISTS (SELECT rating FROM #table2 WHERE rating > 0)
BEGIN
SELECT @totalRating=SUM(rating) FROM #table2
SELECT @blockRating=SUM(rating) FROM #table2 WHERE
blockNumber=@blockNumber
END
-- Get % of the times for the testing ad will show up
SET @showtime = 0
IF @totalRating > 0 AND @blockRating > 0
SET @showtime=ROUND((100.00/@totalRating * @blockRating),2)
-- Get the best click through rate
SET @best_ctr = 0
SELECT @best_ctr=MAX(ctr) FROM #table2 WHERE [ID] <> 0
-- Get number of competitors
SET @competitors = @numberofrecords
SELECT * FROM #table1
SELECT * FROM #table2
DROP TABLE #table1
DROP TABLE #table2END
ELSE
-- No competitors
SELECT @blockNumber=1,@best_ctr=0, @showtime=100,
@competitors=0
END
ELSE
-- Keywords do not contains search words
SELECT @blockNumber=0, @best_ctr=0, @showtime=0, @competitors=0
END
GO
```

When the billboard module embedded in the ad space and the web page is requested or otherwise acted upon by a network user/ad viewer, the billboard module is initiated and a message is sent to the system dispatcher server passing the specific keyword and ad space data for the system software applications to identify the group of ads that will participate in the auction, and then conduct the auction for the spot to determine which ad will be displayed in the particular instance. A number of variables can be compared in the auction selection process, including, for example, the number of ads in queue that are associated with the keyword at the time of the request, the number of total available advertising spots associated with the keyword, bid amount, and the current click-through rate of each ad associated with the keyword. The advertisement that is selected is then displayed and the advertiser is charged each time the ad is displayed or clicked for both use of the licensed content comprising the ad and the display of the ad at the designated location. The advertiser can easily manage an online ad campaign based on a budget, geographical region and tracking details such as click-through rate, and sales rate, as shown in the system advertiser account screen. The system allows for targeted advertising with increased flexibility, as the ad placement and selection for display is not limited to any search system or technology.

Figure 36:
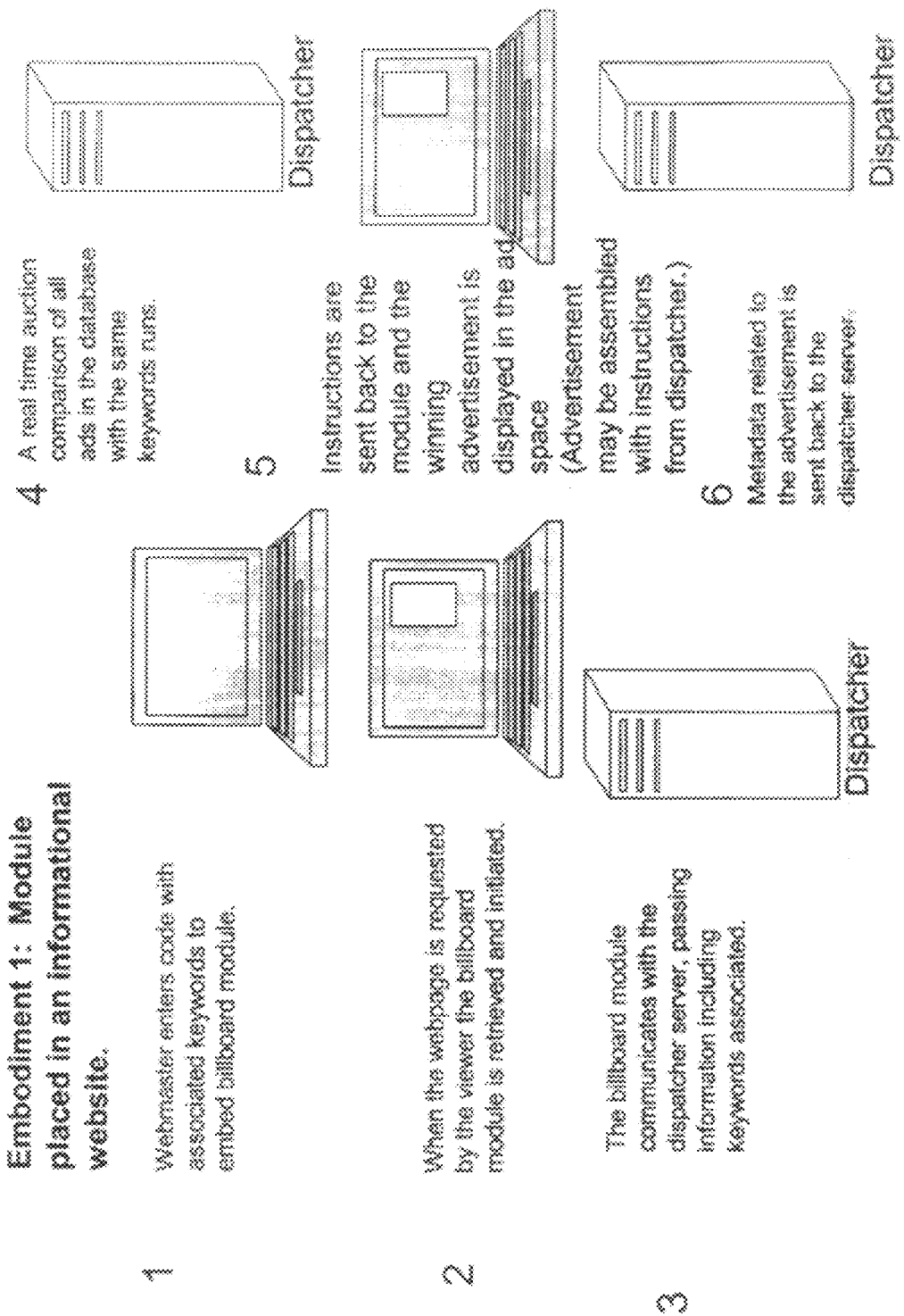
FIG. 36 describes the system process flow in an embodiment wherein the billboard module is embedded in an informational website.
Figure 37:
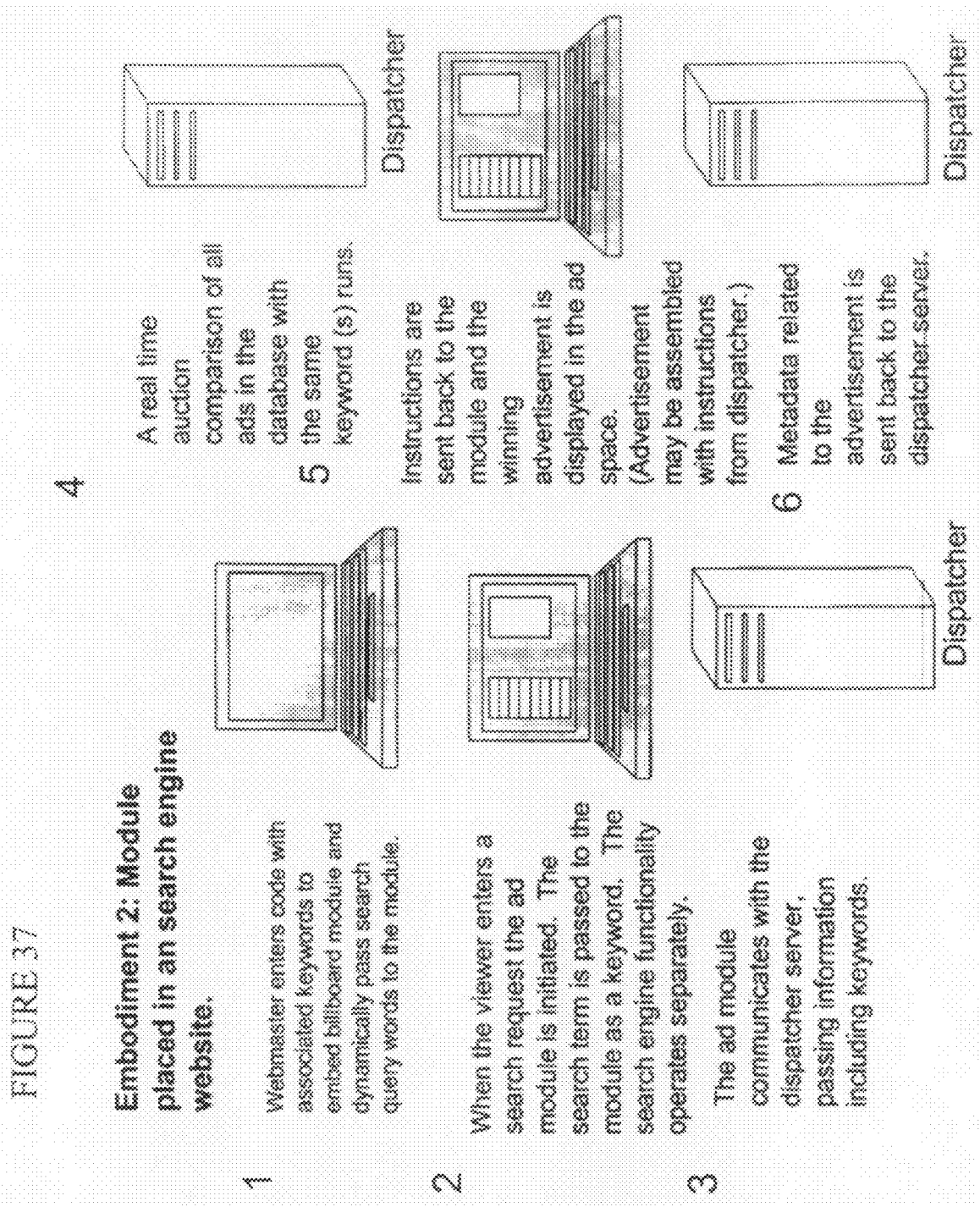
FIG. 37 describes the system process flow in an embodiment wherein the billboard module is embedded in a search engine screen.
Figure 38:
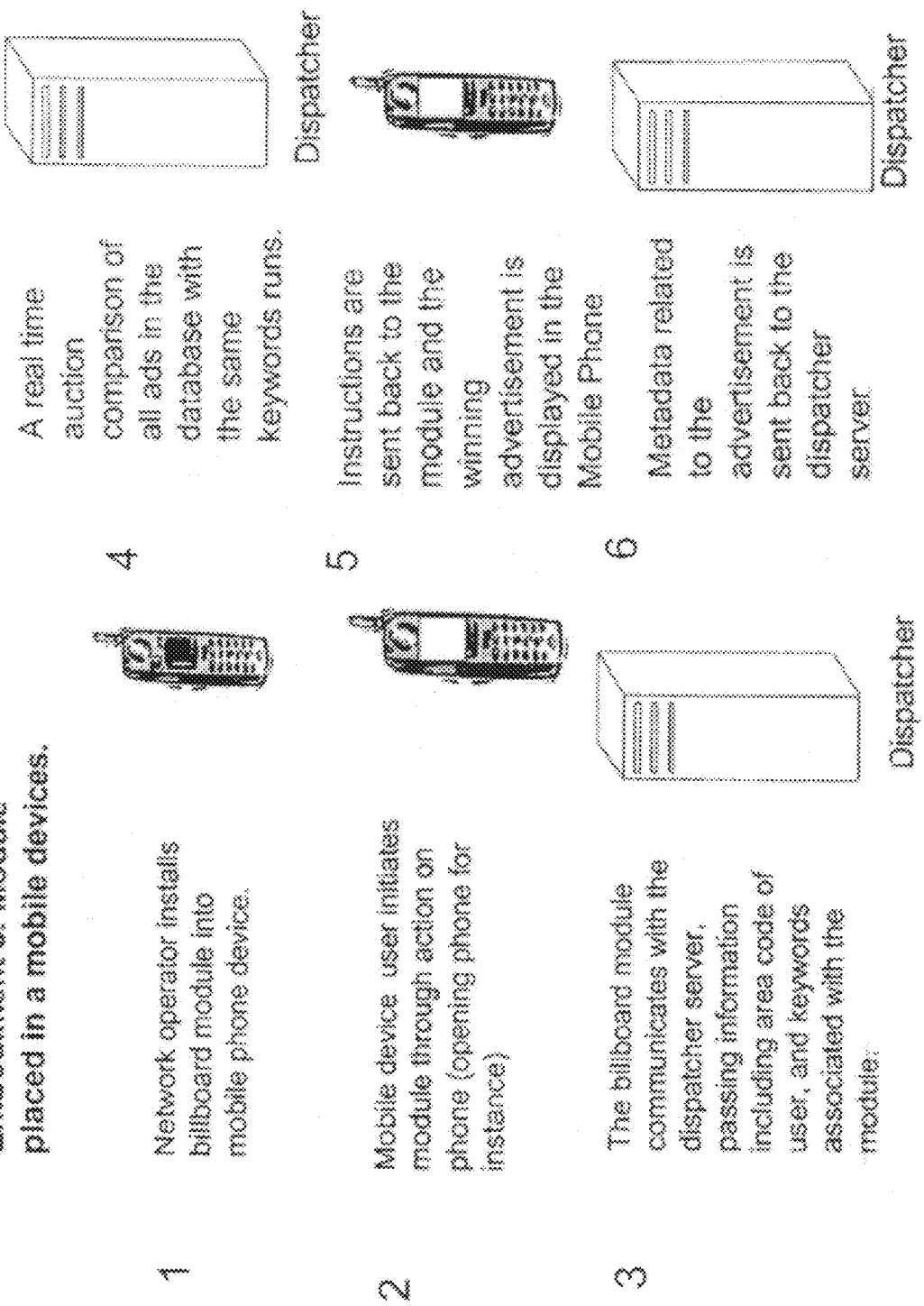
FIG. 38 describes the system process flow in an embodiment wherein the billboard module is embedded in a mobile device such as a cellular phone.
Figure 39:
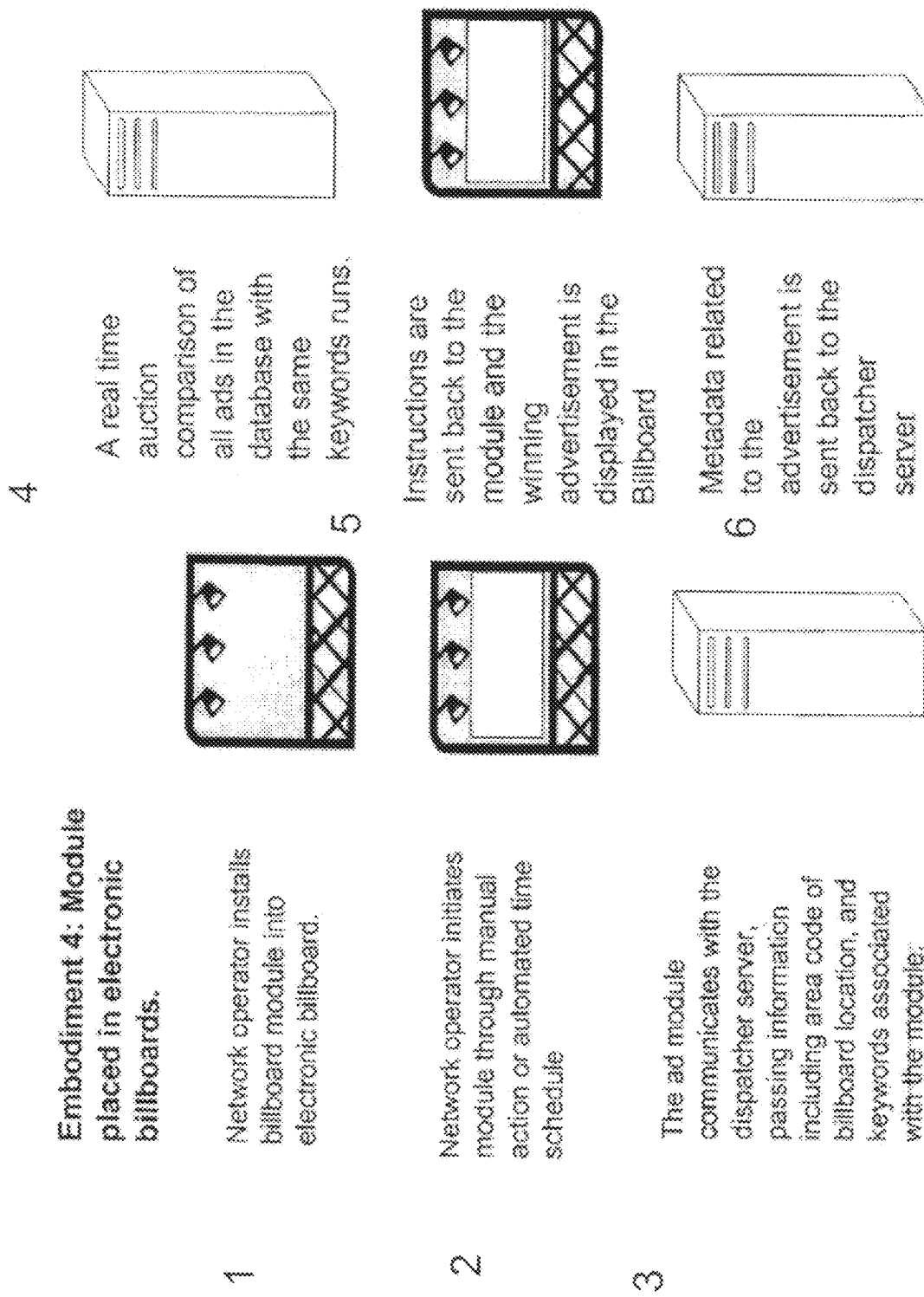
FIG. 39 describes the system process flow in an embodiment wherein the billboard module is embedded in an electronic billboard.

FIG. 36 describes the system process flow in an embodiment wherein the billboard module is embedded an informational website. FIG. 37 describes the system process flow in an embodiment wherein the billboard module is embedded in a search engine screen. FIG. 38 describes the system process flow in an embodiment wherein the billboard module is embedded in a mobile device such as a cellular phone. FIG. 39 describes the system process flow in an embodiment wherein the billboard module is embedded in an electronic billboard.

Figure 40:
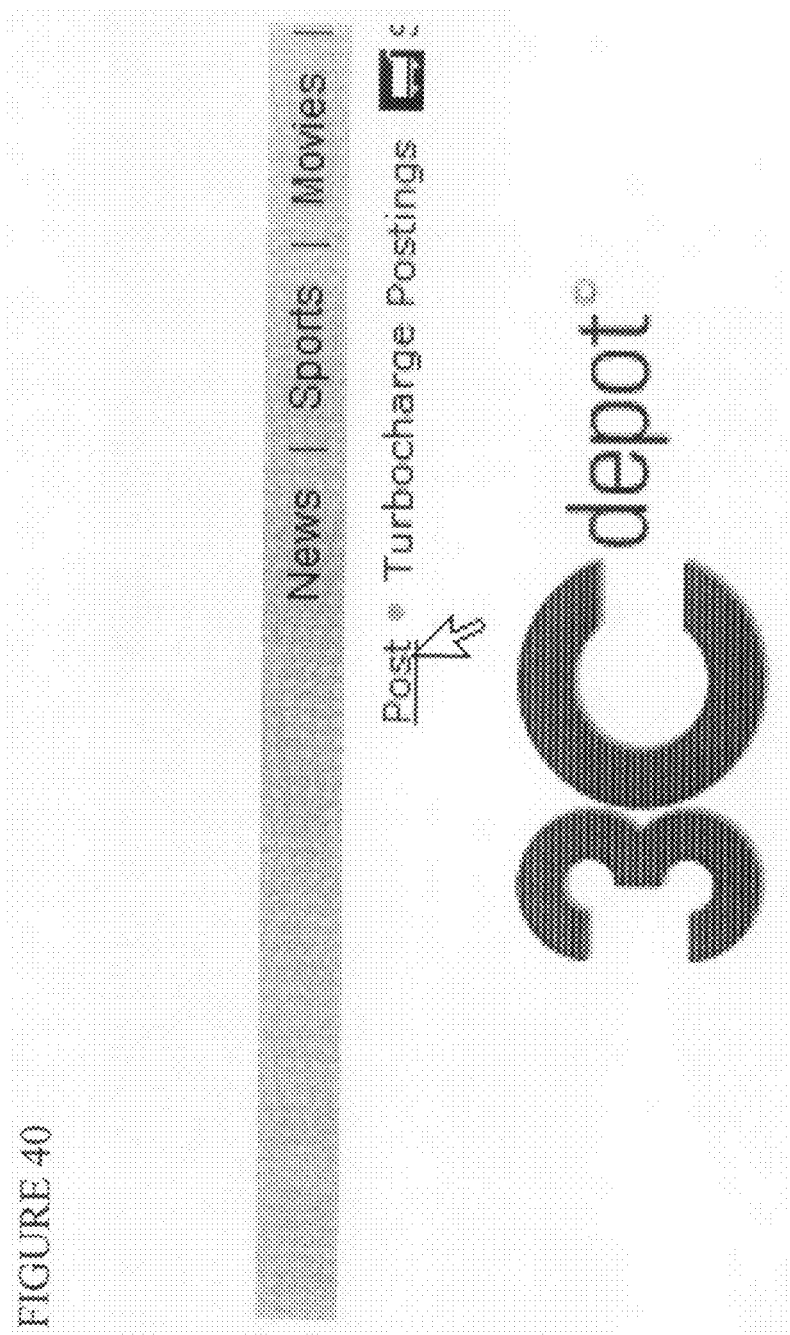
FIG. 40 depicts a sample system user screen for posting product catalog information in the system, enabling advertisement viewers to purchase the advertiser's product/service via the system e-commerce functionality.
Figure 41:
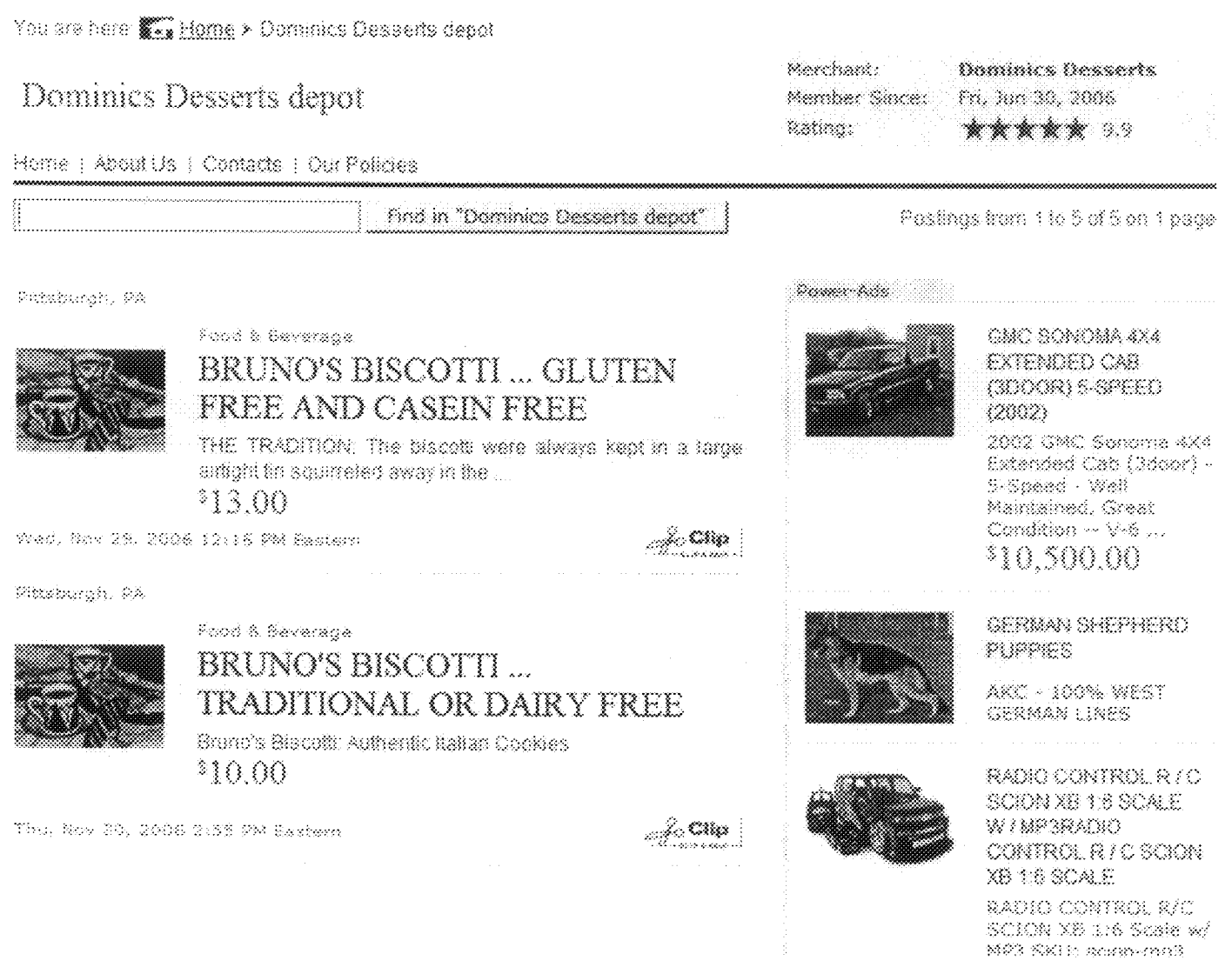

FIG. 40 depicts a sample system user screen for position product/catalog information in the system, by advertiser that do not have their own e-commerce capability can sell their products to users that view their advertisements. Advertisers click on "post" to post their product information creating their own e-commerce catalog in the system and then connect their products to their ads, with the system providing the functionality to process orders, purchases and payment electronically. FIG. 41 depicts a sample system screen showing the posted products of advertisers. FIG. 42 depicts an information and selection page for the same products. When a viewer of the ad clicks on "buy," the system adds the item to a system electronic shopping chart and then completes processing of the purchase transaction, including payment processing. FIG. 43 shows a sample checkout payment screen. Various options for payment exist such as, without limitation, check, credit card, paypal or other forms of payment.

Embodiment Including Content Rendering Control

According to a preferred embodiment hereof, the present invention further includes a system and method for controlling the activation of billboard modules and thereby controlling the rendering of ad content on ad publishers' ad content display pages whereby content is rendered only if and/or to the extent that a designated portion of the ad content display page area (the "ad content display page triggering area") is within, or within a pre-defined distance outside of, the viewer's browser window dimensions and scrolling position. The pre-defined ad content display page triggering area can, in a preferred embodiment, be the area of the ad content display page where the content is to be rendered, i.e., the billboard module location on the ad publisher's ad content display page. Billboard modules are activated, real time auctions are run and the winning advertiser bidder's designated ad content is requested, delivered and rendered automatically and sequentially for pre-defined areas of the ad content display page that come within the dimensions and scrolling position of the viewer's browser window as the viewer scrolls across or down the content display site page without further viewer click action or other action being required. Furthermore, billboard module activation can be controlled to activate only when and to the extent that the viewer's browser window area corresponds with ad content display page area where particular billboard module is located rather than rendering an entire ad content display page when only a portion is within the viewer's browser window dimensions and scrolling position, resulting in greater efficiency in bandwidth and other communications resource utilization. In a preferred embodiment, the computer and communications network is the Internet and the ad publishers' ad content display sites are websites, but this embodiment of the present invention is not limited to any particular communications network or content display site.

The system in such embodiment further includes a system for controlling the activation of billboard modules, and thereby controlling the rendering of ad content via an electronic communications network at a designated content rendering area of an ad content display page to one or more viewers having a network communications device with a browser software application with adjustable window dimensions and scrolling position, for viewing ad content display pages within said browser's window dimensions and scrolling position. The control system uses the system end computer equipped and configured for communications via said electronic communications network, including one or more computer processing units, and means for communicating with one or more ad publisher ad content display pages that have one or more of said billboard modules located at one or more ad content rendering areas and one or more ad content display page triggering areas on said pages, and a system dispatcher server including a database that stores one or more records containing data pertaining to said one or more ad content display pages, said one or more ad content display page triggering areas, said one or more billboard modules located at said one or more ad content display page rendering areas and said one or more content files, said content files being stored in one or more content file servers, and one or more network communications interface software applications for receiving from system users data designating one or more ad content display pages, one or more billboard modules located at said one or more ad content display page rendering areas within said one or more ad content display pages, one or more ad content display page triggering areas that, when determined to be within, or within a pre-defined distance outside of, an ad content display page viewer's browser window dimensions and scrolling position, will result in activation of said one or more billboard modules, causing a real time auction to occur and the winning advertiser bidder's designated ad content being rendered in said ad content display page rendering area. The system software applications for creating and writing to or otherwise embedding on said designated ad content display page a correlator code to determine when said designated ad content display page triggering area is within, or within a pre-defined distance outside of, a content viewer's browser window dimensions and scrolling position, for dynamically generating a marker for said designated ad content display page rendering area, and for communicating with said correlator code to cause said one or more billboard modules to be activated, causing such real time auction(s) to occur and causing the winning advertiser bidder's designated ad content files to be rendered in said one or more billboard module ad content display page rendering areas when said correlator code detects that said designated ad content display page triggering area is within, or within a pre-defined distance outside of, said content viewer's browser window dimensions and scrolling position. The marker may be HTML code or coordinates in the correlator code, or can be created by other means for creating a page area marker.

The system in embodiments including content rendering control includes computer processing means such as one or more conventional computer processing units and microprocessors and one or more Internet or other network communications interface software applications for interfacing with system users (i.e., advertisers and ad publishers (in this embodiment, as the ad content display page administrators), as well as ad content licensors) providing a graphical user interface for system ad publisher users to enter data regarding their ad content display page(s), and designation of the ad content display page triggering area(s) that will trigger billboard module activation when such ad content display page areas are within, or within a pre-defined distance outside of, the viewer's browser window dimensions and scrolling position, and ad content files to be rendered. Content display sites can access the system and enter registration information and provide instructions to cause billboard modules to be activated when the ad content display page area where the billboard module is located, or when specified areas of their ad content display pages are within, or within a pre-defined distance outside of, the viewer's browser window dimensions and scrolling position, and obtain a JavaScript tag and link for placement on the ad content display page where the billboard module is located, which tag establishes communications with the system side server when a viewer initially requests the particular ad content display page. The system server-side application receives the JavaScript tag request, retrieves from the system database the data record corresponding to the requested page and retrieves viewer and browser address and other data from the viewers' browser request itself, and generates the custom correlator code to control billboard module activation, and thereby controls ad content rendering, to activate the designated billboard module when and/or only to the extent that the pre-defined area of the ad content display page is within, or within a pre-defined distance outside of, the viewer's browser screen dimensions and scrolling position. The correlator code is generated for each viewer's request of the particular ad content display page and is customized for each viewer in that its functioning is tied to each specific viewer's browser window dimensions and scrolling position, but may be customized by a web administrator and placed directly on the page without the use of the server side application. The correlator code is written to or otherwise embedded on the ad content display page. The correlator code determines whether the page coordinates of the pre-defined area of the ad content display page correspond with the coordinates of the viewer's browser window dimensions and scrolling position. The correspondence may be partial or full or can be correspondence with coordinates that are a pre-defined distance outside of the viewer's browser window dimensional and scrolling position coordinates. The correlator code collects additional information from the viewer's browser, including, without limitation, the viewer's operating system and browser type/version, and a list of other content that was already rendered on the page to prevent duplication of the same content on the ad content display page, among other data and preferably also indexes the page for content and whether the browser window is open, minimized, tabbed away from or otherwise covered by another browser window or other application opened by a viewer. The correlator code dynamically generates a marker for the ad content display page area where the content will be rendered. The marker may be HTML code or coordinates in the correlator code, or can be created by other means for creating a page area marker. The system correlator code then generates a query string link including the data collected via the correlator code and server-side application and the query string link is stored as a variable on the ad content display page. When the pre-defined content triggering page area is also the area of the page where the designated billboard module is located, i.e., where the ad content is to be rendered, the designated billboard module can be activated only when the correlator code determines that the designated billboard module on the ad content display page is within, or within a pre-defined distance outside of, the viewer's browser screen dimensions and scrolling position. The correlator code periodically determines whether there is any correspondence between ad content display page area coordinates and browser screen dimension and scrolling position coordinates and when the required correspondence is detected (which may be partial or full correspondence, or correspondence with coordinates that are a pre-defined distance outside of the viewer's browser window dimensions and scrolling position, as desired and as designated by system users or as programmed into the system), the correlator code activates the query string link, passing the information associated with the query string to the designated billboard module thus activating the billboard module and causing the real time auction to occur, which can consider the information passed to the module, and causing the winning advertiser's designated ad content to be retrieved and rendered, or other action to be triggered. Viewers can access content sites and ad content display pages by existing or future means, such as via a viewer-end computer configured and equipped for Internet and communicating with said content display site. The electronic communications network used in this embodiment can be as with the rest of the system, one or more of multiple network types, such as, without limitation, networks of computers communicating via common protocols such as the Internet, as well as cellular, wireless, cable, satellite, power line or other networks or combinations of such networks. Viewer-end communication devices can be a typical microprocessor-based desktop or laptop computer, or a personal digital assistant wireless phone or other electronics network communication device, typically having a microprocessor supported by a read only memory, a random access memory and input and output devices such as display screens and keyboards/keypads, capable of running a browser application. Viewers access the particular network typically via a telecommunications service provider (e.g. an Internet service provider) and use a browser application to access websites.

The content files are not limited to any particular form, and may be static HTML images or rich media files such as .swf. The content files are preferably stored at a content server. The interface means, processor means and computer communications means can have various embodiments, including, without limitation, use of traditional Internet browser applications.

The method of the embodiment of the present invention that includes billboard module activation control comprises the steps of: designating one or more ad content display pages, one or more ad content display page triggering areas, one or more billboard modules that communicate with a system end dispatcher server to retrieve one or more ad parameter and command files containing commands, parameters and instructions to retrieve, assemble and render one or more designated ad content files stored at one or more ad content servers at said designated ad content display page rendering areas of said ad content display page or other network location where said one or more billboard modules are located; storing as a record within a system-side database data pertaining to said ad content display page, ad content display page triggering area and billboard module; generating and writing to or otherwise embedding on the designated ad content display page a tag/link that when activated by an ad content display page viewer request of the designated ad content display page, links to a system server-side application and retrieves, via said server-side application, data from said record stored in said system server-side database and data pertaining to said viewer and viewer browser from said ad content display page request, and generating and placing a correlator code on the designated ad content display page which determines whether said ad content display page triggering areas of the ad content display page is within, or within a pre-defined distance outside of, the viewer's browser window dimensions and scrolling position; said correlator code then generating a marker for the designated ad content display page rendering area, generating a query string and link for placement at the ad content display page, which based on detection that the designated ad content display page triggering area is within, or within a pre-defined distance outside of, the dimensions and scrolling position of the viewer's browser window, passing the information associate with it and activating the designated billboard module causing a real time auction to occur, which can consider the information gathered and passed to the module and causing the winning advertiser's designated ad content to be rendered in the designated billboard module ad content display page rendering area of the ad content display page where the billboard module is located. FIGS. 54-A and 54-B, discussed further below, depict the process flow of the method in a preferred embodiment.

Figure 51:
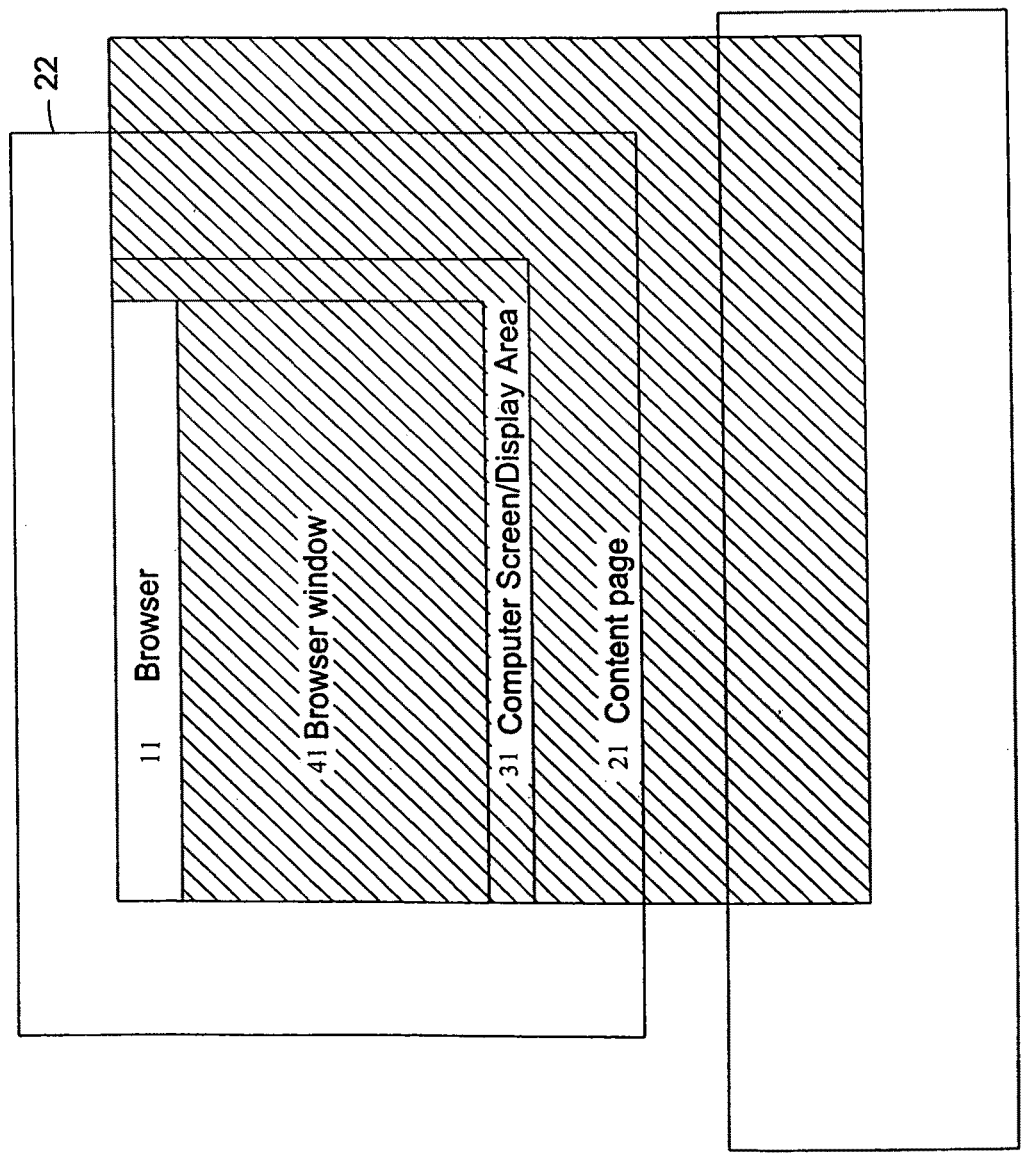
FIG. 51 is a diagrammatical overview of the interplay and overlap of a viewer's screen display area, browser application, browser window and ad content display page.

Referring to FIG. 51, which depicts a diagrammatical overview of the interplay and overlap of a viewer's screen display area, browser application, browser window and ad content display page, there is a content display page 21 with space on its pages for content to be rendered, which appears within a browser window 41, a portion of which is within the viewer's display screen area 31. As can be seen, the ad content display page is larger than the browser window, so not all of the ad content display page area is within the browser window dimensions and scrolling position shown on the viewer's display screen. In this embodiment the activation of billboard modules can be controlled so that only the billboard module that is designated to activate when a pre-defined area within the ad content display page area is within, or within a pre-defined distance outside of, the viewer's browser window dimensions and scrolling position is activated, and so that billboard module activation occurs only when such pre-defined ad content display page triggering area is within, or within a pre-defined distance outside of, the viewer's browser window dimensions and scrolling position.

Figure 52:
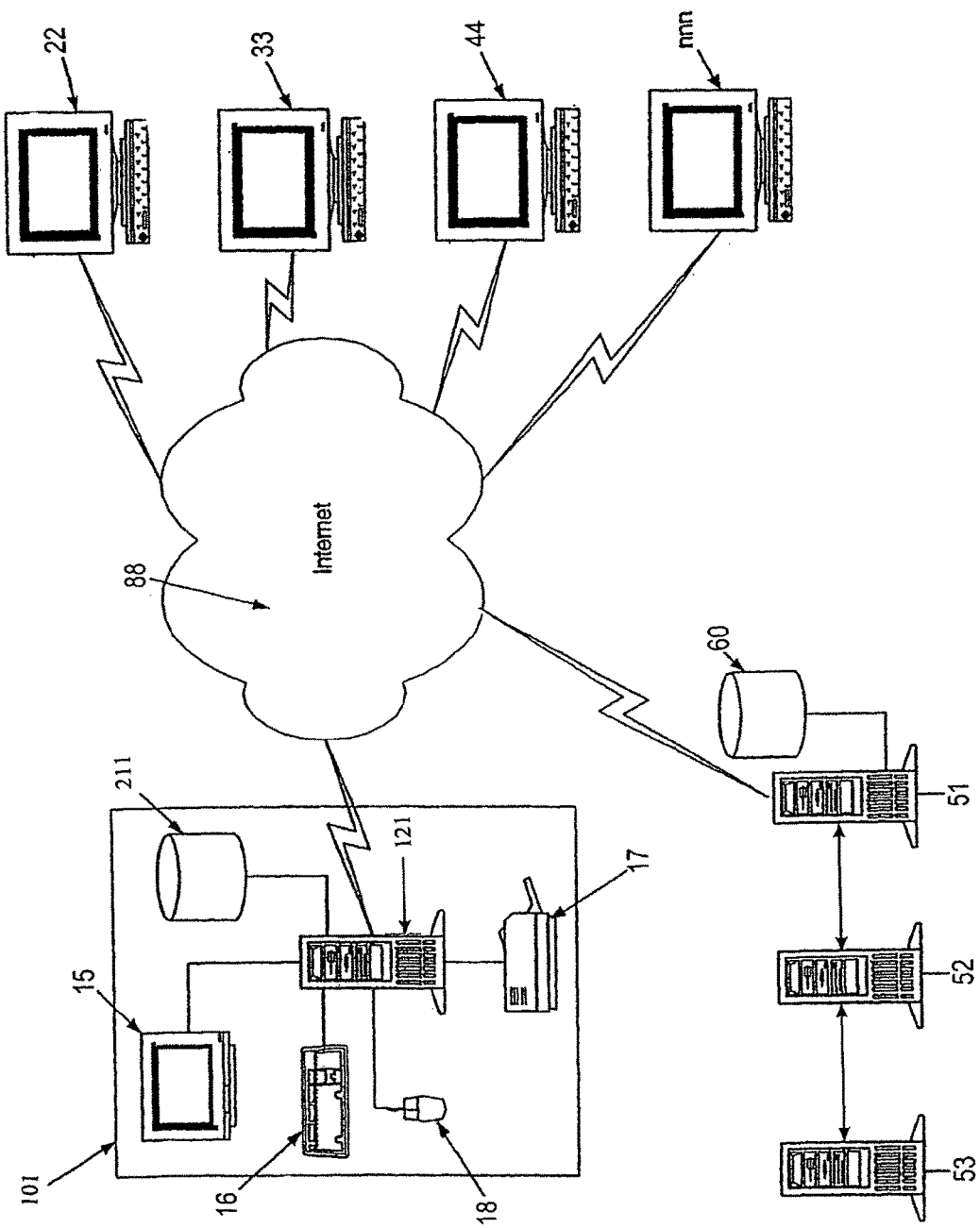
FIG. 52 is a diagrammatical representation of system components and their interrelationship with ad publishers as ad content display page administrators, viewers and communications network(s) in an embodiment including the content rendering control feature of the present invention.

Referring now to FIG. 52, an overview of system interactions in this embodiment with one or more ad publisher ad content display page viewer computer systems or other communications devices having a browser application 22, 33, 44 and nnn, and communicating via the Internet 112 with the ad content display page computer system 101. The ad publisher ad content display page computer system 101 comprises an ad content display page server 121 and file storage device 211 as with the typical Internet client-server model utilizing HTTP. HTTP is a known application protocol that provides users access to content in different formats such as text, graphics, images, sound, video, as well as programs. HTML is a standard page description language which provides basic document formatting and allows the programmer to specify links to other servers and files. Links are specified via a Uniform Resource Locator or URL. Upon specification of a link, the client makes a TCP/IP request to the server and receives information that was specified in that URL (for example another Web page that was formatted according to HTML) in return. The information returned may be generated in whole or in part by a program that executes on the server. Such programs are typically known as Common-Gateway-Interface scripts and can be written using known programming languages or methods that the server supports. A typical Web page is an HTML document with text, "links" that a user may activate (e.g. "click on"), as well as embedded URLs pointing to resources (such as images, video or sound) that the client must fetch to fully render the Web Page in a browser. These resources may not be located on the same server that the HTML document was sent from. Furthermore, HTTP allows for the transmission of certain information from the client to a server. This information can be embedded within the URL, can be contained in the HTTP header fields, or can be posted directly to the server using known HTTP methods. Both the viewer and the ad publisher as the ad content display page administrator can communicate with the system via various input and output devices, as previously described. System computer components are as described previously with reference to FIG. 2.

The system in this embodiment includes, either as an additional graphical interface or as part of the overall system graphical user interface, a graphical user interface for system users, e.g., advertisers and ad publishers as ad content display page administrators, to create a system account, register the ad content display page and the area of the ad content display page where a billboard module is to be located and the area of the ad content display page that will cause the billboard module to be activated when such area is within the viewer's browser window dimensions and scrolling position, and provide demographic and other pertinent information regarding the ad content display page and information pertaining to the billboard module to be activated in the designated page area. The ad content display page triggering area and the ad content display page rendering area where the billboard module is located can be the same or different areas of the ad content display page. The information is stored as a record in the system server-side database, and the system generates a single tag and link, preferably a JavaScript tag, with the link linking to the system server-side software application, to be placed by the ad publisher as the ad content display page administrator at the ad content display page where the specified billboard module is located (although the positioning of the tag/link can be anywhere on the ad content display page, not necessarily in the location of the page where the billboard module is located). When the ad content display page where the JavaScript tag and link is written/embedded is requested by a viewer via the viewer's browser, the link to the system server-side application is activated and the system server-side application retrieves the corresponding record stored in the system database for the ad content display page and retrieves viewer and browser data from the page request itself. The system server-side software application then generates the custom correlator code. This correlator code assigns a unique ID to the particular viewer/browser and generates a marker for the ad display page are where the billboard module is located. The marker may be HTML code or coordinates in the correlator code, or can be created by other means for creating a page area marker. The correlator code also generates a query string link that includes the data collected via the correlator code and stores the query string link as a variable on the ad content display page. The correlator code includes the variables and functions to execute the browser window/ad content display page area correlating, based on the positional coordinates of said ad content display page triggering area and the positional coordinates of said viewer's browser window dimensions and scrolling position. When the correlator code determines that the designated ad content display page triggering area is within (or within a pre-defined distance outside of) the dimensions and scrolling position of the viewer's browser window, the query string link stored as a variable on the ad content display page is activated and a JavaScript tag is created that can execute any number of actions, including, but not limited to, generating JavaScript functions to initiate actions and HTML tags to request content or activate a billboard module, causing a real time auction to occur and for the winning advertiser bidder's designated ad content to be rendered in the designated ad content display page rendering area where the billboard module is located.

In a preferred embodiment, during the registration process the ad publisher, as the ad content display page administrator, enters information related to the ad content display page such as name of page, content data, the specific area of the ad content display page that will trigger content rendering when it is partially or completely within, or within a pre-defined distance outside of, the viewer's browser window dimensions and scrolling position, the specific area of the ad content display page where the billboard module is located (which can be the same as or different from the ad content display page triggering area), and demographic and other information pertaining to the ad content display page. The system then saves this data as a record in the system server relational database, and assigns the record an id, which may be encrypted. The system then generates JavaScript code comprising a single tag with the encrypted ID, with a link to the system server-side application, and the ad publisher/ad content display page administrator places this single tag/link on the ad content display page.

When the webpage containing the JavaScript tag is requested by a viewer, the JavaScript tag link that contains an encrypted ID of the stored data record at the system database in its query string triggers the server-side software application. This custom server side software application is preferably housed in the system server and can be written in C#, PHP or any other appropriate programming language. When the tag/link is a JavaScript tag/link, the server-side application disguises itself as JavaScript in order to respond to the JavaScript tag's request, and collects a variety of information from the request such as domain/address of the ad content display page, the IP address associated with the viewer, and other information from the stored data for the ad content display page, such as information regarding the billboard module to be activated, rendering area size, previously entered ad content display page demographics and other information retrieved from the system's relational database.

According to this initial information, as a response, the server side application generates and prints on the ad content display page additional JavaScript code that dynamically creates on the ad content display page a placeholder or marker for the area of the ad content display page, where the billboard module is located and contains all the necessary variables and functions to execute the billboard module activation and thereby the rendering control and data gathering process described herein from the viewer's browser and the ad content display page, correlating billboard module location on a content display page with viewer browser window dimension and scrolling position data. The marker may be HTML code or coordinates in the correlator code, or can be created by other means for creating a page area marker. This code also collects additional information available from the viewer's browser such as the viewer's operating system, browser version, as well as a unique browser/user computer id that is assigned to the particular viewer/browser, which can be created by the correlator code itself, or can be created by the system server-side software application and retrieved from cookies or from the system database. The correlator code also gathers the most frequently occurring words in the ad content display page text (for ad content display page indexing), and a list of other content that was already rendered on the page to prevent duplication of the same content on the page, whether the browser window is open, minimized, or otherwise covered by another browser window or other application opened by a viewer. and other specific filtering and management, for instance while rendering an image in one content rendering it may be preferred to stop loading video in another content rendering and/or custom information previously stored in cookies, and information collected from the ad content display page. A query string link is then created and all collected information is attached. Then this query string which is stored as a variable on the web page. A webpage or other ad content display page may be divided into or otherwise contain any number of pre-defined designated billboard module content rendering areas and the system can monitor if any of those pre-defined content rendering areas of the ad content display page are within the dimensions and scrolling position of the viewer's browser window. If any of the pre-defined billboard module content rendering areas come within, or within a pre-defined distance outside of, the viewer's browser window dimensions and scrolling position, the query string link that is stored as a variable on the page is activated, activating the billboard module, and passing all of the information associated with the query string to the module. The ad content display page area/browser dimension and scrolling position correlator code communicates with the billboard module as well as the ad content display page and the browser.

Content rendering activity information is sent in the form of a self-contained file, preferably to the system tracking server. Preferably, such file is a flash file identified by the .SWF suffix or any comparable code such as, without limitation. .net, .asp or AJAX, as previously described. It is to be understood that under the teachings of the present invention, any type of file that is capable of operation without the initiation of an additional application could be used in place of Flash and the .swf file and use of a .swf file is not a limitation of the present invention. The billboard module does not perform the function of the correlator code; instead, the correlator code exists and functions as described above and when it detects the correspondence between the pre-defined ad content display page triggering area and the viewer's browser window dimensions and scrolling position, it triggers the billboard module, which causes a real time auction to occur for the designated advertisement placement and causes the winning advertiser bidder's designated ad content files to be rendered, instead of triggering content rendering directly. Enhanced viewer activity tracking can be enabled by use of a .swf or other self-contained application described herein as the billboard module embedded in the ad content display page, when the correlator code determines that the content rendering area where the billboard module is located is within (or is within a pre-defined distance outside of) the viewer's browser window dimensions and scrolling position, which includes all necessary code to communicate with the correlator code, a content server and the system server or tracking server. The billboard module then renders content within itself and communicates back to the correlator code and tracking server that the content has been fully rendered. The correlator code described above continuously communicates with the browser and web page to correlate the coordinates for the pre-defined ad content display page triggering area of the web page within the viewer's browser window dimensions and scrolling position, in addition to whether the browser window has been minimized, tabbed away from or otherwise covered by another application window, and communicates the information to the billboard module. The messages can be sent to the billboard module continually in pre-defined increments, such as every second, or fraction of a second, essentially communicating to the billboard module how many seconds the area of the webpage is available in a viewer's browser window. In addition, the billboard module itself continues to collect information related to the content rendered, including, but not limited to, clicks, videos watched, and other data. The billboard module then sends the information it is collecting to the system server or tracking server at pre-defined intervals (information can be sent immediately, or collected and sent). All of this information can be sent from the billboard module to the system server or tracking server(s) and can be stored in the system (or other) database(s) using file server direct connection communication or FSDC technology. Tracking information can be sent to a tracking server for storage and retrieval by system users. Content rendered via the billboard module can communicate, via the billboard module, with the web page area/browser window dimensions and scrolling position correlator code with useful effect; for example, a video may be part of the advertisement rendered at the designated ad content display page area via the billboard module and upon viewer's click on an optional video preview button the same correlator code creates another dynamic layer above all the existing layers on the web page that covers a certain portion of the viewable area of the browser window to show content/video above the content of the page. The same ad content display page area/browser dimension and scrolling position correlator code tracks how many times content was rendered at a particular billboard module and how many other billboard modules are designated on an ad content display page but are not in view because the area on the ad content display page where such billboard module is located was not within, or not within a pre-defined distance outside of, the dimensions and scrolling position of the viewer's browser window or did not completely render for a certain period of time, or if the browser window the module resides on is open, minimized, tabbed away from or otherwise covered by another browser window or other application opened by a viewer. The same web page area/browser window dimensions and scrolling position correlator code can also keep track of billboard module Id's to prevent duplication of content on the same page. The same correlator code also may store the collected and or custom information in cookies using the website domain for the page where the content rendering area is located and may request it later and send this information, when needed, to the domain of the system server for tracking and reporting. This feature is optional and designed to optimize the process, for if information previously gathered in cookies can be saved and retrieved when a viewer returns to the web page there is no processing unnecessarily repeated by the system. It is important to note here that if optional cookies are utilized by the system, they are saved by the ad content display page/website itself, and consequently attributed to the ad content display page/website's domain, not the billboard module system server domain, so the cookies are not considered "third party" or data mining cookies that are typically flagged or blocked by web security applications. When a viewer leaves or closes the ad content display page the correlator code indicates to all the billboard modules that are then loaded how much time, if any, that their content has been rendered and sends this information to the system server or tracking server using FSDC and the data can be stored in a system or other database. The record that is already stored is updated.

The correlator code described above periodically checks the location of the billboard module content rendering area location. The portion of the designated content triggering area that needs to fall within the browser window dimensions and scrolling position in order to initiate content rendering can be varied, and may be customized by the system administrator. For example, the system may send a message that the content is available when 90% of the designated ad content display page triggering area is within the viewer's browser window dimensions and scrolling position, or is within a specified distance from the viewer's browser window dimensions and scrolling position. The area/browser dimension and scrolling position correlator code at the ad content display page can send these messages to a billboard module or server side application continually in pre-defined increments, such as, for example, every second, or fraction of a second, communicating to the dimensions and scrolling position of the viewer's browser. The billboard module then sends the information it is collecting from the content rendering area/browser dimension and scrolling position correlator code to the ad dispatcher database, which is preferably housed in the server for tracking at pre-defined intervals (information can be sent immediately, or it can be collected and sent periodically).

Figure 57:
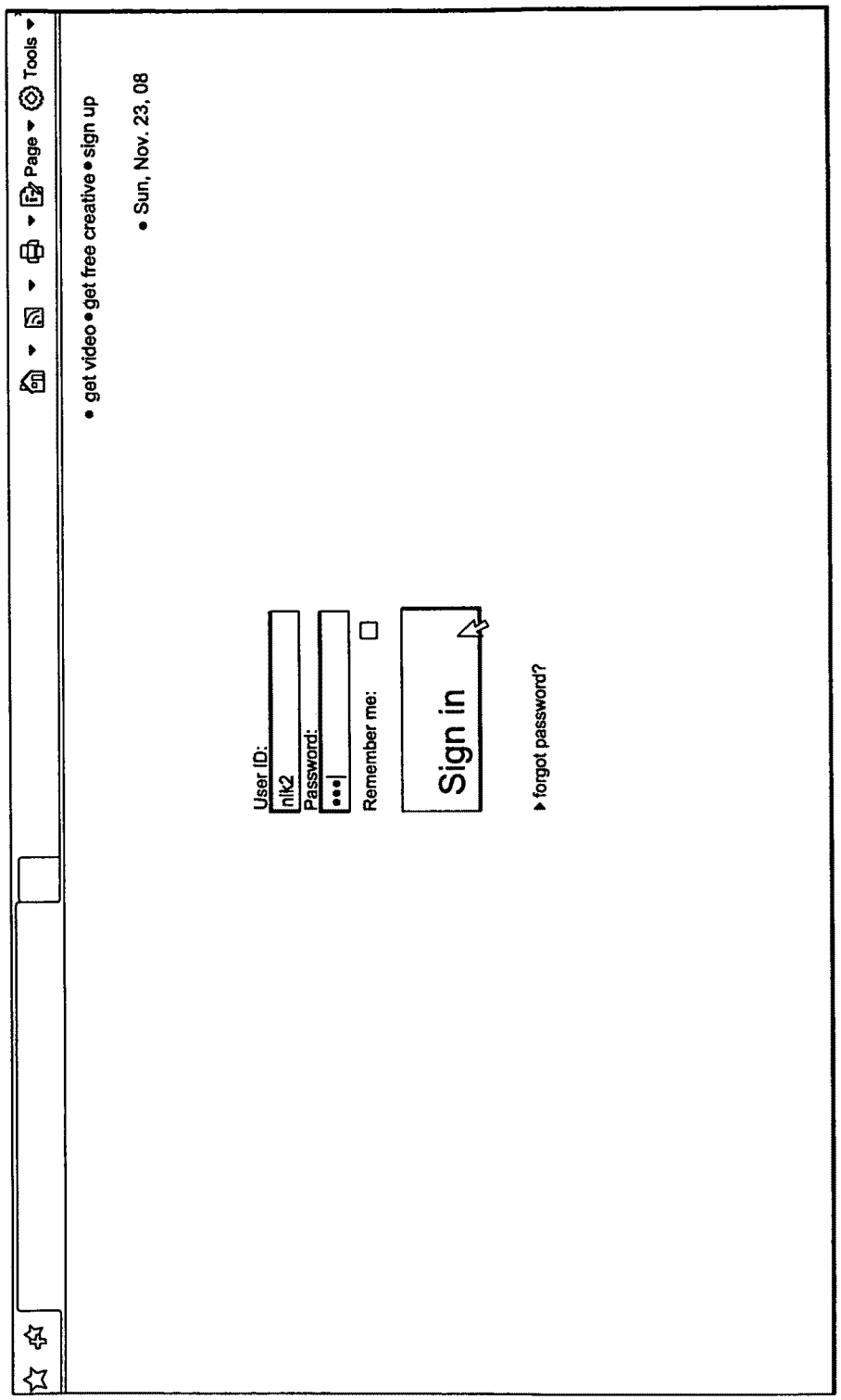
FIG. 57 depicts a sample system ad publisher content site administrator user login screen in an embodiment including the content rendering control feature of the present invention.
Figure 58:
FIG. 58 depicts a sample system user site registration screen showing data entry relating to ad content display page title, uniform resource locator address and optional logo image in an embodiment including the content rendering control feature of the present invention.
Figure 62:
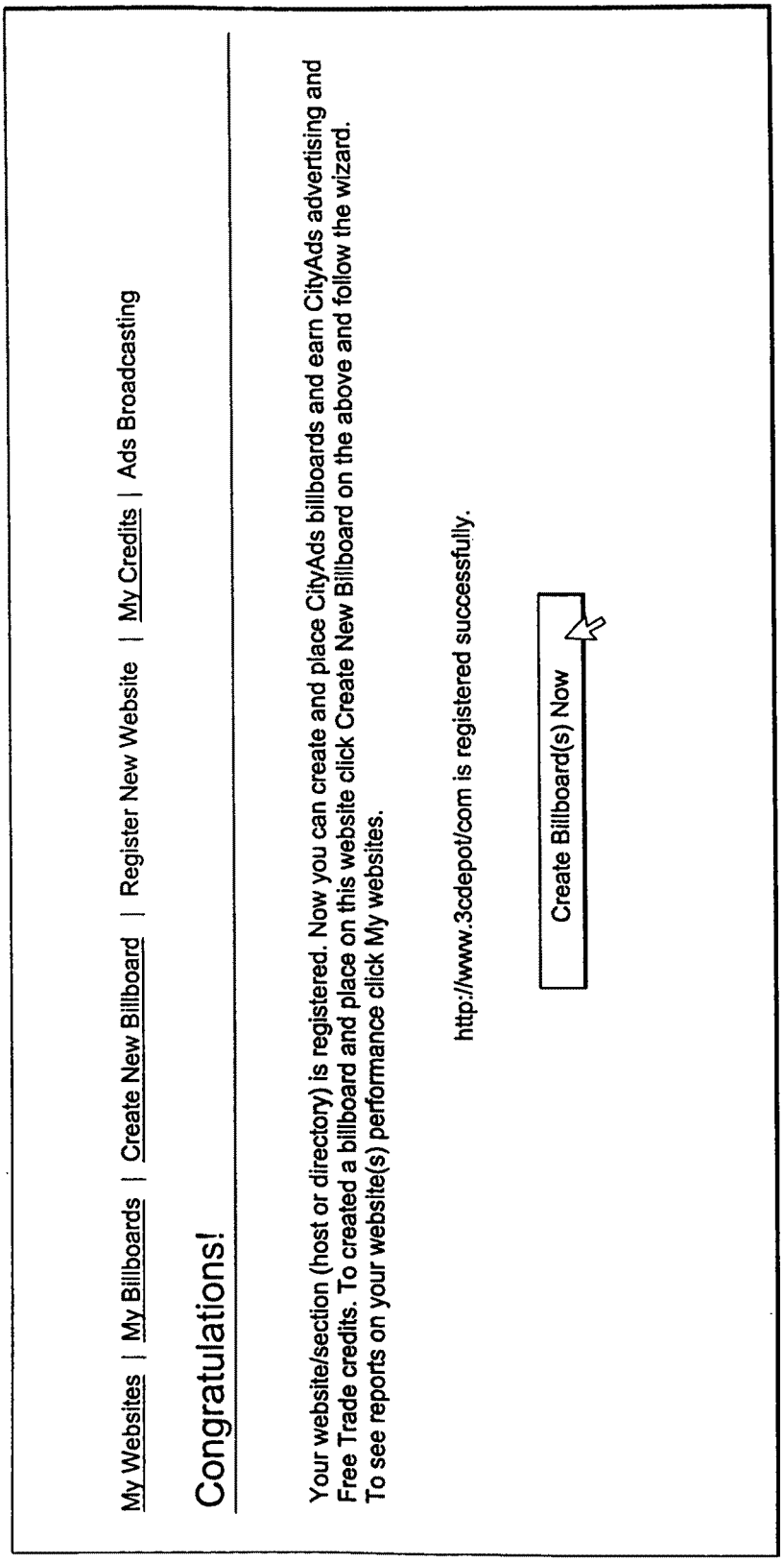
FIG. 62 depicts a sample ad content display page registration confirmation screen in an embodiment including the content rendering control feature of the present invention.
Figure 63:
FIG. 63 depicts a sample ad content display page rendering area creation screen in an embodiment including the content rendering control feature of the present invention.
Figure 64:
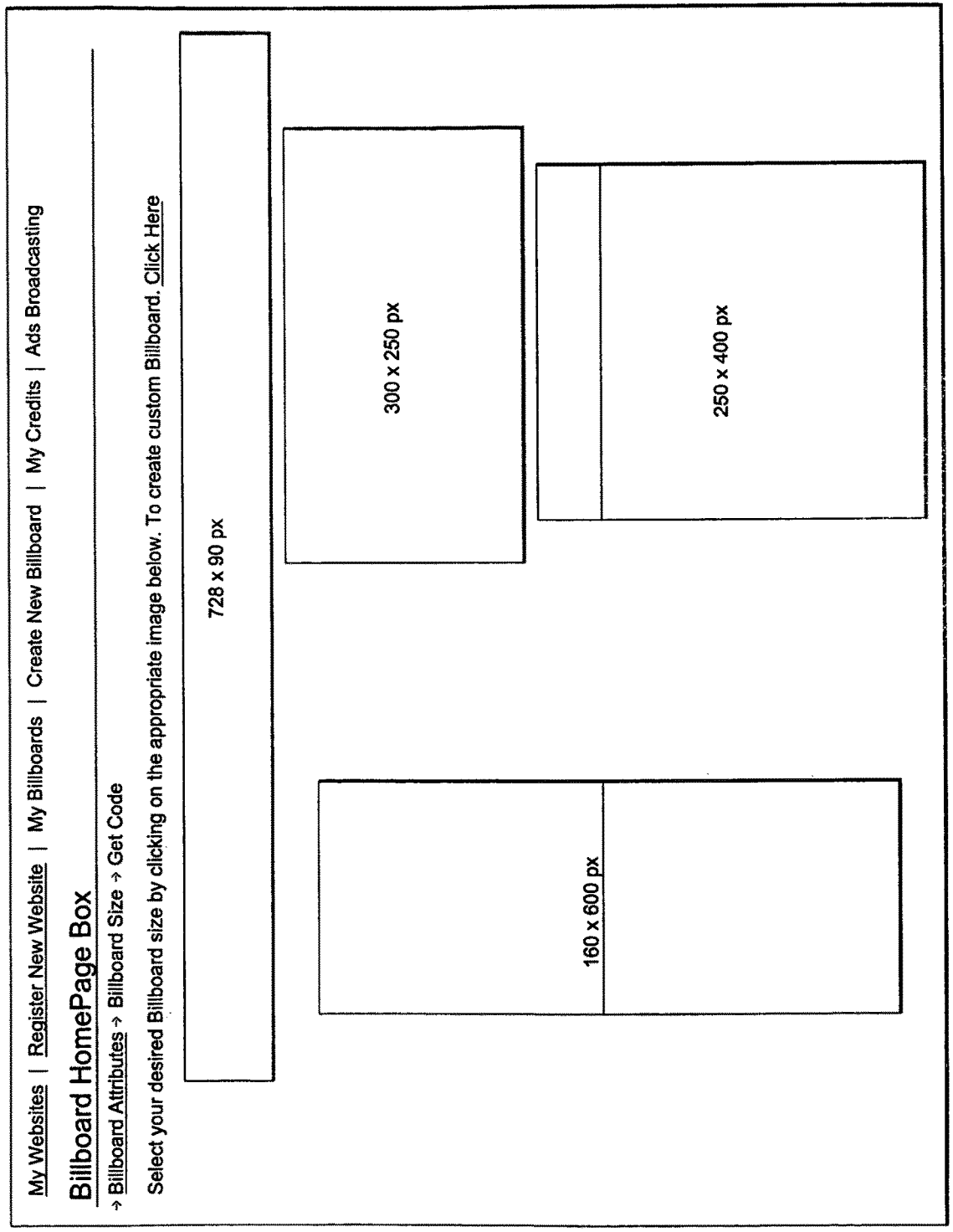
FIG. 64 depicts a sample ad content display page rendering area dimension selection screen in an embodiment including the content rendering control feature of the present invention.
Figure 65:
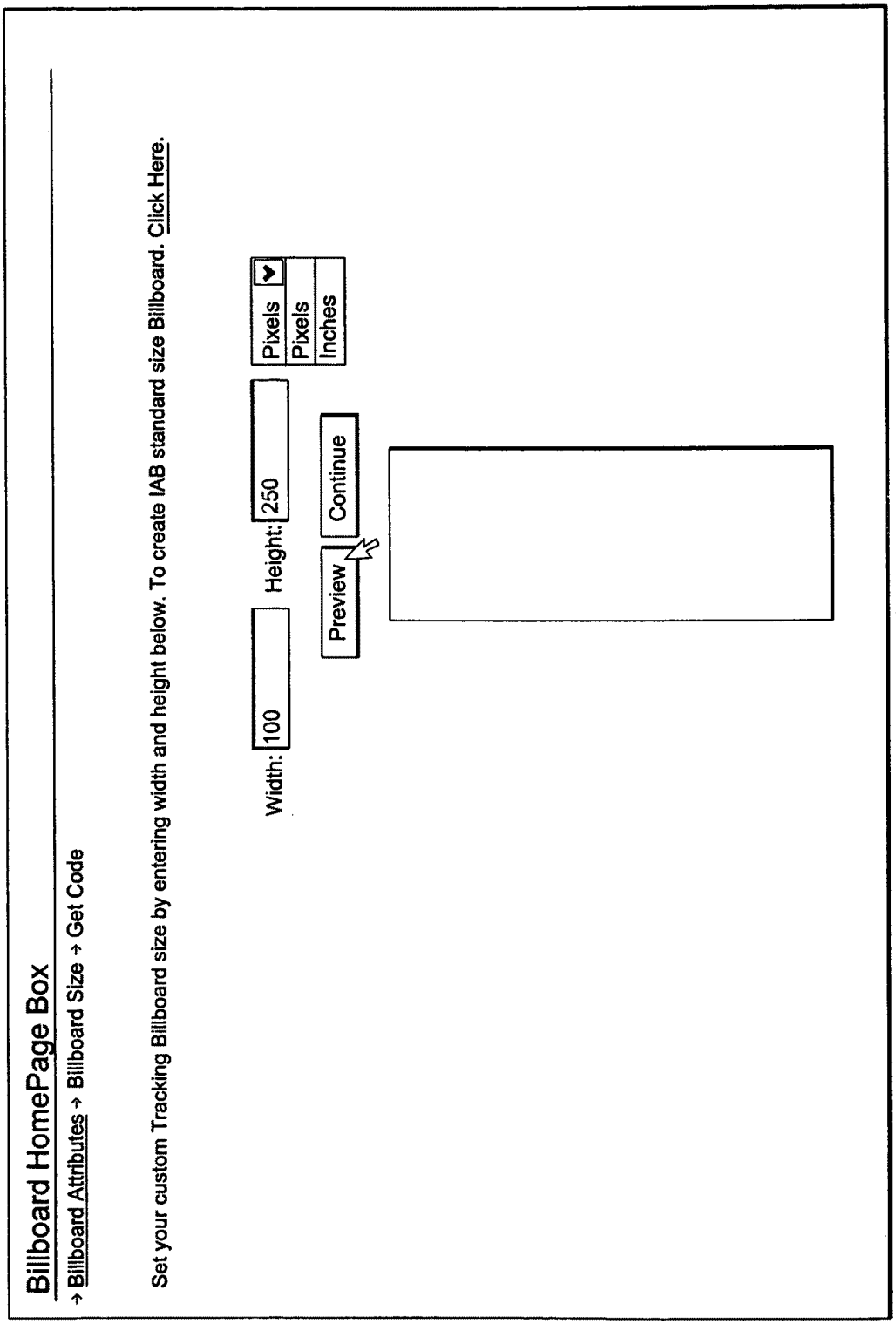
FIG. 65 depicts a sample ad content display page rendering area dimension specification screen in an embodiment including the content rendering control feature of the present invention.

The system is preferably made available to website operators via a system website for use by them after registering as a website content administrator. Referring to FIGS. 54-A, 54-B and 54-C, which show the process flow of this embodiment of the present invention, as shown in FIG. 54-A, an ad publisher as an ad content display page administrator accesses the system, which is preferably accessible via the Internet as a website, and is presented with the system graphical user interface screens, beginning with a registration screen. FIG. 56 depicts a sample system ad publisher/ad content site administrator user registration screen whereby a ad content display page administrator can register with the system. FIG. 57 depicts a sample system login screen. As shown in FIG. 54-A, ad content display page administrators first register with the system 101 as a content display site administrator and enter data pertaining to the ad content display page, the ad content display page triggering area that will trigger billboard module activation when it is within, or within a pre-defined distance outside of, the viewer's browser window dimensions and scrolling position, the area of the ad content display page where the designated content will be rendered (which may be the same area as the area of the ad content display page that will trigger billboard module activation when such area is within, or within a pre-defined distance outside of, the viewer's browser window dimensions and scrolling position), as well as designating the content to be rendered in a particular area of the ad content display page, ad content display page demographics and other pertinent information 201. The system user interface screens provide means for receiving from ad content display page administrators the ad content display page address, content file information (which may be in the form of instructions to retrieve one or more content files stored in a content server or storage device), billboard module data and content display area parameters and other ad content display page data from ad content display page administrators and system server with a database for storing one or more records containing such data, each record being given an identification code. FIG. 58 depicts a sample system user registration screen showing data entry relating to ad content display page title, uniform resource locator address and optional logo image. FIG. 59 depicts a sample user registration screen whereby ad content display page administrators enter their ad content display page's primary audience geographic location. Ad content display page administrators can select the geographic region that represents the location of the ad content display page's primary audience, if any. FIG. 60 depicts a sample user registration screen whereby ad content display page administrators enter their ad content display page's content type. FIG. 61 depicts a sample user registration screen whereby ad content display page administrators enter their ad content display page audience demographic data. FIG. 62 depicts a sample ad content display page registration confirmation screen. FIG. 63 depicts a sample ad content display page billboard module creation screen in this embodiment of the invention including billboard module activation control. Ad content display page administrators can designate a billboard module ad content display page rendering area for a ad content display page by entering a name for the billboard module located at such ad content display page rendering area, selecting a previously registered ad content display page, and designating content distribution parameters. FIG. 64 depicts a sample billboard module ad content display page rendering area dimension selection screen in this embodiment of the invention including billboard module activation control, whereby ad content display page administrators can select one or more pre-set billboard module ad content display page rendering area dimensions. FIG. 65 depicts a sample billboard module ad content display page rendering area dimension specification screen where ad content display page administrators can enter customized ad content display page billboard module rendering area dimensions and position parameters.

Figure 66:
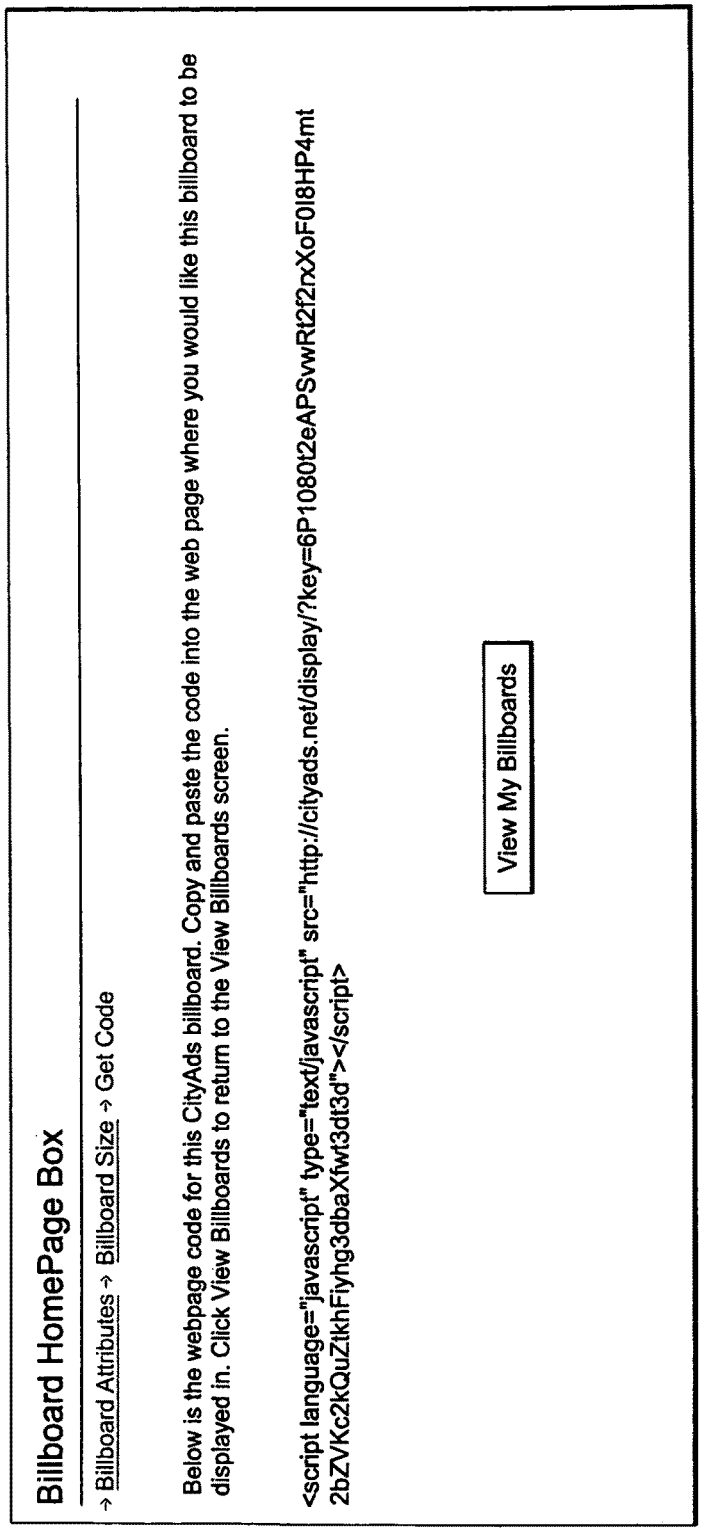
FIG. 66 depicts a sample screen wherein a JavaScript tag with link to the system server-side application is generated for ad publisher ad content display page administrators to copy and paste into the page code of the ad content display page in which the designated ad content display page rendering area resides in an embodiment including the content rendering control feature of the present invention.

Referring to FIG. 54-A, the above-referenced data is then saved by the system as a data record in the system database and an identification code is assigned to the data record 301, as shown in FIG. 65. The system software applications then generates a JavaScript tag with the link to the system server-side application including the ID of the record stored in the system database pertaining to the particular ad content display page, billboard module and rendering area 400, and the ad content display page administrator places the JavaScript tag and link on the ad content display page 500. The tag includes the identification code for the corresponding record stored in the system database and a link to a system server-side application. FIG. 66 depicts a sample screen wherein a JavaScript tag with link to the system server-side application is generated for ad content display page administrators to copy and paste into the page code of the ad content display page in which the designated billboard module resides.

Figure 53:
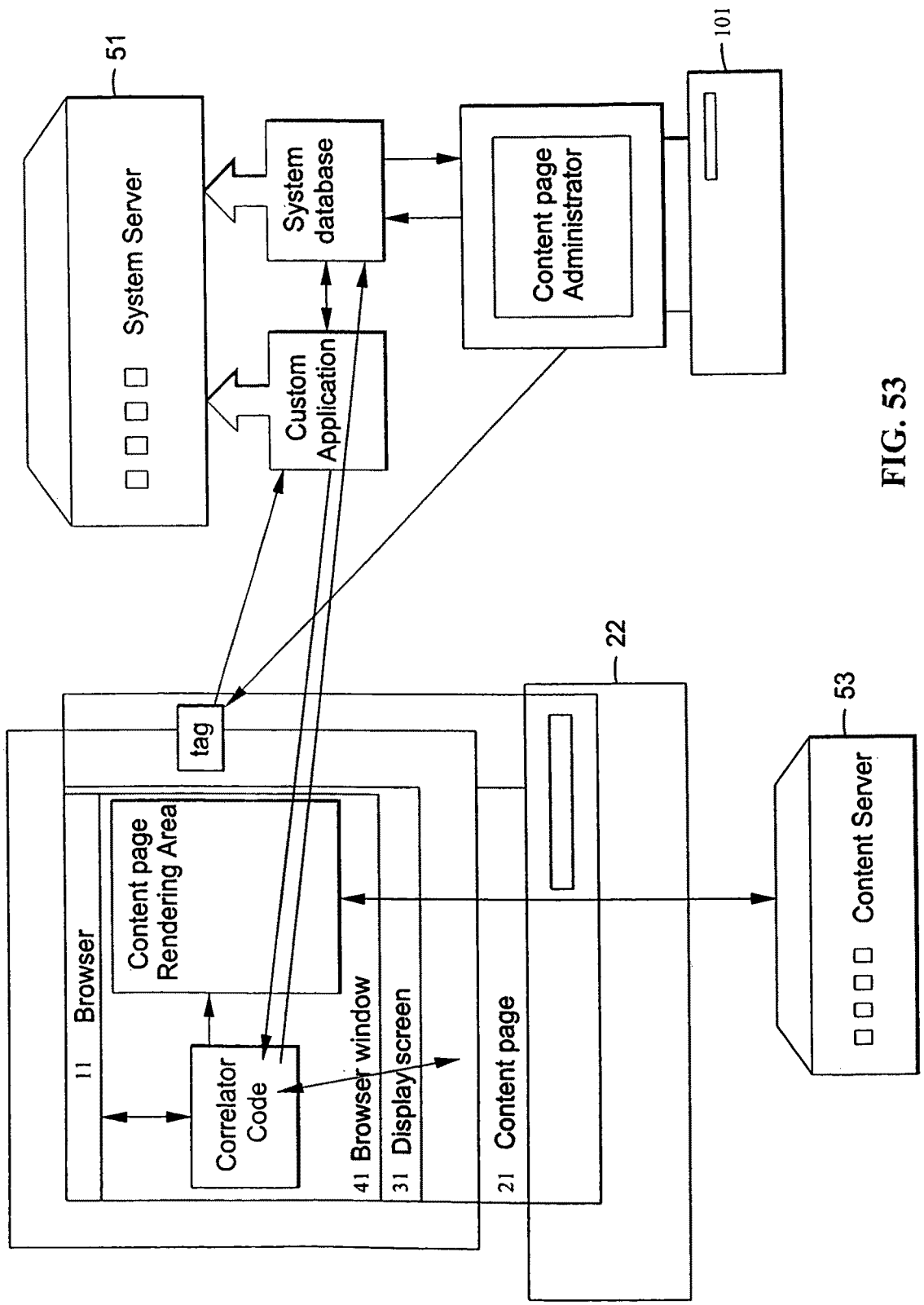
FIG. 53 is a diagrammatical overview of the communication flow among system components, ad content display page administrators and website viewers in an embodiment including the content rendering control feature of the present invention.

As shown in FIG. 54-B, when an ad content display page viewer requests the ad content display page that has such JavaScript tag and link 600, the request activates the link to the system server-side application and the system application collects a variety of information from the viewer's HTTP request, including, but not limited to, the address of the ad content display page and the viewer's network address (for example, the Internet Protocol address associated with the viewer when the network is the Internet) 700, and retrieves the corresponding data record stored in the system server database, and generates code, preferably JavaScript code, referred to as a "correlator code," which is written to or otherwise embedded on the ad content display page. This correlator code then dynamically generates on the ad content display page a marker for the billboard module ad content display page area where the content will be rendered 800. The marker may be HTML code or coordinates in the correlator code, or can be created by other means for creating a page area marker. The correlator code can be positioned anywhere on the ad content display page, not necessarily the location on the ad content display page where the particular billboard module is located. A unique identification code is then assigned to the particular viewer/browser which can be created by the correlator code itself, or can be created by the system server-side software application and be retrieved from cookies or from the system database. The correlator code collects additional information from the viewer's browser, including, without limitation, the viewer's operating system and browser type/version, the most frequently occurring words in the web page text, and a list of other content that was already rendered on the page to prevent duplication of the same content on the ad content display page, among other data 900. The correlator code application then generates a query string link including the data collected via the correlator code and the query string link is stored as a variable on the ad content display page 1000. The correlator code periodically checks viewer browser screen coordinate data from the viewer's browser application with ad content display page coordinates for the ad content display page triggering area. FIG. 54-B and FIG. 54-C provides a diagrammatical representation of the communication flow between system components, ad content display page administrators and ad content display page viewers in an embodiment that includes a billboard module. The various arrows indicate the flow of communication between system components as the system operates, as explained below. As a viewer scrolls through a ad content display page (whether up and down or left and right) or the viewer's browser window dimensions change, the correlator code periodically checks the viewer's browser window scrolling position and dimensional coordinates and when there is correspondence (either partial or full, as has been designated or programmed into the system) between the browser window coordinates and the coordinates for the pre-defined ad content display page triggering area (or between coordinates that are a pre-defined distance outside of the viewer's browser window dimensional and scrolling position coordinates) 1100, the query string link is activated 1200 passing the information associated with it and activating the billboard module, causing a real time auction to occur 1300, which can consider the information passed to the module and cause the winning advertiser bidder's designated ad content to be rendered in the billboard module 1400. The correlator code also records at the ad content display page data retrieved from the viewer's browser regarding the rendering of the content, including, but not limited to the IP address associated with the viewer, browser and operating system version, unique identifier assigned by the server side application and information related to the text on the web page. The communication flow between system components is indicated in FIG. 53 by the arrows: Ad publishers, as ad content display page administrators, 101 register ad content display page data with the system server 126 and the information is stored as a data record in the system database which resides in the system server, with a tag/link sent back from the system to the ad content display page administrator 101 (as indicated by the arrows between ad content display page administrator 101 and system database), who then places such tag/link on the ad content display page (as indicated by the arrow from ad content display page administrator 101 to the ad content display page 21 at "tag"). When a viewer requests the ad content display page 21, the tag links to the custom application (as indicated by the arrow from tag to custom application), the custom application retrieves data from the database (as indicated by the arrows between custom application and system database). The custom application then generates the correlator code and it is written to or otherwise embedded on the ad content display page (as indicated by the arrow from the custom application to the correlator code box in the ad content display page 21). The correlator code communicates with the ad content display page 21 and with browser 11 as indicated by the arrows between said elements and also dynamically generates a marker for the billboard module, (as indicated by the arrow between the correlator code and the billboard module boxes).

Figure 55:
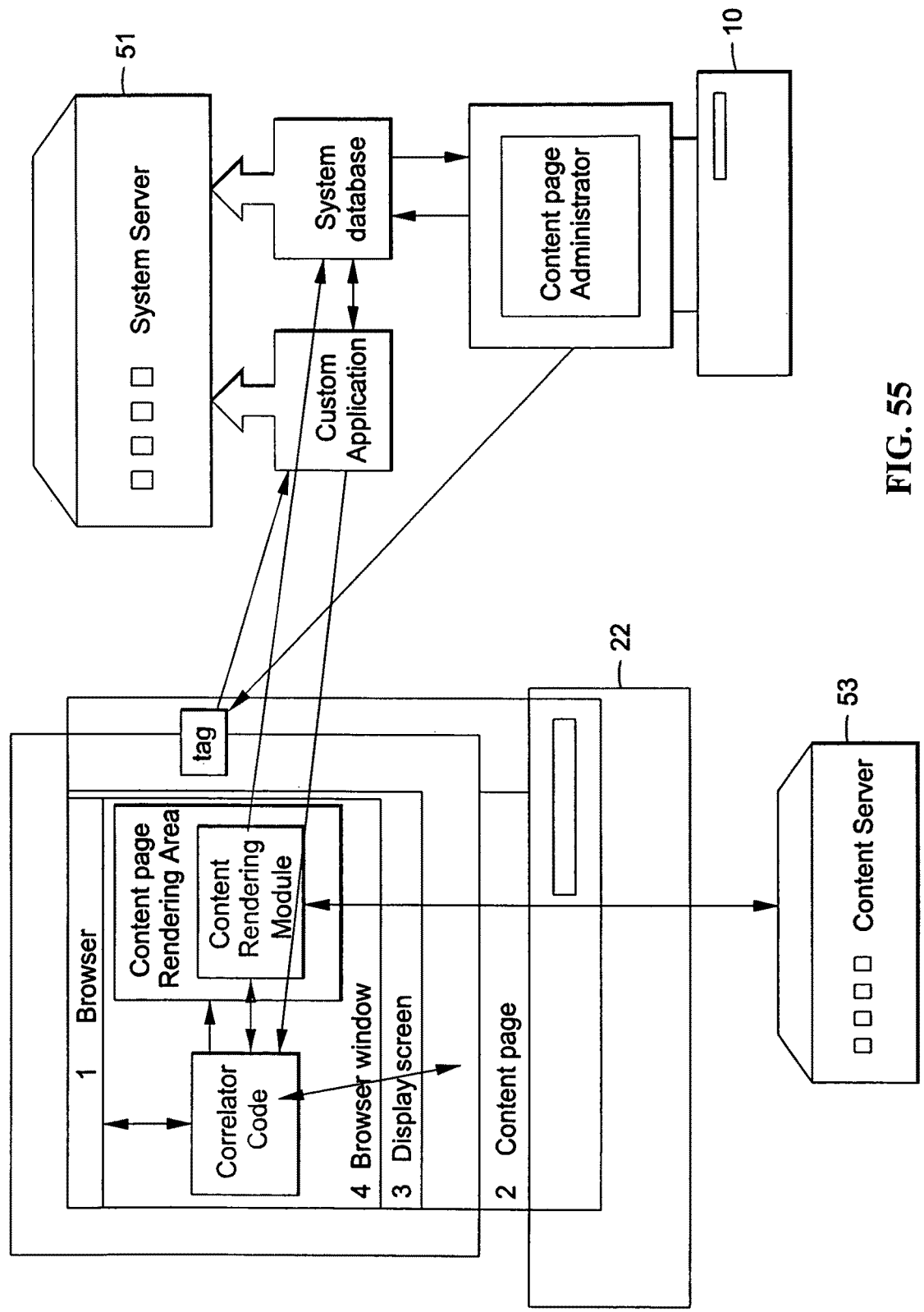

When the designated ad content display page triggering area (which may be the same as the billboard module ad content display page rendering area) is determined to be within the viewer's browser window dimensions and scrolling position, the billboard module is activated. The correlator code in this embodiment activates the billboard module .swf or other file (which can be comparable code such as .net .asp, AJAX or other form that contains all the necessary code to communicate with the correlator code on the webpage, retrieve and render content from a remote content server and send and retrieve data and variables from a remote server or servers). As shown in FIG. 54-C, the request contains the previously stored query string with unique ID of the billboard module content rendering area stored in a remote server and the information previously collected by the system database and correlator code 1200 (all of which is passed to the module). The billboard module set inside the ad content display page rendering area is initiated and establishes communication with the correlator code on the ad content display page where it is embedded as well as the system server or any remote server with the appropriate network protocol 1300. The billboard module then sends a request to the content server where the designated content files are located or to a database where a command and parameter file is stored with commands and parameters to retrieve, assemble and load the designated content files, and the content is rendered within the module area 1400. The billboard module then checks if all of the elements of the content are loaded and rendered and communicates that this is so to the correlator code 1500, and to the system database residing in the system server. The correlator code continues to monitor the location of the billboard module ad content display page rendering area and once it receives a signal from the billboard module that the content is loaded and rendered it communicates back to the billboard module whether it is within the viewer's browser window dimensions and scrolling position or not 1600. The billboard module then sends information it is collecting via the correlator code to a system database, residing in the system server for reporting, preferably using FSDC 1700. The correlator code can communicate directly back to the system database with data retrieved from the browser and ad content display page (as indicated by the arrow from the correlator code back to the system database). The communication flow between system components is indicated in FIG. 55 by the arrows: Ad content display page administrator 101 registers ad content display page data with the system server 126 and the information is stored as a data record in the system database which resides in the system server, with a tag/link sent back from the system to the ad content display page administrator 101 (as indicated by the arrows between ad content display page administrator 101 and system database), who then places such tag/link on the ad content display page (as indicated by the arrow from ad content display page administrator 101 to the ad content display page 21 at "tag"). When a viewer requests the ad content display page 21, the tag links to the custom application (as indicated by the arrow from tag to custom application), the custom application retrieves data from the database (as indicated by the arrows between custom application and system database). The custom application then generates the correlator code and it is written to or otherwise embedded on the ad content display page (as indicated by the arrow from the custom application to the correlator code box in the ad content display page 21). The correlator code communicates with the ad content display page 21 and with browser 11 as indicated by the arrows between said elements and also dynamically generates a marker for the ad content display page rendering area (as indicated by the arrow between the correlator code and the ad content display page rendering area and billboard module boxes). When the correlator code determines that the ad content display page triggering area, which, in the case of FIG. 55, is the billboard module ad content display page rendering area, the query string link that is stored as a variable on the ad content display page is activated and the correlator code dynamically activates the billboard module. The billboard module when initiated establishes communication with the correlator code on the webpage and the system database residing on the system server then requests, loads and renders content from a remote content server and the content is rendered in the billboard module ad content display page rendering area (as indicated by the arrows between the ad content display page rendering area and the content server). The correlator code communicates in this embodiment preferably directly back to the billboard module rather than directly to the system database, with the billboard module then communicating back to the system database, with data forwarded by the correlator code which was retrieved from the browser and ad content display page (as indicated by the arrows from the correlator code to the billboard module and from the billboard module back to the system file).

Figure 67:
FIG. 67 depicts a sample ad content display page with the content rendering area of the ad content display page located below the viewer's browser window dimensions and scrolling position, noted by an oval indicator in an embodiment including the content rendering control feature of the present invention.
Figure 68:
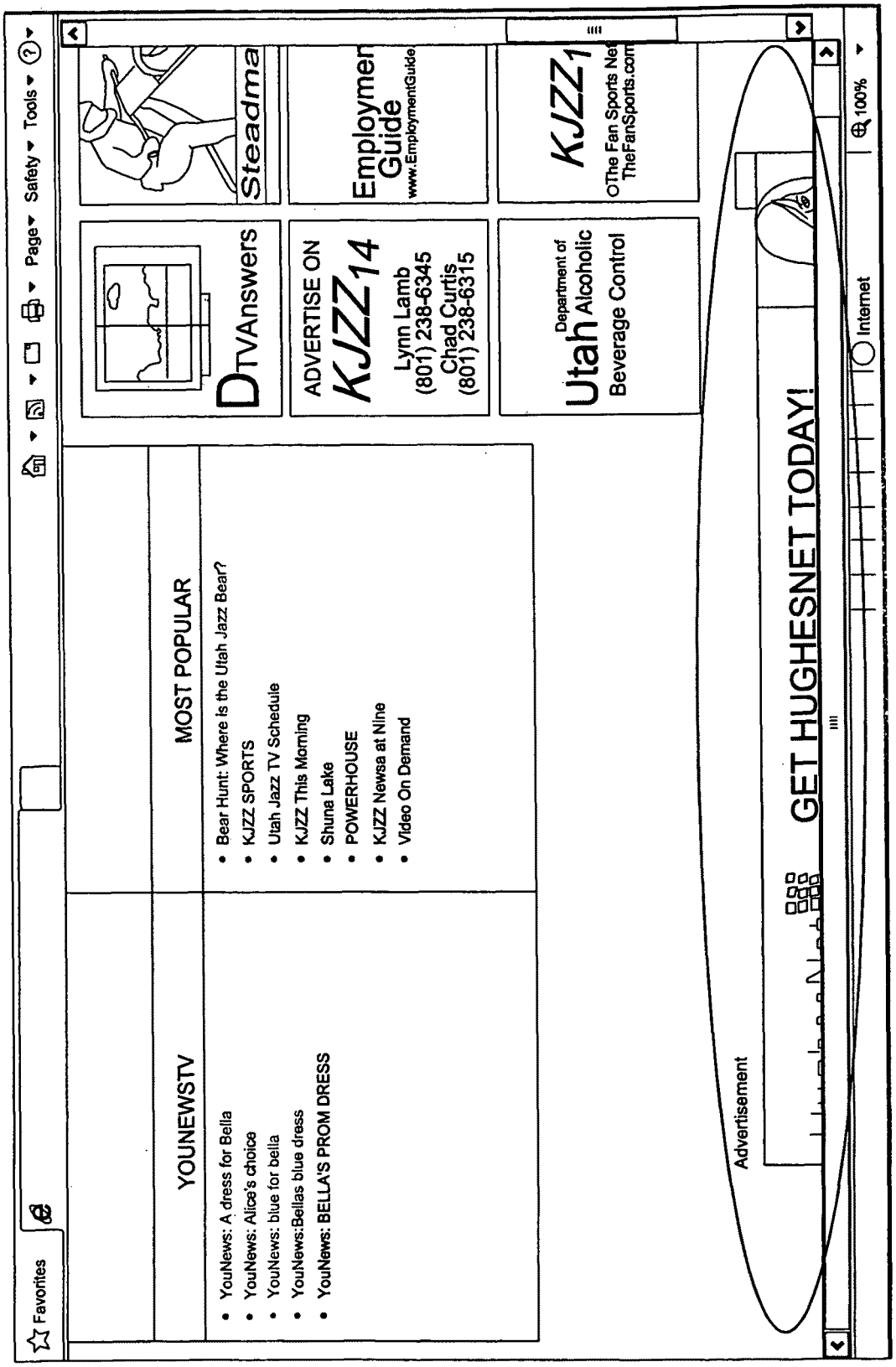
FIG. 68 depicts a sample ad content display page with the content rendering area entering the viewer's browser window dimensions and scrolling position, noted by an oval indicator in an embodiment including the content rendering control feature of the present invention.
Figure 69:
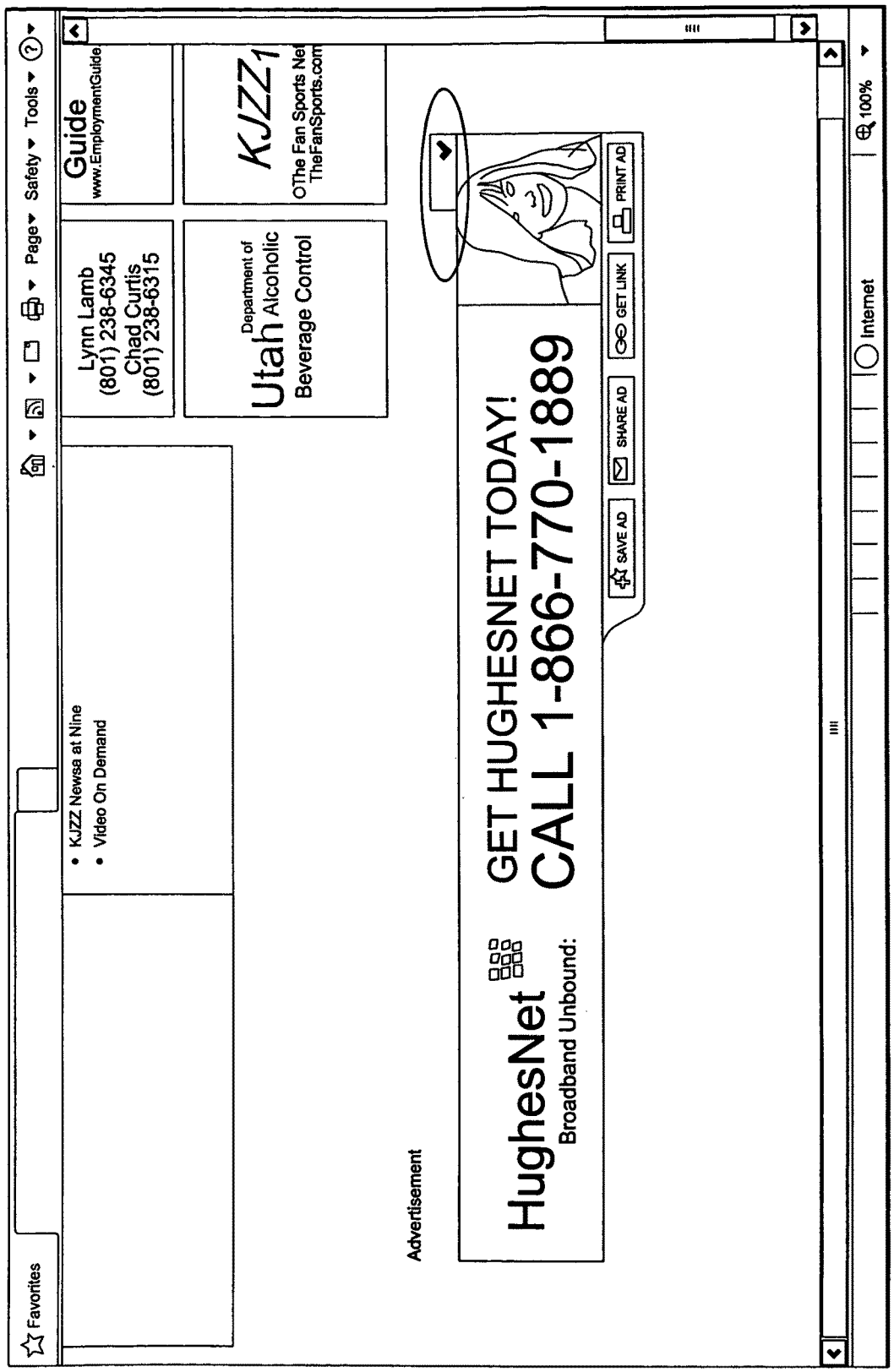
FIG. 69 depicts a sample ad content display page with the content rendering area fully within the viewer's browser window dimensions and scrolling position in an embodiment including the content rendering control feature of the present invention.
Figure 70:
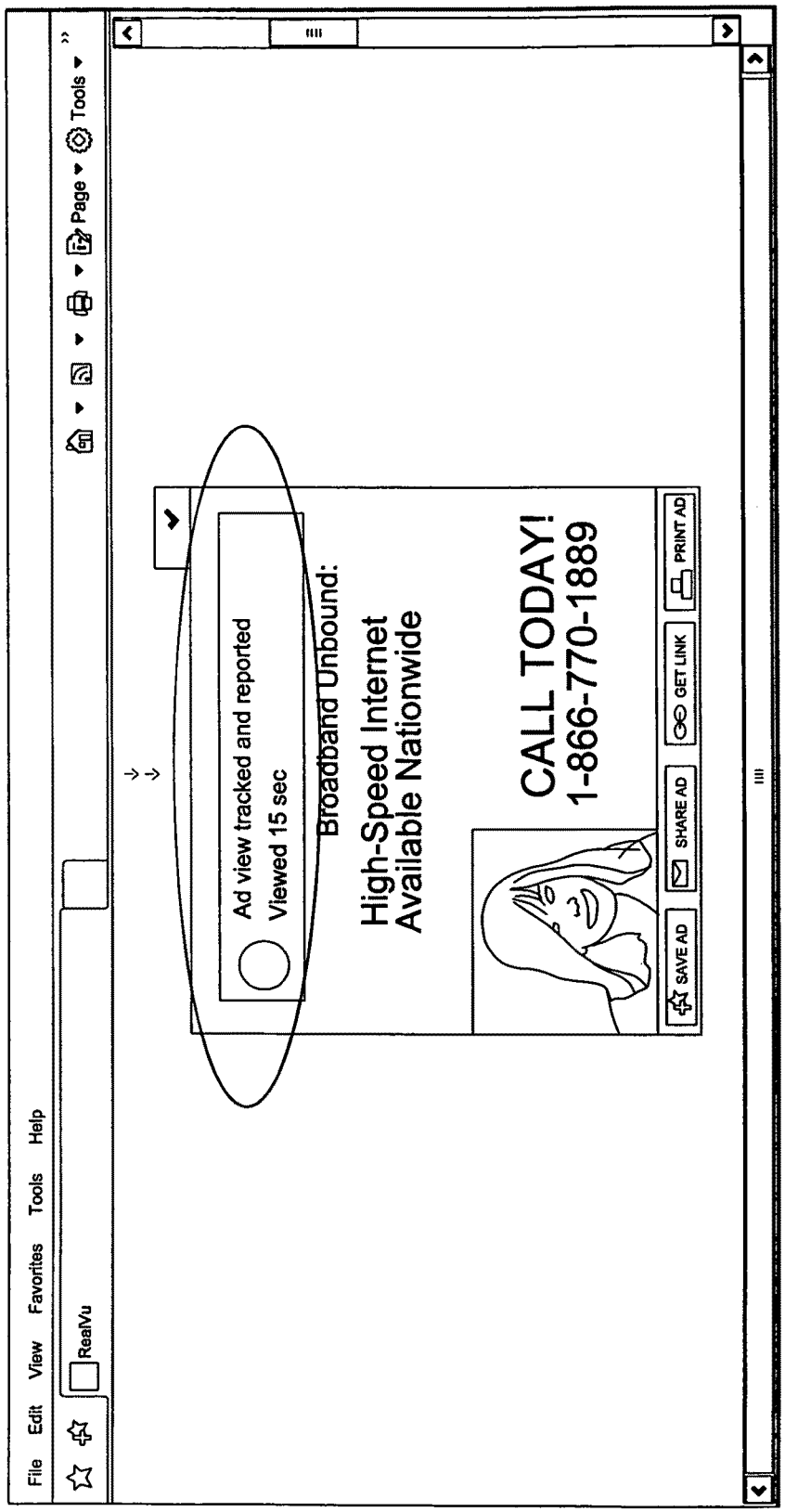
FIG. 70 depicts a sample ad content display page with the content rendered and an indicator showing the time that the content has been rendered in an embodiment including the content rendering control feature of the present invention.
Figure 71:
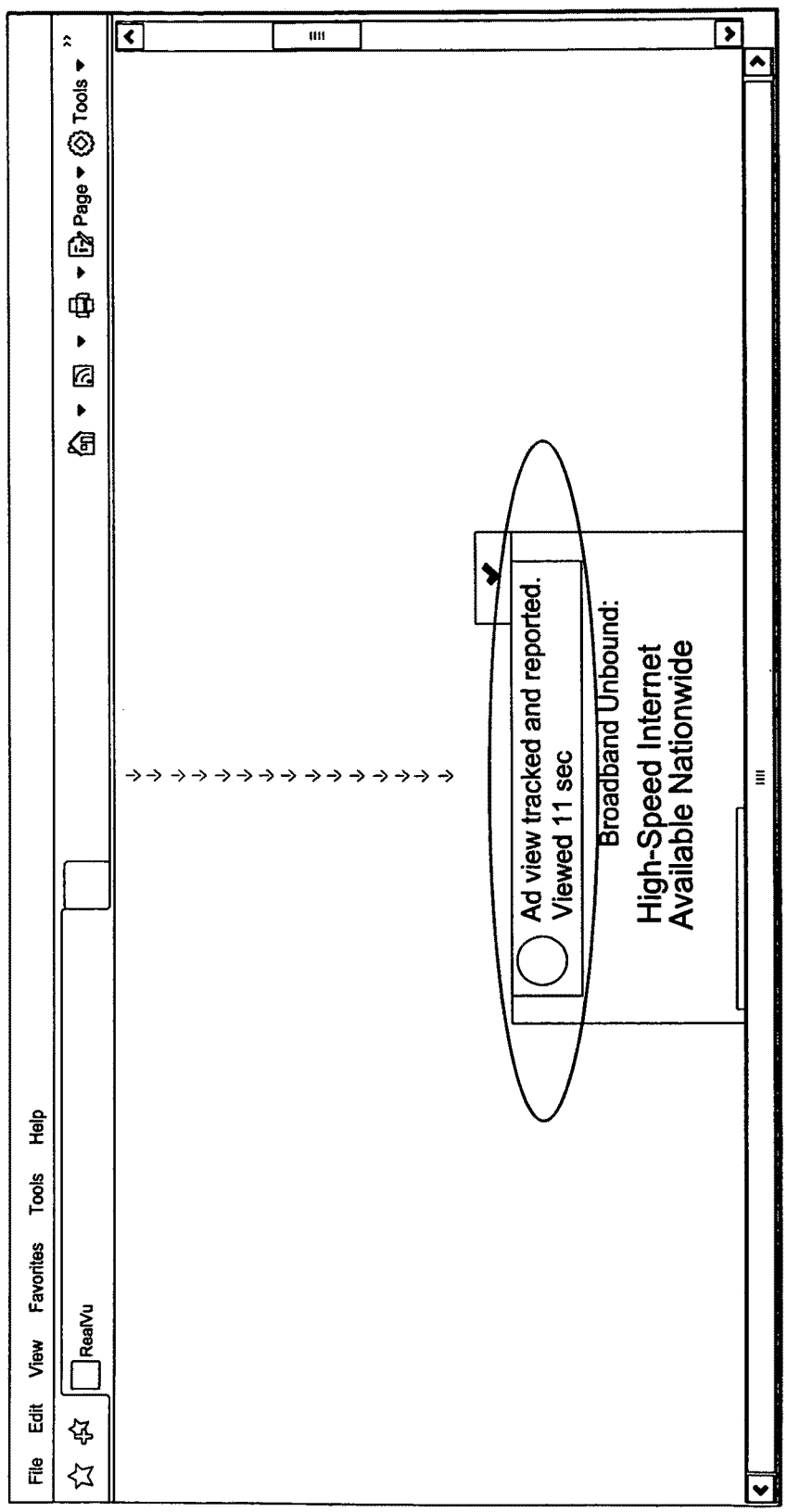
FIG. 71 depicts a sample ad content display page with the content rendering area partially outside of the viewer's browser window dimensions and scrolling position in an embodiment including the content rendering control feature of the present invention.
Figure 74:
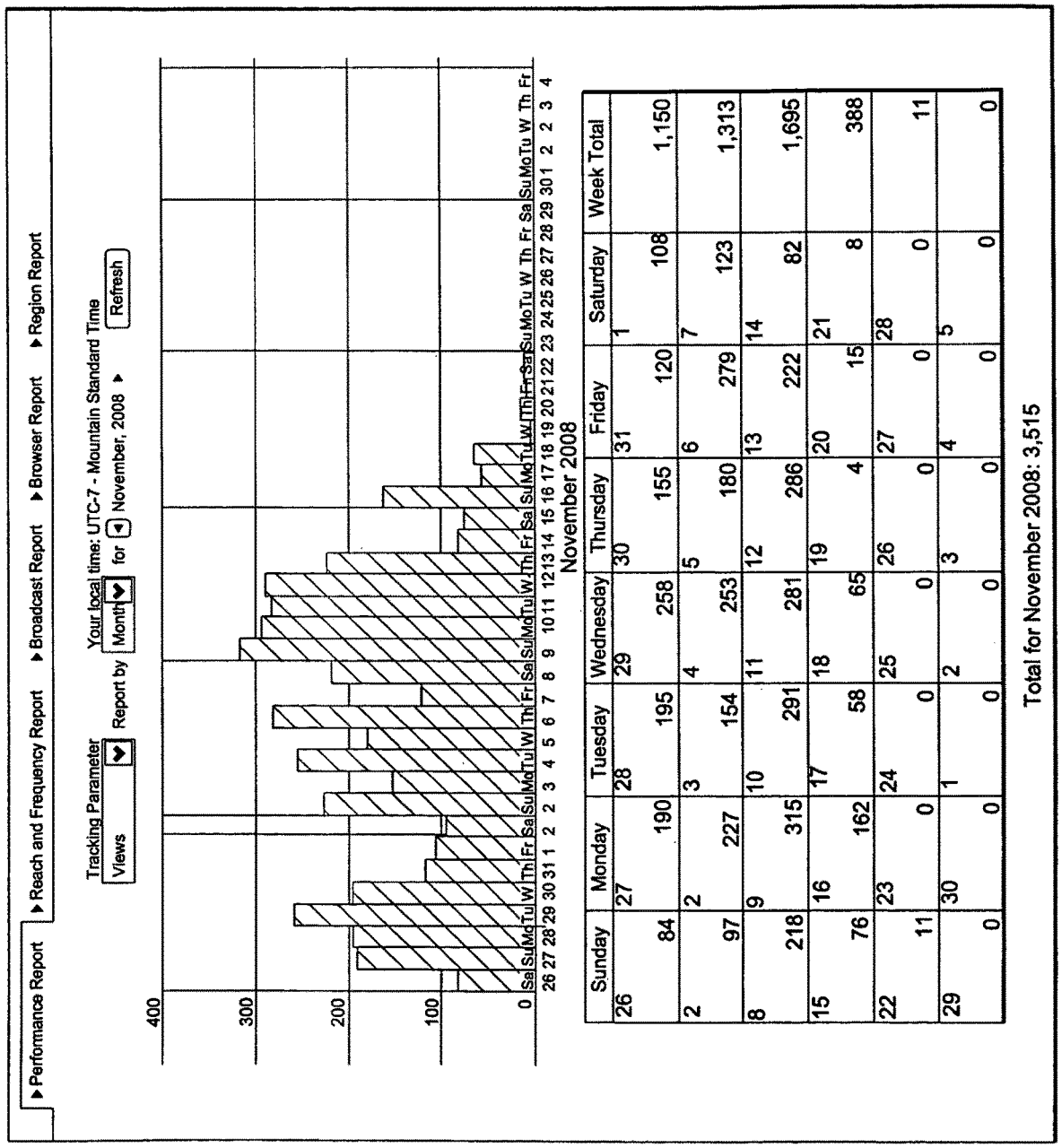
FIG. 74 depicts a sample system content rendering area activity report screen in an embodiment including the content rendering control feature of the present invention.
Figure 75:
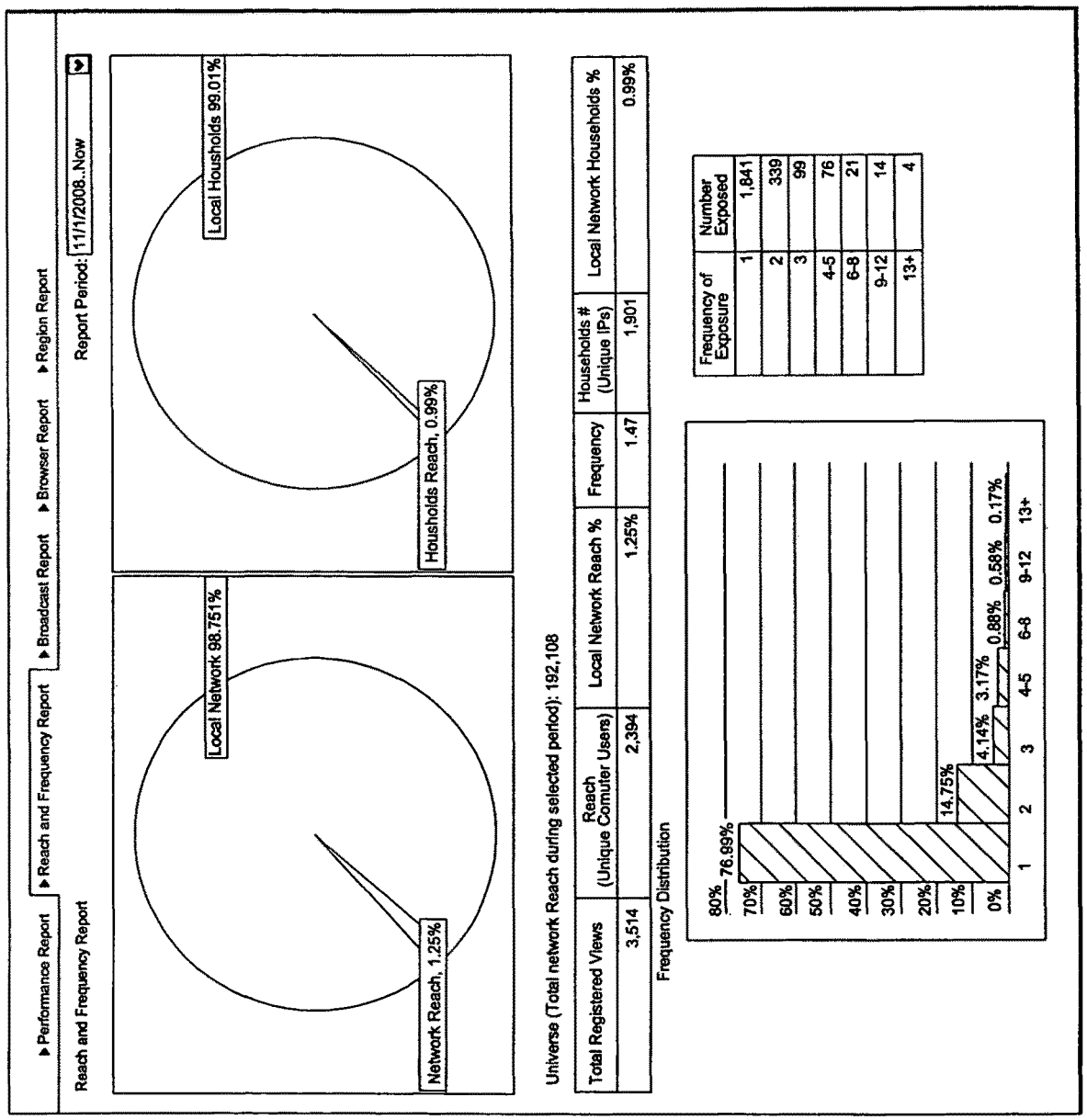
FIG. 75 depicts a sample system content rendering area data report screen in an embodiment including the content rendering control feature of the present invention.
Figure 76:
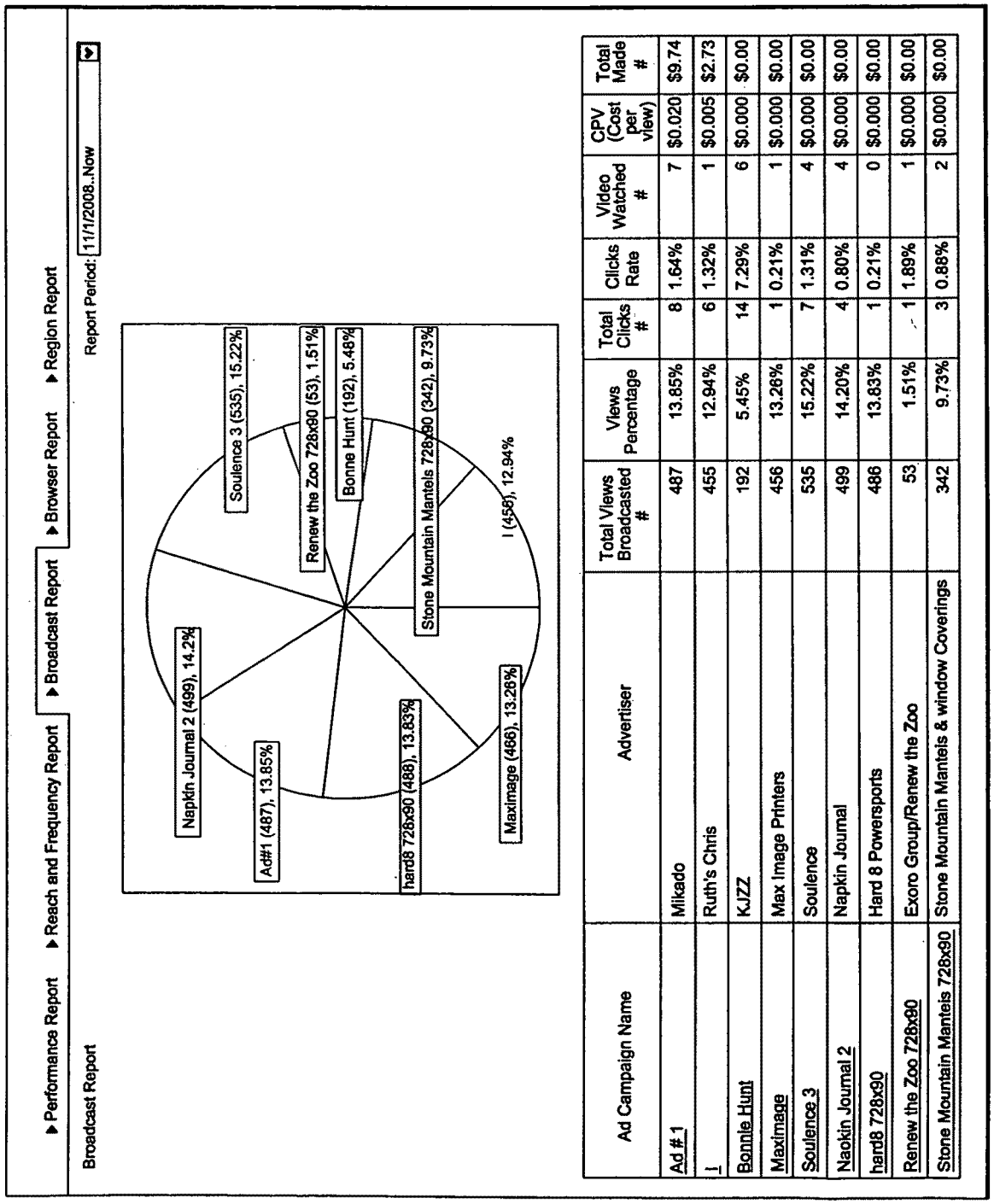
FIG. 76 depicts a sample system content rendering activity report screen in an embodiment including the content rendering control feature of the present invention.
Figure 77:
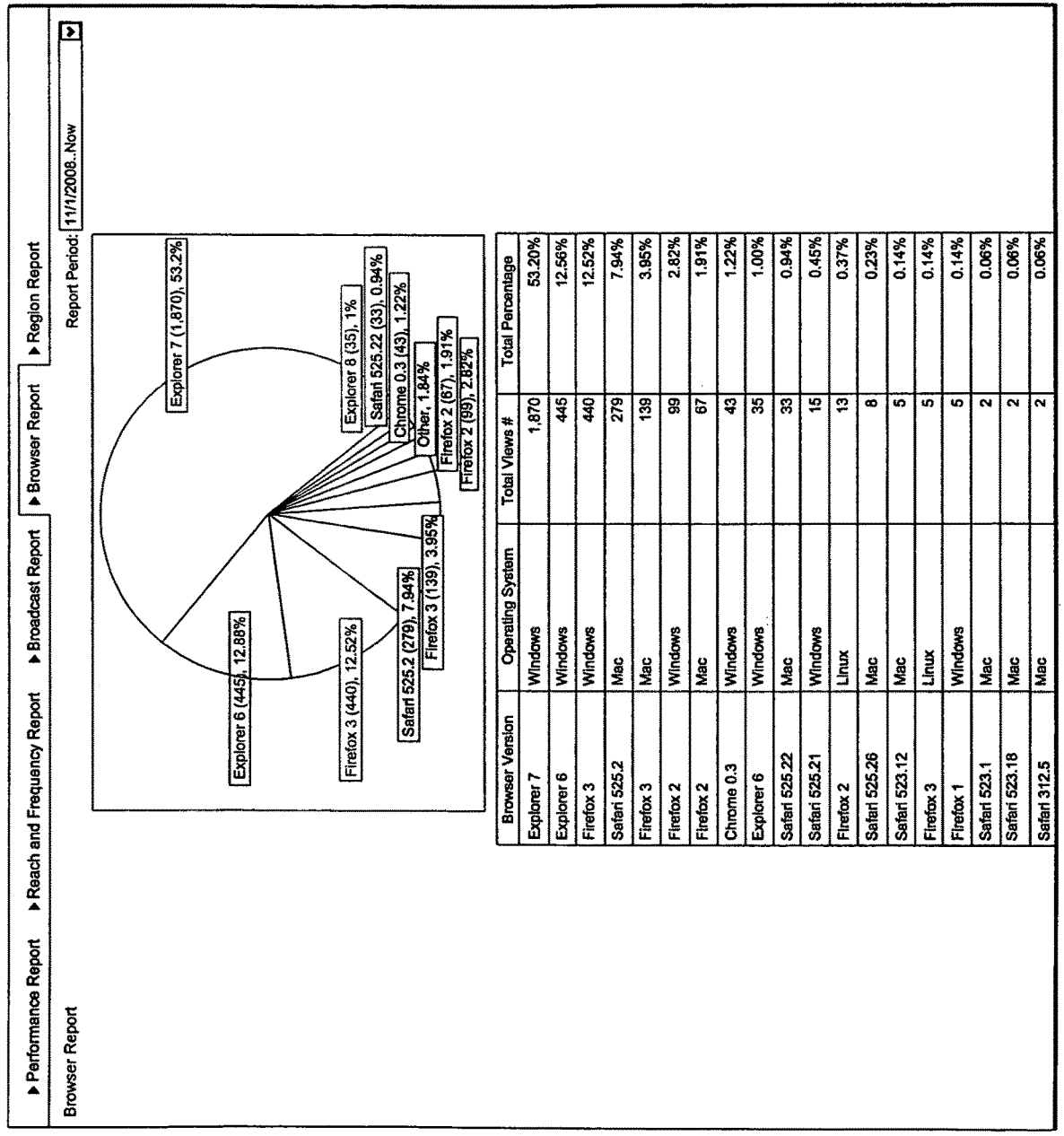
FIG. 77 depicts a sample system viewer browser type data report screen in an embodiment including the content rendering control feature of the present invention.
Figure 78:
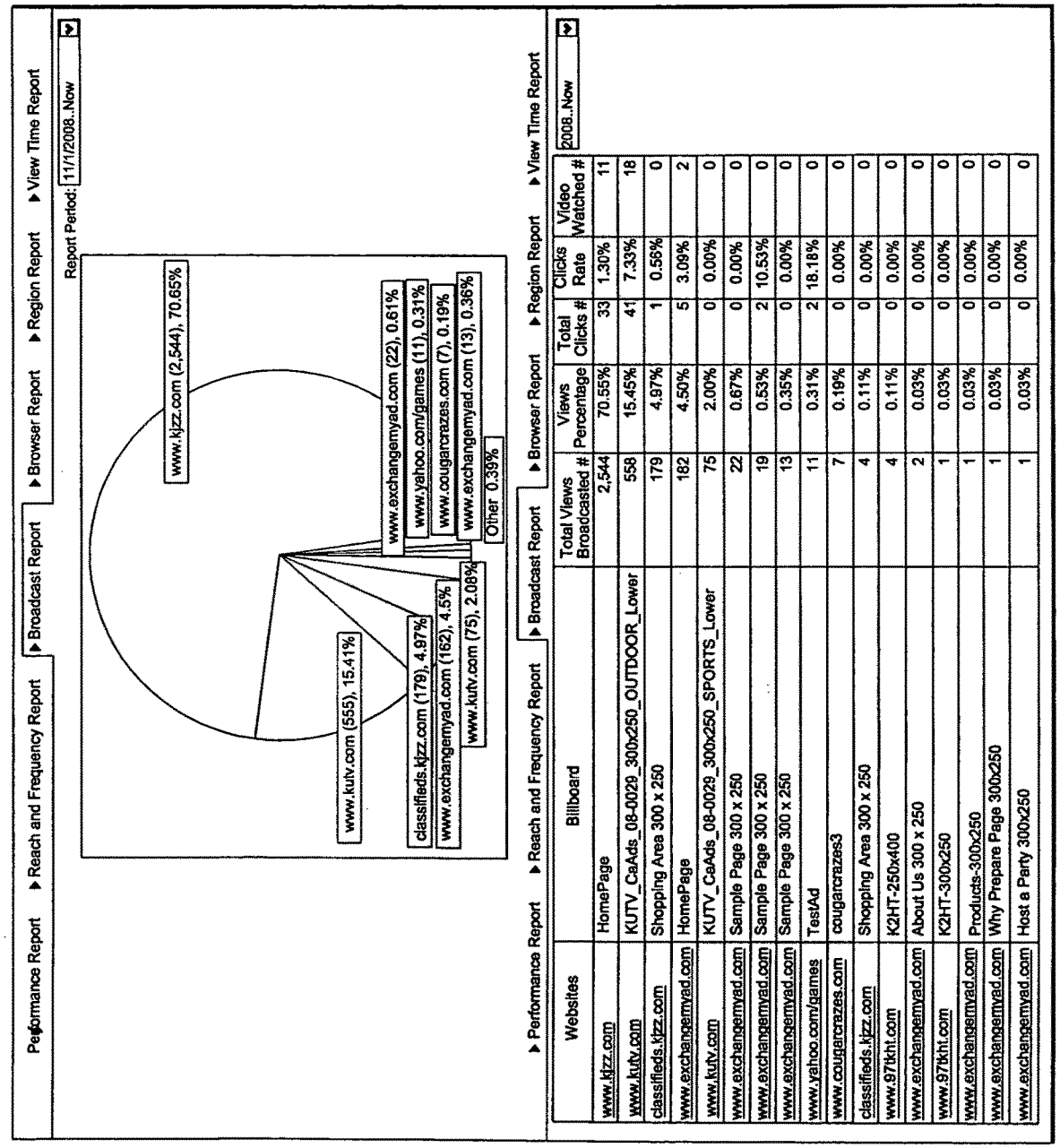
FIG. 78 depicts a sample system viewer geographic location report screen in an embodiment including the content rendering control feature of the present invention.
Figure 79:
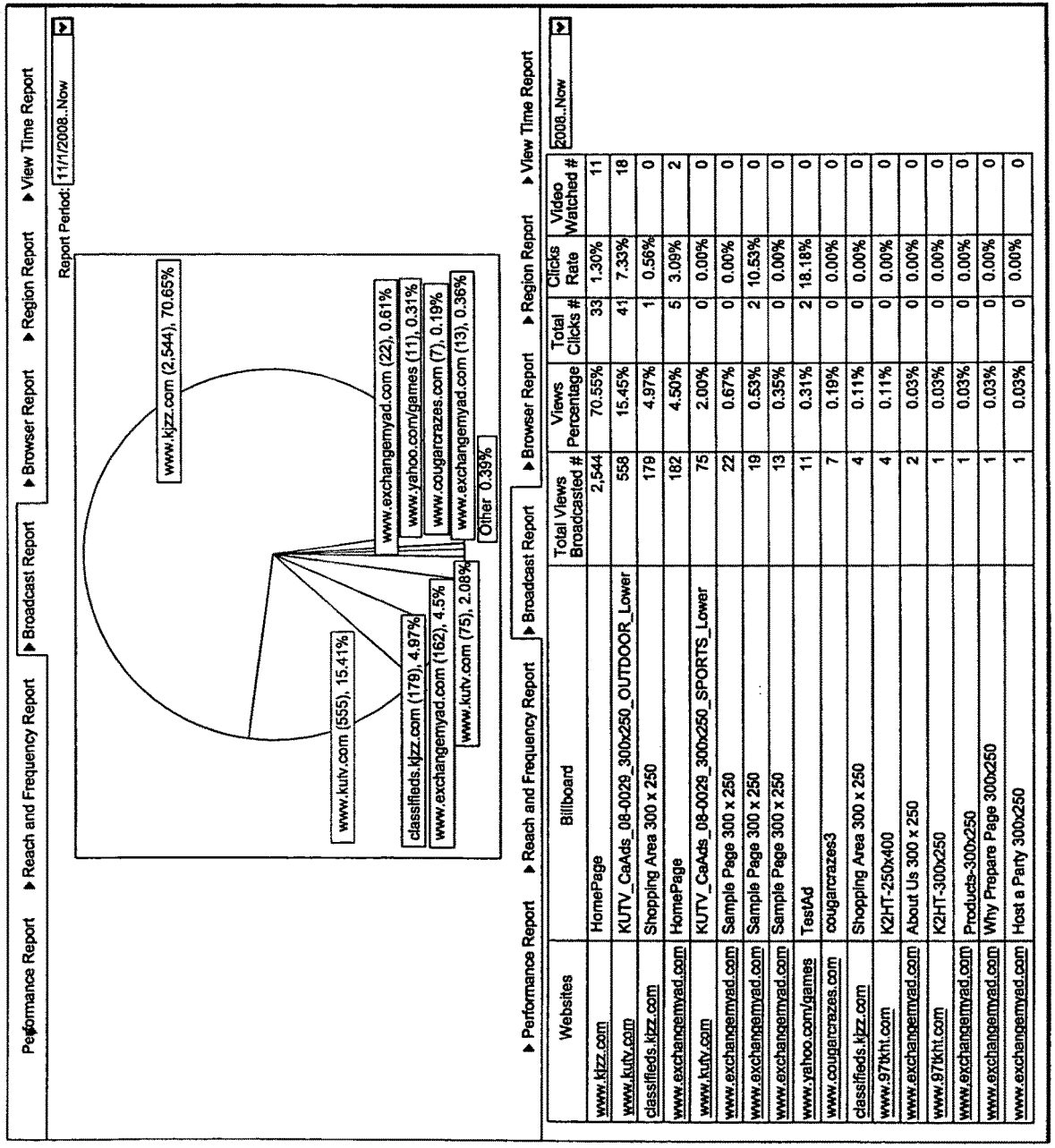
FIG. 79 depicts a sample content rendering area activity report screen in an embodiment including the content rendering control feature of the present invention.
Figure 80:
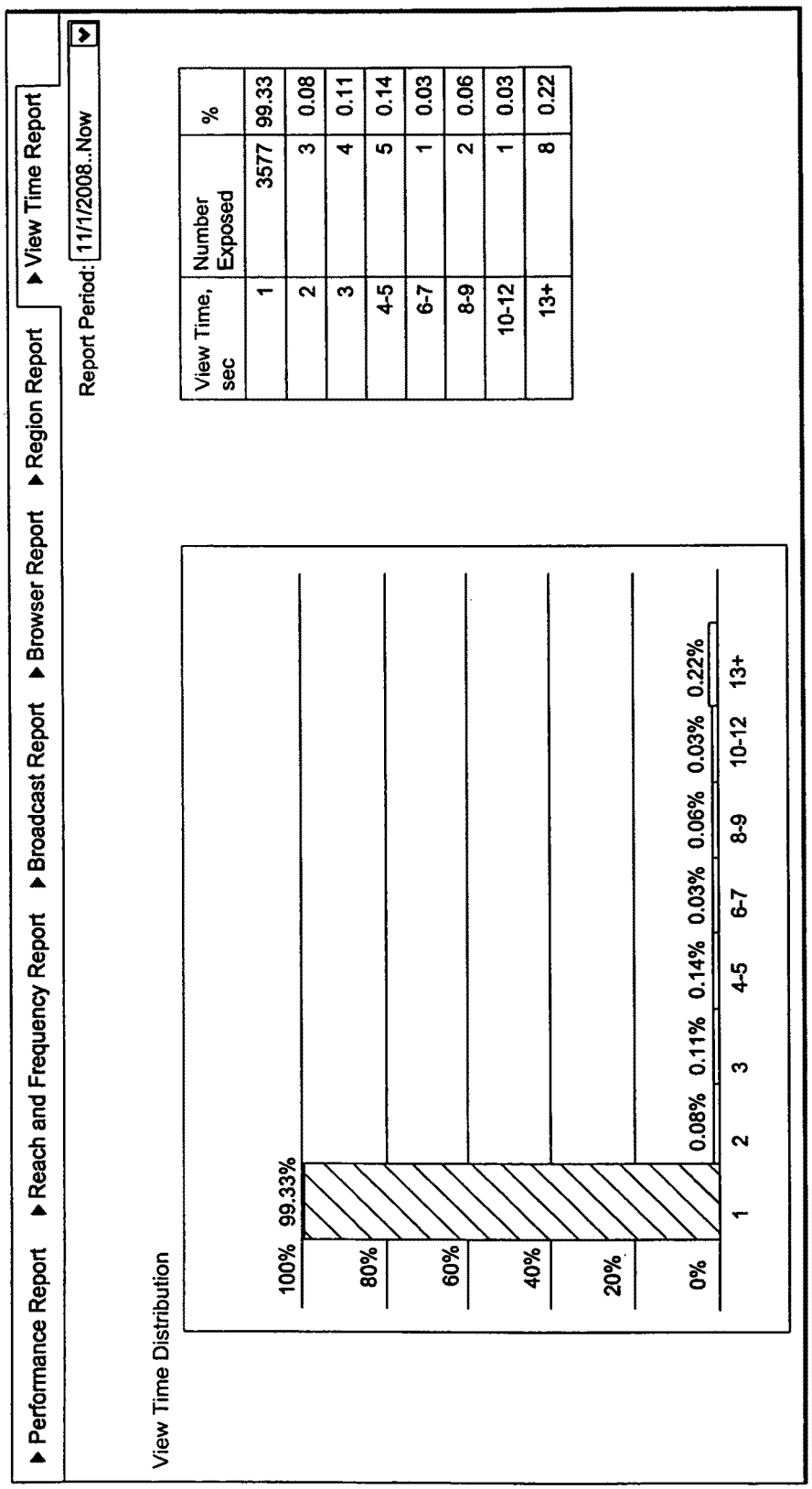
FIG. 80 depicts a sample content rendering time data report screen in an embodiment including the content rendering control feature of the present invention.

FIG. 67 depicts a sample ad content display page as presented to an ad content display page viewer, with the billboard module content rendering area of the ad content display page located below the viewer's browser window dimensions and scrolling position, noted by an oval indicator. Billboard module activation for the particular ad content rendering area is not yet triggered because the designated area of the ad content display page that must be within the viewer's browser window dimensions and scrolling position is not yet within such dimensions and scrolling position. FIG. 68 depicts a sample ad content display page with the billboard module content rendering area entering the viewer's browser window dimensions and scrolling position. At this point, if the billboard module is set to trigger when the designated area of the ad content display page is partially within the viewer's browser window dimensions and scrolling position, the correlator code would proceed to activate the billboard module. FIG. 69 depicts a sample ad content display page with the content rendering area fully within the viewer's browser window dimensions and scrolling position. As this point, if the billboard module is set to trigger when the designated area of the ad content display page is wholly within the viewer's browser window dimensions and scrolling position, the correlator code would proceed to activate the billboard module. FIG. 70 depicts a sample ad content display page with the content rendered and an indicator showing the time that the content has been rendered. FIG. 71 depicts a sample ad content display page with the billboard module content rendering area partially outside of the viewer's browser window dimensions and scrolling position. As the designated ad content display page area that has to be either partially or wholly within the viewer's browser window dimensions and scrolling position is no longer within such dimensions and scrolling position, the previously rendered content can be removed from the page and/or be replaced with new content and content related to the ad content display page area that is then within the viewer's browser screen dimensions and scrolling position would be triggered for rendering. The system rendering counter stops counting when the predefined page area is no longer within the viewer's browser window dimensions and scrolling position, such as when a window is opened over the browser window that is showing the ad, or the viewer minimizes the browser or tabs away from the page on a browser with tab features, and can resume counting if the area returns within the viewer's browser window dimensions and scrolling position. The system users can log onto a password protected system, preferably web-based interface and view detailed reports related to content rendered via the system. Reports may be customized to reflect different time periods and different meta-data. Reporting features for website and other content publishers include, but are not limited to, information for rendering activity in particular website page sections that shows, for example, the number of times content was rendered, the number of times content was within the dimensions and scrolling position of the viewer's browser window, the duration of time that content was within the dimensions and scrolling position of the viewer's browser window, considering if the browser window was minimized, tabbed away from, or otherwise covered by another browser or application window, as well as data such as video viewed, video view duration, click to http destination, custom button clicks (such as print coupon, email), number of unique computer browser users each content rendering was available to (reach) and how many times each billboard module content rendering was available to each unique computer browser user (frequency), the browser type of each viewer for which the content was rendered, and the general geographic location of each user the content was available to (by ISP) and the percentage of the network users reached by billboard module content in a region or nationally. Other custom parameters not mentioned here may be reported. Reports may be parsed by all web site sections or one website section/page or otherwise. FIG. 72 depicts a sample system ad content display page data report screen showing the ad content display pages registered, date created, with the ad content display page triggering areas and billboard module ad content display page rendering areas that have been designated indicated (see the column titled "billboards #"), and data retrieved such as number of times that the content related to a designated billboard module ad content display page rendering area has been requested, number of times that the content related to a designated billboard module ad content display page rendering area has been rendered, the percentage of content rendering vs. content request, click-through rate and total number of clicks, and other content rendering activity data. FIG. 73 depicts a sample system content billboard module rendering area data report screen showing content rendering activity for specific ad content display page rendering areas of a ad content display page, including the billboard module content rendering area dimensions, date created, number of times ad content display page area was requested, number of times the content designated for the particular billboard module has been rendered, and other ad content display page rendering area activity data. FIG. 74 depicts a sample system content rendering area activity report screen showing a report and bar graph of data pertaining to content rendered within viewer browser screen dimensions and scrolling position in a given period (a monthly period is indicated in the exemplary report shown in FIG. 74). FIG. 75 depicts a sample system content rendering area data report screen indicating data pertaining to the viewers of rendered content, such as their Internet protocol address, as well as the number of unique viewers and the content's reach and frequency of rendering. FIG. 76 depicts a sample system content rendering activity report screen showing a graph and table of the content rendered, organized by content name, including billboard module activation and ad content rendering data for each, which ad content display page administrators can use to assess which billboard modules and/or which content is more often rendered than others. FIG. 77 depicts a sample system viewer browser type data report screen providing information as to the types of browsers being used by viewers to view rendered content. FIG. 78 depicts a sample system viewer geographic location report screen providing information regarding the location of the viewership of the rendered content. FIG. 79 depicts a sample general billboard module content rendering area activity report screen providing information regarding the ad content display pages and billboard module ad content display page rendering areas within said ad content display pages and their rendering activity. FIG. 70 depicts a sample content rendered time data report screen providing information regarding how long content was rendered within a viewer's browser window dimensions and scrolling position.

Figure 81:
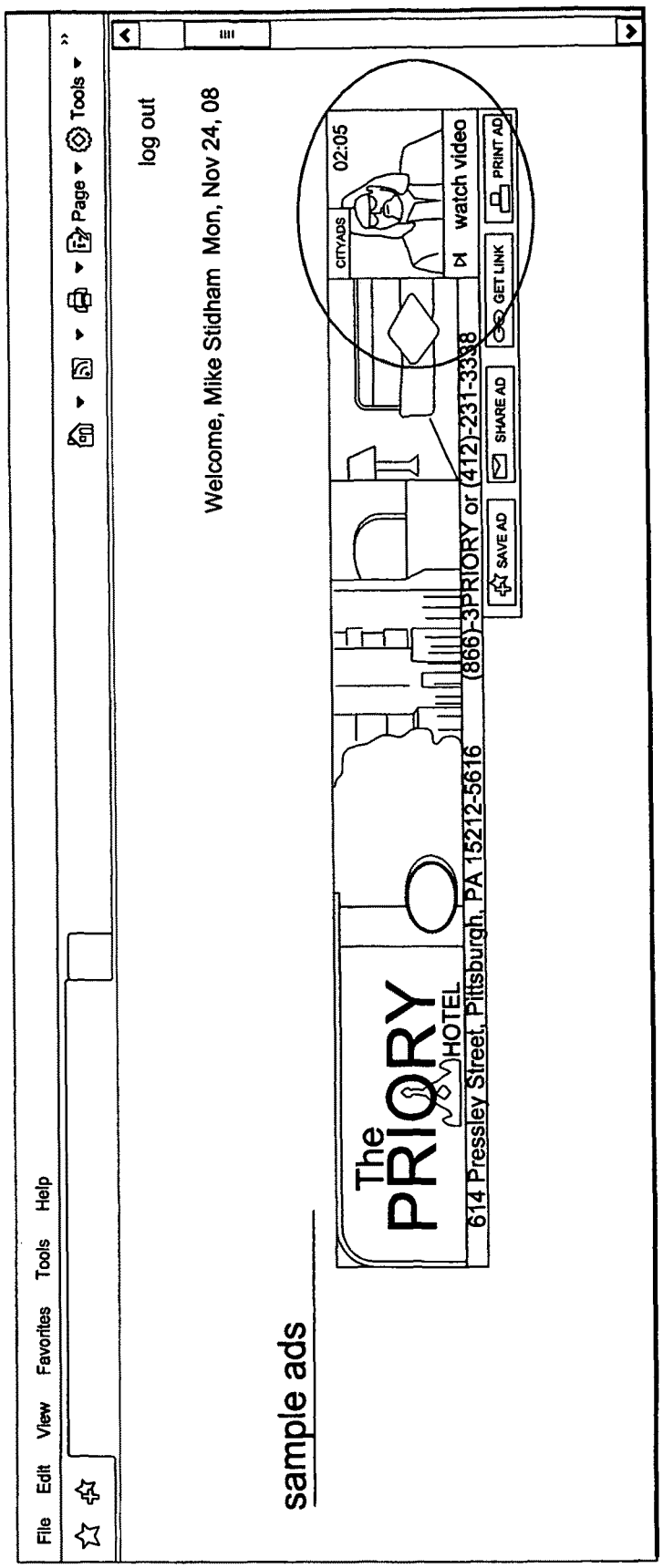
FIG. 81 depicts a sample ad content display page using the system to determine viewer browser screen dimensions and scrolling position to provide scaled rendering of content in an embodiment including the content rendering control feature of the present invention.
Figure 82:
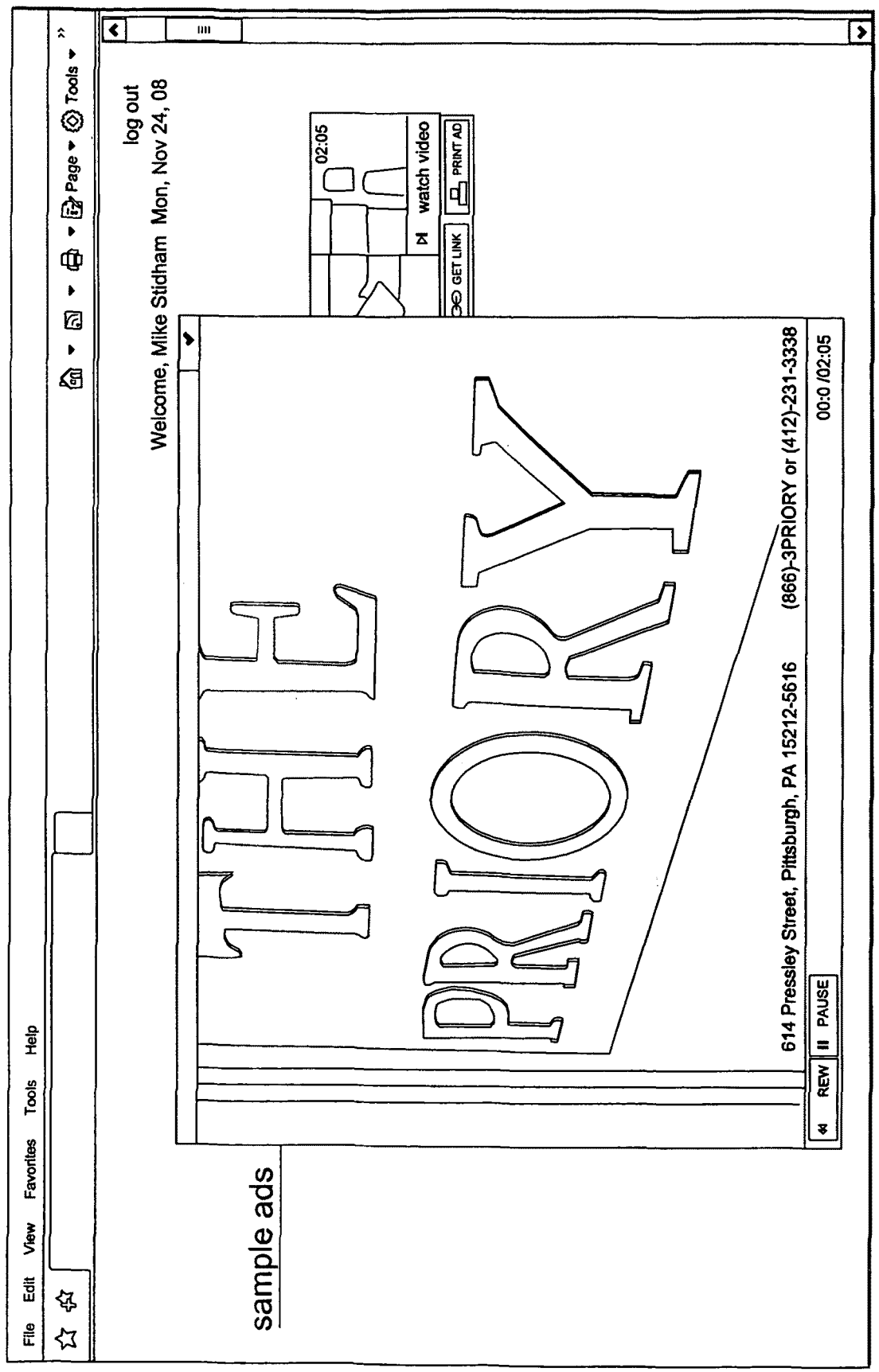
FIG. 82 depicts a sample ad content display page showing content rendered scaled to a predefined size in relation to the viewer's browser window dimensions and scrolling position in an embodiment including the content rendering control feature of the present invention.
Figure 83:
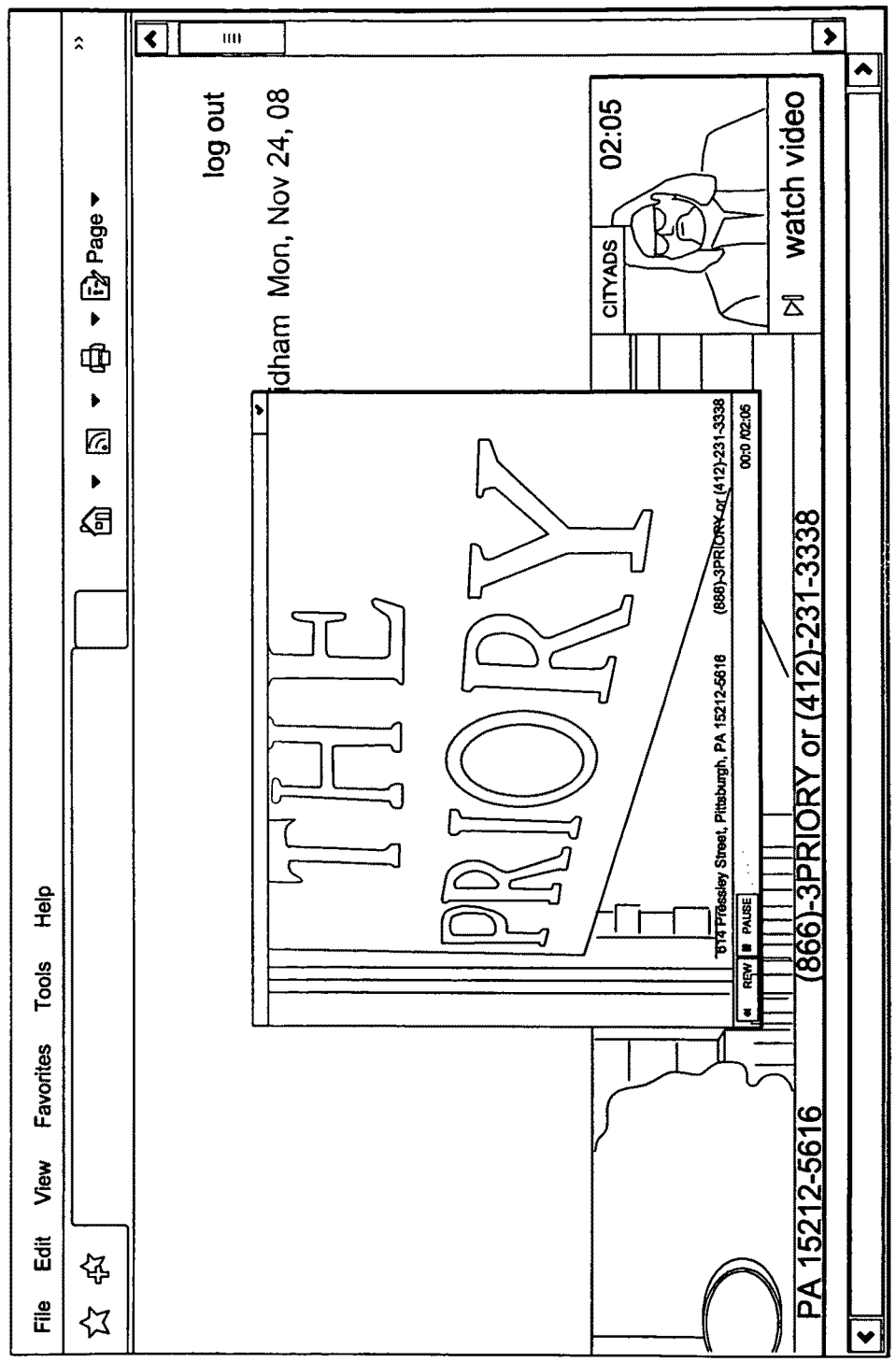
FIG. 83 depicts a sample ad content display page showing content re-rendered and re-scaled to a predefined size in relation to modified viewer browser window dimensions

The system can be utilized to determine a viewer's browser window dimensions and scrolling position to provide content scaled to size to better fit the viewer's browser window by including scaling factor reduction or enlargement based on the system server side application's comparison of the designated billboard module ad content display page rendering area for the content and the viewer's browser window dimensions and scrolling position as determined by the correlator code. FIG. 81 depicts a sample ad content display page using the system to determine viewer browser screen dimensions and scrolling position to provide scaled rendering of content. FIG. 82 depicts a sample ad content display page showing content rendered scaled to a predefined size in relation to the viewer's browser window dimensions and scrolling position. FIG. 83 depicts a sample ad content display page showing content re-rendered and re-scaled to a predefined size in relation to modified viewer browser window dimensions and/or scrolling position.

Also, the system in a preferred embodiment may estimate or forecast ad content display page/ad content display page area inventory availability for future specified periods helping content publisher optimally sell and fill their content space inventory. Based on tracking data retrieved for a specific time period regarding ad content display page/page area usage, the system can estimate activity for future time periods.

A sample of the JavaScript tag/link that is placed on the ad content display page that links to the system server-side software application when a viewer first requests an ad content display page is provided below: <script language="javascript" type="text/javascript" src="http://cityads.net/display/?key=waCcZO4I1GInZjIdFQdSELCe4PcWdeXgGXkMuaWqUPs%3d"></script>

A sample of a correlator code dynamically written to or otherwise embedded on the ad content display page which functions to control the billboard module activation based on whether the designated ad content display page triggering area is within, or within a pre-defined distance outside of, the viewer's browser window dimensions and scrolling position, is provided below:

```
var __viz__check = {
xs1:0,
ys1:0,
xs2:1000,
ys2:800,
curtop:0,
curleft:0,
navigate:function( )
{
    if( this.location[0]=="top" ) this.location[0]="bottom";
    else this.location[0]="top";
},
update:function( )
{
    this.xs1 = this.getScrollLeft( );
    this.ys1 = this.getScrollTop( );
    this.xs2 = Number(this.xs1)+Number(this.getClientWidth( ));
    this.ys2 = Number(this.ys1) +Number(this.getClientHeight( ));
    var i=0;
    while ( i < __i )
      {
        var adi = __adi[i];
        if( adi != null)
          {
            adi.findPos( );
            var x1 = adi.x;
            var y1 = adi.y;
            var x2 = Number(x1)+Number(adi.width);
            var y2 = Number(y1)+Number(adi.height);
            var vm = 20 ;
            //     if (Number(adi.height) > 500) vm = 220 ;
            if ( adi.done==0 ) {
                if ((x2>=this.xs1)&&(y2>=this.ys1)&&
                (x1<=this.xs2)&&(y1<=this.ys2) ) {
                    if ( (__popul==0) || (typeof [u__popul] != 'undefined') ) {
                        __popul++ ;
                        adi.markwords = __marksfinder.get__words( );
                        adi.ea = __ea__list ;
                        adi.populate( );
                    }
                }
            } else {
            if (adi.rend==1) {
                if ( (x1>=(this.xs1-20))&&(y1>=(this.ys1-
vm))&&(x2<=(this.xs2+20))&&(y2<=(this.ys2+vm)) ) {
                    if (adi.vid==0) {
                        if (adi.viz==0) {
                            if (adi.t >=1) {
                                adi.sec = 1;
                                __av(i,1) ;
                            }
                            else {
                                if ((adi.sec +1.1) <= adi.t) {
                                    adi:sec ++ ;
                                    if (adi.sec < 61) __av(i, adi.sec) ;
                                }
                                if (adi.paused==1) {
                                    adi.paused=0 ;
                                    __pv(i) ;
                                }
                            }
                            adi.t += 0.1 ;
                        }
                    }
                    else {
                        if (adi.paused==0) {
                            adi.paused=1 ;
                            __sv(i) ;
                        }
                    }
                }
            }
            }
        }
        i++;
    }
},
findPos:function(p)
{
    curleft = curtop = 0;
    var obj = document.getElementById(p) ;
    if (obj.offsetParent) {
        curleft = obj.offsetLeft
        curtop = obj.offsetTop
        while (obj = obj.offsetParent) {
            curleft += obj.offsetLeft
            curtop += obj.offsetTop
        }
    }
},
//---
getClientWidth:function( ) {
    var w1=0;
    if( window.innerWidth ) w1=window.innerWidth;
    var w2=0;
    if(document.documentElement)
    w2 = document.documentElement.clientWidth;
    if(w1<w2) w1=w2;
    return w1;
},
getClientHeight:function( ) {
    var h1 = 0;
    if( window.innerHeight ) h1 = window.innerHeight;
    var h2=0;
    if( document.documentElement )
    h2=document.documentElement.clientHeight;
    if(h1<h2) h1=h2;
    return h1;
},
getScrollLeft:function( ) {
    var sL1=0;
    if( window.pageXOffset ) sL1 = window.pageXOffset;
    var sL2=0;
    if(document.documentElement)
    sL2=document.documentElement.scrollLeft;
    if(sL1<sL2) sL1=sL2;
    return sL1;
},
getScrollTop:function( ) {
    var sT1=0;
    if(window.pageYOffset) sT1=window.pageYOffset;
    var sT2=0;
    if(document.documentElement)
    sT2=document.documentElement.scrollTop;
    if(sT1<sT2) sT1=sT2;
    return sT1;
},
}
```

A sample of the code dynamically written to the ad content display page that indexes the web page text for the most frequently occurring words is as follows:

```
var __index = {
    exc:[ "and", "com", "can", "from","for","the", "them", "that", "gif",
        "similar", "page", "www", "with","which", "hi",
"you","your","did","does" ], top__max:5,
top:["","","","",""],
get__words:function( )
{
    var s = "";
    for( var i=0; i<this.top__max; i++)
    {
        if( this.top[i]=="" ) break;
        if(s.length>0) s += ",";
        s += this.top[i];
    }
    return encodeURI(s);
```

-continued

```
},
find_words:function( )
{
  try{
    try{
      a=var_words;
    }
    catch(e1)
    {
      var txt = document.body.innerHTML.toLowerCase( );
      var sn = txt.split(/\<\s*script/);
      for(var i=0; i<sn.length;i++)
      {
        var n = sn[i].search( /\<s*\/scripts*\>/ );
        if(n==-1) n=0;
        var m = sn[i].indexOf(">",n)+1;
        sn[i] = sn[i].substring(m);
      }
      txt = sn.join(" ");
      var tst_msg = document.getElementById('tst_msg');
      txt = txt.replace(/(\<[^\>]*\>)/g, " ");
      txt = txt.replace(/(&.*\;)/g, " ");
      txt = txt.replace(/[\W\d]/g," ");
      txt = txt.replace(/\s{1,}/g," ");
      txt = txt.replace(/\s\w\w\w\s/g," ");
      txt = txt.replace(/\s\w\w\s/g," ");
      txt = txt.replace(/\s\w\s/g," ");
      txt = txt.replace(/ies\s/g,"y ");
      txt = txt.replace(/ives\s/g,"fe ");
      txt = txt.replace(/ves\s/g,"f");
      txt = txt.replace(/([^s])s\s/g,"$1 ");
      for(j=0;j<this.exc.length;j++)
      {
        var ex = new RegExp( "\s"+this.exc[j]+"\s", "g");
        txt = txt.replace( ex," ");
      }
      var w = txt.split(/\s+/);
      w = w.sort( );
      var t="", to="";
      var k=1;
      w = w.sort( );
      var ktop=[0,0,0,0,0];
      while(w.length>0)
      {
        t = w.shift( );
        if( t==to ) k++;
        if(t!=to || w.length==0 )
        {
          for(j=0;j<5;j++)
          {
            if(k>ktop[j]){
              this.top[j]=to; ktop[j]=k;break;}
          }
          k=1;
          to = t;
        }
      }
    }
    catch( e )
    {
      document.write(
        "Exception" +e.description+"<br>" );
    }
  }
}
```

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative and other embodiments may be selected without departing from the spirit and scope of the present invention.

What is claimed is:

1. A system comprising:
at least a first module associated with a first triggering area of an ad content page and a second module associated with a second triggering area of the ad content page and a correlator code configured to work in conjunction with a web browser which renders the ad content page:
the correlator code configured, in conjunction with the web browser, to:
determine that the first triggering area of the page is within a visible area of a viewer's browser window;
in response to determining that the first triggering area is within the visible area of the browser window, activate the first module of the page such that a first communication is sent to a server computing system;
determine that the second triggering area is within a predefined distance outside of the visible area of the browser window; and
in response to determining that the second triggering area is within the predefined distance outside of the visible area of the browser window, activate the second module of the page such that a second communication is sent to a server computing system;
one or more server computing systems configured to:
receive the one or more communications initiated from one or more modules of the page in response to the one or more modules being activated by the correlator code; and
in response to receiving a communication initiated from the first module, select an advertisement to display on the page based at least in part on a plurality of bids from a plurality of bid users and identify a first selected bid;
serve a first ad content designated by the first selected bid user to the browser;
in response to receiving a communication initiated from the second module, select an advertisement to display on the page based at least in part on a plurality of auction bids from a plurality of bid users and identify a second selected bid;
serve a second ad content designated by the second selected bid user to the browser;
wherein the served first ad content is rendered in a first predefined area associated with the first triggering area and the second ad content is rendered in a second predefined area associated with the second triggering area.

2. The system of claim 1, wherein after the served ad content rendered in one of the predefined areas has been within the visible area of the browser a predetermined time, replacement ad content is downloaded to the browser and rendered in that one of the predefined areas.

3. The system of claim 1, wherein after the served ad content rendered in one of the predefined areas has been within the visible area of the browser for a pre-determined time, a replacement selection auction is conducted, a replacement bid is selected, and new ad content designated by the selected replacement bid is rendered in that one of the predefined areas.

4. The system of claim 1, wherein after the served ad content rendered in one of the predefined areas has been with the visible area of the browser and then scrolled outside of the visible area of the browser, substitution ad content is downloaded to the browser from the one or more server computing systems, and when the predefined area is scrolled back into the visible area of the browser the substitution ad content is displayed in that one of the predefined areas.

5. The system of claim 4, wherein the substitution ad content is selected by the one or more server computing systems at least in part as a result of an auction process at the one or more server computing systems.

6. A system comprising:
instructions in the form of code operating on a computing device in association with a browser and an ad content page;
the instructions configured, in conjunction with the browser, to direct the computing device to:
determine that a first triggering area of the page is within a visible area of a browser window;
in response to determining that the first triggering area is within the visible area of the browser window, send a first communication to a server;
determine that a second triggering area is within a predefined distance outside of the visible area of the browser window; and
in response to determining that the second triggering area is within the predefined distance outside of the visible area of the browser window, send a second communication to a server;
one or more server computing systems configured to:
receive the one or more communications from the computing device; and
in response to receiving the first communication from the computing device, select an advertisement to display on the page based at least in part on a plurality of bids from a plurality of advertising bidders and identify a first selected advertiser bidder;
serve a first ad content designated by the first selected advertiser bidder to the browser;
in response to receiving the second communication from the computing device, select an advertisement to display on the page based at least in part on a plurality of auction bids from a plurality of advertising bidders, and identify a second selected advertiser bidder;
serve a second ad content designated by the second selected advertiser bidder to the browser;
wherein the first served ad content is rendered in a first predefined area associated with the first triggering area and the second ad content is rendered in a second predefined area associated with the second triggering area.

7. The system of claim 6, wherein after the served ad content rendered in one of the predefined areas has been within the visible area of the browser a predetermined time, replacement ad content is downloaded to the browser and rendered in that one of the predefined areas.

8. The system of claim 6, wherein after the ad content rendered in one of the predefined areas has been within the visible area of the browser for a pre-determined time, a replacement selection auction is conducted, a replacement hid is selected, and new ad content designated by the selected replacement bid is rendered in that one of the predefined areas.

9. The system of claim 6, wherein after the served ad content rendered in one of the predefined areas has been within and then scrolled outside of the visible area of the browser, substitution ad content is downloaded to the computing device from the server computing systems, and when the predefined area is scrolled back into the visible area of the browser the substitution ad content is displayed in that one of the predefined areas.

10. The system of claim 9, wherein the substitution ad content is selected by one or more server computing systems at least in part as a result of an auction process at one or more of the server computing systems.

11. A system comprising:
instructions in the form of code operating on a computing device in association with a browser and an ad content page;
the instructions and the browser configured to direct the computing device to:
determine that a first triggering area of the ad content page is within a predefined distance outside of the visible area of the browser window; and
in response to determining that the first triggering area is within the predefined distance outside of the visible area of the browser window, send a first communication to one or more server systems;
one or more server computing systems configured to:
receive the first communication from the computing device; and
in response to receiving the communication from the computing device, select an advertisement to display on the page based at least in part on a plurality of bids from a plurality of advertising bidders and identify a selected advertiser bidder;
serve first ad content designated by the selected advertiser bidder to the computing device; and
wherein the served first ad content is rendered in a first pre-defined area on the ad content page associated with the first triggering area.

12. The system of claim 11 wherein the first pre-defined area comprises the first triggering area.

13. The system of claim 11, wherein after a pre-determined time that the served first ad content rendered in the first predefined area has been in view, new content is downloaded to the browser and rendered as replacement content in the first predefined area.

14. The system of claim 11, wherein after the served first ad content rendered in the first predefined area has been in view for a pre-determined time, a replacement selection auction is conducted, a replacement bid is selected, and new ad content designated by the selected replacement bid is rendered in the first predefined area.

15. The system of claim 11, wherein after the served first ad content rendered in the first predefined area has been in view and then scrolled out of view a substitution auction is conducted, a substitution bid is selected, and new ad content designated by the selected substitution bid is rendered in the first predefined area when the first predefined area is scrolled back into view.

16. The system of claim 11, wherein
the instructions and browser direct the computing device to determine:
that a second triggering area is within a predefined distance outside of the visible area of the browser window; and
in response to determining that the second triggering area is within the predefined distance outside of the visible area of the browser window, send a second communication to one or more server computing systems;
at least one or more server computing systems configured to:
in response to receiving the second communication from the computing device, select a second advertisement to display on the webpage based at least in part on a plurality of bids from a plurality of advertising bidders and identify a second selected advertiser bidder;

serve ad content designated by the second selected advertiser bidder to the computing device; and wherein the second selected served ad content is rendered in a second pre-defined area associated with the second triggering area.

17. The system of claim 16, wherein the second triggering area is determined to be within a predetermined distance outside the visible area after the first triggering area is determined to be within a predetermined distance outside the visible area.

18. The system of claim 17, wherein the selection of the second advertisement occurs after the occurrence of the selection of the first advertisement.

19. The system of claim 16, wherein:
the instructions and the browser direct the computing device to:
determine that a third triggering area is within a pre-defined distance outside of the visible area of the browser window; and
in response to determining that the third triggering area is within the predefined distance outside of the visible area of the browser window, send a third communication to one or more server computing systems;
at least one or more server computing systems configured to:
in response to receiving the third communication from the computing device select a third advertisement to display on the webpage based at least in part on a plurality of bids from a plurality of advertising bidders and identify a third selected advertiser bidder; and
serve a third ad content designated by the third selected advertiser bidder to the computing device; and
wherein the third ad content is rendered in a third pre-defined area associated with the third triggering area.

20. The system of claim 16, wherein after the served content rendered in a particular predefined area has been in view for a pre-determined time, a replacement selection auction is conducted, a replacement bid is selected, and new content designated by the selected replacement bid is rendered in the particular predefined area.

21. The system of claim 20, wherein after the served replacement content rendered in the particular predefined area has been in view for a second pre-determined time, a second replacement selection auction is conducted, a second replacement bid is selected, and new content designated by the second selected replacement bid is rendered in the particular predefined area.

22. The system of claim 16, wherein after the served ad content rendered in a particular predefined area has been in view and then scrolled out of view, a substitution auction is conducted at one or more server computing systems, a substitution bid is selected, and new content designated by the selected substitution bid is rendered in the particular predefined area.

23. A method comprising:
designating, by one or more computing systems, a first predetermined area on an ad content page;
providing that, in response to a request, the ad content page with a designation of the predefined area and associated instructions in the form of code are served to a remote computing device operating a browser and displaying a browser window;
providing that the remote computing device determines whether the predefined area is within a predefined distance outside a visible area of the browser window and that in at least partial response to such determination a first ad content is served to the remote computing device and rendered in the first predetermined area; and
wherein the instructions are configured, in conjunction with the browser to direct the computing device to:
periodically determine whether the first predetermined area is in view within the visible area of the browser window on the remote computing device; and
in response to determining that the first predetermined area has been in view within the visible area of the browser window for a predefined time, send a communication to one or more server computing systems;
providing that the one or more server computing systems are configured to:
receive the communication from the computing device; and
in response to receiving the communication from the remote computing device, select a replacement advertisement to display on the page;
serve the replacement advertisement to the remote computing device; and
the method further providing that the instructions in conjunction with the browser cause that the replacement advertisement is rendered in the first predetermined area.

24. The method of claim 23, wherein:
the replacement advertisement is selected at least partially as a result of a replacement auction conducted on the one or more server computing systems in at least partial consequence of receiving the communication from the computing device.

25. The method of claim 24, wherein:
the replacement auction is conducted in real time between the time the communication is sent from the computing device and the time that the replacement advertisement is selected.

26. A method comprising:
by one or more computing systems, designating a first triggering area on a web content page,
providing that, in response to a request from a remote viewer computing device, the web content page and a designation of the first triggering area are served to the remote viewer computing device;
providing that instructions in the form of code are served to the remote viewer computing device, the instructions configured, in conjunction with the browser, to direct the remote viewer computing device to:
determine that the first triggering area is within a pre-defined distance outside of a visible area of the browser window; and
in response to determining that the first triggering area is within the predefined distance outside of the visible area of the browser window, send a communication to one or more server computing systems;
after sending the communication, receive first ad content and render that first ad content in a predefined area of the web content page associated with the first triggering area and wherein the first pre-defined area comprises the first triggering area.

27. The method of claim 26, further including providing that the instructions in conjunction with the browser:
track the time that ad content is within the visible area of the browser window, and after the ad content has been within the visible area of the browser window for a predetermined time send a second communication to one or more servers.

28. The method of claim 26, further comprising
providing that after the first ad content rendered in the first predefined area has been in view on the viewer computing device a pre-determined time, a second ad content is received at the viewer computing device and rendered in the first predefined area.

29. The method of claim 26, further comprising:
providing that after the first ad content rendered in the first predefined area has been in view on the viewer computing device for a pre-determined time, an auction is conducted on one or more computer servers, and replacement ad content is selected at least in part on a plurality of bids at the auction, and the selected replacement ad content is served to the viewer computing device to be rendered in the first predefined area.

30. The method of claim 29, further comprising:
providing that the auction is initiated as a result of the one or more server computing systems receiving a communication from the remote viewer computing device, the communication being generated after the first predefined area has been in view for a predetermined time.

31. The method of claim 26, further comprising:
providing that after the first received ad content rendered in the first predefined area has been in view on the viewer computing device, then scrolled out of view, a substitution auction is conducted on one or more computer servers, and substitution ad content is selected at least in part on a plurality of bids at the substitution auction, and the selected substitution ad content is served to the viewer computing device to be rendered in the first predefined area when the first predefined area is scrolled back into view.

32. The method of claim 26, further comprising:
providing that the computing device determines that a second triggering area is within a predefined distance outside of the visible area of the browser window; and
in response to determining that the second triggering area is within the predefined distance outside of the visible area of the browser window, send a second communication to one or more server computing systems;
after sending the second communication, receive a second ad content and render that second ad content in a predefined area of the web content page associated with the second triggering area.

33. A method comprising:
designating a first predetermined area on a web content page for rendering of ad content at a remote viewer computing device,
providing that, in response to a request for the web content page from a remote viewer device, the web content page with a designation of the first predetermined area is served to the remote viewer computing device with instructions in the form of code to operate on the remote viewer computing device in association with a browser
providing that the instructions in conjunction with the browser direct the remote viewer computing device to determine whether the first predetermined area is within a predefined distance outside a visible window of the browser in which at least a portion of the web content page is rendered;
providing that a first ad content is served to the remote viewer computing device in at least partial consequence of the determination that the first predetermined area is within the predefined distance outside of the visible window of the browser;
providing that the first ad content is rendered in the first predetermined area of the web content page.

34. The method of claim 33, further comprising:
providing that the instructions are configured to, in conjunction with the browser, direct the computing device to:
track the time that the first ad content rendered in the predetermined area of the web content page has been in view within the visible window of the browser; and
in at least partial response to determining that the first predetermined area has been in view within the visible window of the browser for a pre-determined time, send a communication to one or more servers;
providing that after the one or more servers receive the communication, replacement ad content is selected at the one or more servers and the replacement ad content is served to the remote viewer computing device with identification such that the replacement ad content is rendered on the remote viewer computing device in the first predetermined area.

35. The method of claim 34, further comprising:
providing that the replacement ad content is selected at least partially as a result of a real time auction conducted at the one or more servers after receiving the communication at the one or more servers and before the replacement ad content is rendered on the remote viewer computing device.

36. The method of claim 26, further comprising:
providing that after the first received ad content rendered in the first predefined area has been in view on the viewer computing device, then scrolled out of view, substitution ad content is selected at one or more server computers, and the selected substitution ad content is served to the viewer computing device to be rendered in the first predefined area when the first predefined area is scrolled back into view.

* * * * *